US009611348B2

(12) United States Patent
Stewart et al.

(10) Patent No.: US 9,611,348 B2
(45) Date of Patent: Apr. 4, 2017

(54) PROCESS OF PRODUCING POLYOLEFINS USING METALLOCENE POLYMERIZATION CATALYSTS AND COPOLYMERS THEREFROM

(71) Applicant: ExxonMobil Chemical Patents Inc., Baytown, TX (US)

(72) Inventors: Ian C. Stewart, Houston, TX (US); Steven D. Brown, League City, TX (US); Crisita Carmen H. Atienza, Houston, TX (US); David T. Harris, Houston, TX (US); Aaron M. Hollas, Irvine, CA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/248,671

(22) Filed: Apr. 9, 2014

(65) Prior Publication Data

US 2014/0316085 A1 Oct. 23, 2014

Related U.S. Application Data

(60) Provisional application No. 61/810,894, filed on Apr. 11, 2013.

(51) Int. Cl.
*C08F 4/6592* (2006.01)
*C08F 210/16* (2006.01)
*C07F 17/00* (2006.01)
*C08F 4/659* (2006.01)

(52) U.S. Cl.
CPC .......... *C08F 210/16* (2013.01); *C08F 4/6592* (2013.01); *C08F 4/65927* (2013.01); *C08F 4/65908* (2013.01); *C08F 4/65912* (2013.01); *C08F 2420/02* (2013.01)

(58) Field of Classification Search
CPC .... C07F 17/00; C08F 4/6592; C08F 4/65927; C08F 4/65908; C08F 4/65912; C08F 210/16
See application file for complete search history.

(56) References Cited

U.S. PATENT DOCUMENTS

| | | | |
|---|---|---|---|
| 5,854,362 | A | 12/1998 | Nickias et al. |
| 6,066,588 | A | 5/2000 | Razavi et al. |
| 6,552,210 | B1 | 4/2003 | Gores et al. |
| 7,737,215 | B2 | 6/2010 | Chang et al. |
| 9,006,380 | B2 | 4/2015 | Weaver et al. |
| 2003/0149199 | A1 | 8/2003 | Schottek et al. |
| 2005/0182266 | A1 | 8/2005 | Schulte et al. |
| 2009/0209712 | A1 | 8/2009 | Lee et al. |
| 2010/0121006 | A1 | 5/2010 | Cho et al. |
| 2011/0213109 | A1 | 9/2011 | Voskoboynikov et al. |
| 2012/0172548 | A1* | 7/2012 | Cho ........................ C08L 23/08 526/64 |
| 2013/0085232 | A1 | 4/2013 | Stewart |

FOREIGN PATENT DOCUMENTS

| | | |
|---|---|---|
| CN | 101309956 | 11/2008 |
| CN | 101583664 | 11/2009 |
| CN | 101679540 | 3/2010 |
| CN | 101679697 | 3/2010 |
| EP | 0 277 004 | 1/1988 |
| EP | 0 729 968 | 3/1996 |
| EP | 2011-137146 | 7/2011 |
| EP | 2 368 896 | 9/2011 |
| EP | 2 623 522 | 8/2013 |
| WO | wo 95/06071 | 3/1995 |
| WO | wo 96/16069 | 5/1996 |
| WO | wo 97/14724 | 4/1997 |
| WO | wo 2006/099631 | 9/2006 |
| WO | wo 2008/036631 | 3/2008 |
| WO | wo 2008/134186 | 11/2008 |
| WO | wo 2008/136621 | 11/2008 |
| WO | wo 2009/054832 | 4/2009 |
| WO | wo 2013/048848 | 4/2013 |

OTHER PUBLICATIONS

U.S. Appl. No. 13/623,263, filed Sep. 30, 2011, Stewart.
U.S. Appl. No. 61/810,894, filed Apr. 11, 2013, Stewart.
Alamo, R.G. et al., "Phase Structure of Random Ethylene Copolymers: A Study of Counit Content and Molecular Weight as Independent Variables," Macromolecules, vol. 26, 1993, p. 5740-5747.
Amor, F., et al., "Zirconium and hafnium mono (alkyl) complexes containing a tridentate linked amidotetramethylcyclopentadienyl ligand", Journal of Organometallic, 1998, vol. 558, pp. 139-146.
Amor, F., et al., "Alkyl Complexes of Group 4 Metals Containing a Tridentate-Linked Amido-Cyclopentadienyl Ligand: Synthesis, Structure, and Reactivity Including Ethylene Polymerization Catalysis", Organometallics, 1998, vol. 17, pp. 5836-5849.
Arriola, D., et al., "Catalytic Production of Olefin Block Copolymers via Chain Shuttling Polymerization", Science, May 5, 2006, vol. 312, 1947, pp. 714-719.
Flory, P.J., Thermodynamics of Crystallization in High Polymers. I. Crystallization Induced by Stretching, The Journal of Chemical Physics, vol. 15, No. 6, pp. 397-408.

(Continued)

*Primary Examiner* — Caixia Lu
(74) *Attorney, Agent, or Firm* — Catherine L. Bell

(57) ABSTRACT

An ethylene copolymer, a Group 4 transition metal catalyst compound, and methods for polymerization using such a compound, said compound represented by the formula: $(L)_p(R')_zT(Cp)(A)MX_2$, where M is a Group 4 metal; z is 0 to 8; p is 1 to 3; X is an anionic leaving group; T is a bridging group; $R^1$ to $R^4$ are hydrogen, a hydrocarbyl group, a substituted hydrocarbyl group, aryl group, substituted aryl group, or a heteroatom-containing group (where adjacent R groups can form rings); R' is hydrogen, a $C_1$ to $C_{10}$ alkyl group, a $C_6$ to $C_{24}$ aryl group, or a $C_7$ to $C_{40}$ alkylaryl group; and L is a heteroatom or heteroatom-containing group bound to T, Cp is a cyclopentadienyl ring substituted with 0 to 4 substituent groups (where adjacent groups can form $C_4$ to $C_{20}$ rings); A is Cp or $(JS'_{z^*-1-y})$, where J is a Group 15 or 16 element; S' is a hydrocarbyl, substituted hydrocarbyl, or heteroatom; $z^*$ is 2 or 3, and y is 0 or 1, is provided.

31 Claims, 6 Drawing Sheets

(56) References Cited

OTHER PUBLICATIONS

Flory, P.J., Thermodynamics of Crystallization in High Polymers. II. Simplified Derivation of Melting-Point Relationships, The Journal of Chemical Physics, vol. 15, No. 9, pp. 684.

Flory, P.J., Thermodynamics of Crystallization in High Polymers. IV. A Theory of Crystalline States and Fusion in Polymers, Copolymers and Their Mixtures with Diluents., The Journal of Chemical Physics, vol. 17, No. 3, 1948, pp. 223-240.

Giardello, M., et al., "*Chiral C1-Symmetric Group 4 Metallocenes as Catalysts for Stereoregualr α-Olefin Polymerization. Metal, Ancillary Ligand, and Counteranion Effects*", J. Am. Chem. Soc., 1995, vol. 117, pp. 12114-12129.

Huang, Jiling et al., "*Preparing substituted bridged metallocene complex for olefin*" XP002713532, retrieved from STN Database accession No. 2007:1133788 (Abstract).

Min. E., et al., "*Catalyst Site Epimerization during the Kinetic Resolution of Chiral α-Olefins by Polymerization*", American Chemical Society, Apr. 25, 2008, vol. 27, pp. 2179-2188.

Okuda, J., et al., "*Complexes of titanium and zirconium containing a tridentate linked amido-cyclopentadienyl ligand with a soft donor group: synthesis, structure, and ethylene polymerization catalysis*", Journal of Organometallic Chemistry, 1999, vol. 591, pp. 127-137.

Plooy, K., et al., "*Coordination Properties of Novel Tridentate Cyclopentadienyl Ligands in Titanium and Zirconium Complexes*", Organometallics, 1995, vol. 14, pp. 3129-3131.

Roesky, P., et al., "*Ancillary Ligand Effects on Organo-f-Element Reactivity. Ansa-Metallocenes with Bridge-Tethered Donors*", Organometallics, 1997, vol. 16, pp. 4705-4711.

Yoder, J., et al., "*Chain Epimerization during Propylene Polymerization with Metallocene Catalysts: Mechanistic Using a Doubly Labeled Propylene*", J. Am. Chem. Soc., 2002, vol. 124, pp. 2548-2555.

Ashe, A.J. III, et al., "The C8-Symmetric Aminoboranediyl-Bridged Zirconocene Dichloride [(n-9-C19H8)-BN(iPr)2(n-C5H4)]ZrC12: Its Synthesis, Structure, and Behavior as an Olefin Polymerization Catalyst," Organometallics, 2004, vol. 23, No. 9, pp. 2197-2200.

Dove, A.P. et al., "Cyclopentadienyl titanium hydroxylaminato complexes as highly active catalysts for the polymerization of propylene," Chem. Comm., 2005, pp. 2152-2154.

Dove, A.P. et al., "Propylene Polymerization with Cyclopentadienyltitanium(IV) Hydroxylaminato Complexes," Organometallics, 2009, vol. 28, pp. 405-412.

Flory, P.J., "Theory of Crystallization in Copolymers," Trans. Faraday Soc., 1955, vol. 51, pp. 848-857.

Nabika, M. et al., "ansa-Cyclopentadienyl-Phenoxy Titanium(IV) Complexes (PHENICS): Synthesis, Charaterization, and Catalytic Behavior in Olefin Polymerization," Organometallics, 2009, vol. 28, pp. 3785-3792.

Smolensky, E. et al., "Formation of Elastomeric Polypropylene Promoted by a Dynamic Octahedral Titanium Complex," Organometallics, 2005, vol. 24, No. 13, pp. 3255-3265.

Song, W. et al., "Disiloxane bridged indenyl metallocene catalysts for olefin polymerizations," Jrnl. of Organometallic Chemistry, vol. 501, 1995, pp. 375-380.

Braunschweig, H., et al., "Synthesis and structure of the first boron-bridged constrained geometry complexes," Chem. Commun., 2000, pp. 1049-1050.

\* cited by examiner

PROCESS OF PRODUCING POLYOLEFINS USING METALLOCENE POLYMERIZATION CATALYSTS AND COPOLYMERS THEREFROM

PRIORITY

This application claims priority to and the benefit of U.S. Ser. No. 61/810,894, filed Apr. 11, 2013.

FIELD OF THE INVENTION

The present invention relates in general to metallocene catalysts systems and olefin polymerization, and more particularly to a new type of metallocene catalyst compound and its use in producing polyolefin copolymers.

BACKGROUND OF THE INVENTION

Olefin copolymerization remains a significant challenge, despite the potential economic impact of incorporating of linear α-olefins (LAOs) with control over monomer sequence. It is well known in the art that single site catalyst compounds, in order to perform olefin polymerization, must be "activated", and that these catalyst compounds are typically activated by so called "activators" which are typically aluminum or boron-based compounds and typically act as a Lewis base. EP 0 277 004 A1 is one of the first documents disclosing polymerization catalysts comprising a bis-cyclopentadienyl metallocene compound that is activated by reaction with a secondary, ionic component comprising a non-coordinating anion (NCA) and a counter-cation. Further, M. A. Giardello, M. S. Eisen, Ch. L. Stern and T. J. Marks in 117, *J. Am. Chem. Soc., pp.* 12114-12129 (1995), report on the preparation of cationic polymerization catalysts from metallocene compounds, using various types of activators, including methylalumoxane (MAO) and NCA/cation pairs. While these activators are required for olefin polymerization, it is desirable to not only activate the single-site catalyst, but to manipulate its activity towards, for example, comonomer incorporation, activity, etc. Traditional activators alone do not always service this end.

Also, there are known instances of catalyst-based reactivity on the timescale of polyolefin chain propagation. Epimerization of enchained propylene monomers, for example, can occur at rates sufficient to alter the tacticity of the product polymer. See Yoder, J. C.; Bercaw, J. E., 124, *J. Am. Chem. Soc.*, pp. 2548-2555 (2002). Min, E. Y.-J.; Byers, J. A.; Bercaw, J. E., 27, *Organometallics*, pp. 2179-2188 (2008).

A multi-component approach to the problem or producing copolymers, referred to as "chain shuttling polymerization" requires two catalysts and a third agent to transport the growing chain between the two catalysts. See Arriola, D. J.; Carnahan, E. M.; Hustad, P. D.; Kuhlman, R. L.; Wenzel, T. T., 312, *Science*, pp. 714-719 (2006). A single catalyst solution to this problem would simplify implementation and commercialization.

A catalyst system that interconverts between two states that possess different reactivities, can produce an oscillating distribution along a polymer chain or within a bulk polymer sample, in this case, of comonomer incorporation. The rotational dynamics of metallocene systems have been investigated over the past twenty years as a potential fluxional catalyst system; in this approach, the instantaneous symmetry of the ligand set controls the stereochemistry of propylene insertion producing stereoblock polypropylene. Lewis basic additives have been used to modify catalyst activity, but no reports exist that describe their use to control distribution of comonomer along a polymer chain. This has been achieved previously in U.S. Ser. No. 13/623,263, filed on Sep. 20, 2012, in so called "dynamic modulation" of metallocenes, where the Lewis base additive can be added during normal polymerization to modulate the reactivity of the metallocene to the monomer and comonomer. Again, a single catalyst solution to this problem would simplify implementation and commercialization. Tethered-type metallocenes are disclosed by P. W. Roesky, C. L. Stem, and T. J. Marks in 16, *Organometallics*, pp. 4705-4711 (1997), but does not fully address the problem of producing ethylene-based block copolymers.

There is still a need in the art for new and improved catalyst systems for the polymerization of olefins, in order to achieve specific polymer properties, such as high melting point, high molecular weights, to increase conversion or comonomer incorporation, or to alter comonomer distribution without deteriorating the resulting polymer's properties. It is therefore an object of the present invention to provide a process and a catalyst system for use in a process for the polymerization of olefins, especially ethylene, wherein the resulting polymers have good melting points and comonomer distribution. Ideally, such catalyst system should also exhibit high catalytic activity under commercial polymerization conditions.

In another embodiment, it is an object of the present invention to provide a process and a catalyst system for use in a process for the polymerization of olefins, especially ethylene, to make block copolymers.

Additional references of interest include F. Amor et al.: *Journal of Organometallic Chemistry* 558 (1998) 139-146; WO 1997/14724; *Organometallics* 1998, 17, 5836-5849; *Organometallics* 1995, 14, 3129-3131; and *Journal of Organometallic Chemistry* 591 (1999) 127-137.

SUMMARY OF THE INVENTION

Described herein are ethylene copolymers, preferably ethylene copolymers, comprising ethylene and a $C_3$ to $C_{10}$ or $C_{20}$ α-olefin, wherein the copolymer has a DSC peak melting temperature, $T_m$, greater than the line represented by $T_m = 132 - (6.25 \cdot M\%)$, where M % is the mol % comonomer.

Also described herein is a process for producing (alternatively, to tailor comonomer distribution in) a polyolefin homopolymer or copolymer comprising contacting one or more olefins (preferably $C_2$ to $C_{20}$ olefins, preferably ethylene and one or more $C_3$ to $C_{20}$ (alternately $C_3$ to $C_{10}$) comonomers) with a catalyst system comprising (or consisting essentially of, or consisting of):

1) an activator; and
2) a catalyst compound represented by the formula:

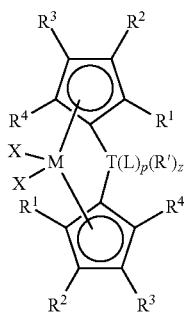

where M is a Group 4 transition metal; z is 0, 1, 2, 3, 4, 5, 6, 7, or 8 indicating the number of R' groups bound to the bridging group T, and p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, an aryl group, a substituted aryl group, or a heteroatom-containing group, provided that any adjacent $R^1$, $R^2$, $R^3$, and $R^4$ groups may form a fused ring or multicenter fused ring system where the rings may be aromatic, partially saturated or saturated;

each R' is, independently, hydrogen, a $C_1$ to $C_{10}$ alkyl group, a $C_6$ to $C_{24}$ aryl group, or a $C_7$ to $C_{40}$ alkylaryl group; and each L is a heteroatom or heteroatom-containing group bound to T.

Also described herein is a process for producing an olefin homopolymer or copolymer (or alternatively, to tailor comonomer distribution in an olefin copolymer) comprising contacting one or more olefins (preferably $C_2$ to $C_{20}$, alternately $C_2$ to $C_{10}$) monomers with a catalyst system comprising (or consisting essentially of, or consisting of):

1) an activator; and
2) a catalyst compound represented by the formula:
$(L)_p(R')_zT(Cp)(A)MX_2$ wherein Cp is a cyclopentadienyl ring substituted with 0, 1, 2, 3 or 4 substituent groups S", each substituent group S" being, independently, a radical group which is a hydrocarbyl, substituted-hydrocarbyl, or heteroatom radical or Cp is a cyclopentadienyl ring in which any two adjacent S" groups are joined forming a $C_4$ to $C_{20}$ ring to give a saturated or unsaturated polycyclic cyclopentadienyl ligand, such as substituted or unsubstituted indenyl or flourenyl, where A is bound to M and T, Cp is bound to M and T and L and R' are bound to T.

A is Cp or $JS'_{z^*-1-y}$, where $JS'_{z^*-1-y}$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; and $z^*$ is the coordination number of the element J, y is 0 or 1; and L, p, R', z, T, M and X are as defined above.

Also described herein is a process for producing olefin homopolymer or copolymer (alternatively, to tailor comonomer distribution in a polyolefin copolymer) comprising contacting one or more olefins (preferably $C_2$ to $C_{20}$ olefins, preferably ethylene and one or more $C_3$ to $C_{20}$, alternately $C_3$ to $C_{20}$, comonomers) with a catalyst system comprising (or consisting essentially of, or consisting of):

1) an activator; and
2) a catalyst compound represented by the formula:

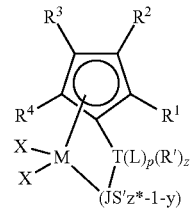

wherein J, S', $z^*$, y, L, p, $R^1$, $R^2$, $R^3$, $R^4$, R', z, T, M and X are as defined above.

Also described herein are catalyst compounds represented by the formulae above, where the catalyst compound has the features defined above. In any case, L can be represented by the formula:

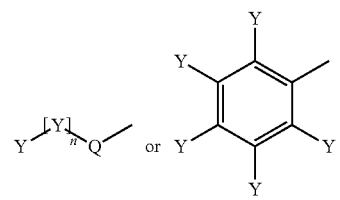

where the open bond is to T and Q is a divalent $C_1$ to $C_6$ hydrocarbyl linker group bound to T; each Y is independently a hydrogen, heteroatom, heteroatom-containing group, $C_1$ to $C_{10}$ hydrocarbyl, $C_2$ to $C_{12}$ substituted hydrocarbyl, $C_6$ to $C_{12}$ aryl, or $C_7$ to $C_{20}$ substituted aryl, provided that at least one Y in each formula is a heteroatom or heteroatom-containing group; and n is 0, 1, 2, 3, 4, 5 or 6.

DEFINITIONS

Figure 1:
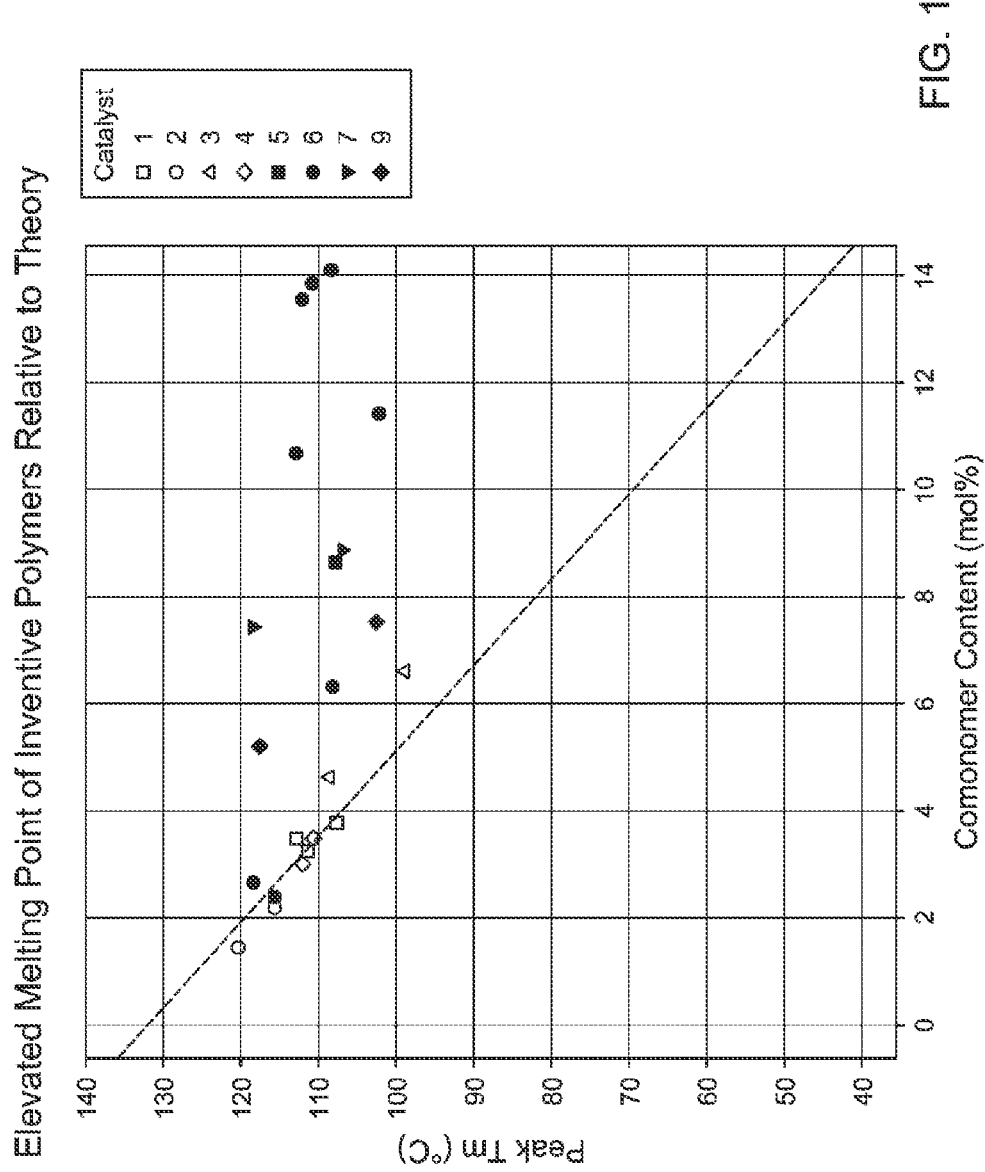
FIG. 1 depicts the theoretical melting point as a function of comonomer for a polyethylene copolymer (line) and the data points are the melting points of the various inventive example ethylene copolymers demonstrating the elevated melting point temperatures.

As used herein, the numbering scheme for the Periodic Table of the Elements groups is the new notation as set out in Chemical and Engineering News, 63(5), 27 (1985).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different", as used to refer to mer units, indicates that the mer units differ from each other by at least one atom or are different isomerically. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this invention, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, dme is 1,2-dimethoxyethane, and MAO is methylalumoxane.

DETAILED DESCRIPTION

The inventors have found unique metallocene catalyst compounds and processes of making a polyolefin homopolymer and/or copolymer using such catalyst compounds. In an embodiment the catalyst compound is represented by the formula: $(L)_p(R')_zT(Cp)(A)MX_2$ wherein:

Cp is a cyclopentadienyl ring substituted with 0, 1, 2, 3 or 4 substituent groups S", each substituent group S" being, independently, a radical group which is a hydrocarbyl, substituted-hydrocarbyl, or heteroatom or Cp is a cyclopentadienyl ring in which any two adjacent S" groups are joined forming a $C_4$ to $C_{20}$ ring to give a saturated or unsaturated polycyclic cyclopentadienyl ligand, such as substituted or unsubstituted indenyl or flourenyl (preferably S" is a substituted or unsubstituted alkyl or substituted or unsubstituted aryl group, preferably having 1 to 20 carbon atoms), where A is bound to M and T, Cp is bound to M and T and L and R' are bound to T;

M is a Group 4 transition metal (preferably Ti, Hf, Zr);

z is 0, 1, 2, 3, 4, 5, 6, 7, or 8 indicating the number of R' groups bound to the bridging group T, p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group;

each $R^1$, $R^2$, $R^3$, and $R^4$ is, independently, hydrogen, a hydrocarbyl group, a substituted hydrocarbyl group, an aryl group, a substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated;

each R' is, independently, hydrogen, a $C_1$ to $C_{10}$ alkyl group, a $C_6$ to $C_{24}$ aryl group, or a $C_7$ to $C_{40}$ alkylaryl group;

each L is a heteroatom or heteroatom-containing group bound to T;

A is Cp or $(JS'_{z*-1-y})$, where $JS'_{z*-1-y}$ is a heteroatom ligand in which J is an element from Group 15 of the Periodic Table of Elements with a coordination number of 3 or an element from Group 16 with a coordination number of 2 (preferably N, S, O or P, preferably N); S' is a radical group which is a hydrocarbyl, substituted hydrocarbyl, or heteroatom (such as a halogen, butyl, pentyl, hexyl, heptyl, octyl, nonyl, decyl undecyl, dodecyl, including isomers thereof such as cyclododecyl); and z* is the coordination number of the element J, and y is 0 or 1. Any of the compounds herein may have the bridging group, T, bound to the 5 membered cyclopentadienyl ring or if Cp is an indene or fluorene, the bridge may be bound to any of the 5 or 6 membered rings, but is most often bound to the 5 cyclopentadienyl membered ring.

In an embodiment of the invention $(JS'_{z*-1-y})$ is selected from the group consisting of methylamido, ethylamido, propylamido, butylamido, pentylamido, hexylamido, heptylamido, octylamido, nonylamido, decylamido, eicosylamido, heneicosylamido, docosylamido, tricosylamido, tetracosylamido, pentacosylamido, hexacosylamido, heptacosylamido, octacosylamido, nonacosylamido, triacontylamido, phenylamido, tolylamido, phenethylamido, benzylamido, cyclobutylamido, cyclopentylamido, cyclohexylamido, cycloheptylamido, cyclooctylamido, cyclononylamido, cyclodecylamido, cyclododecylamido, adamantylamido, norbomylamido, perfluorophenylamido, fluorophenylamido, difluorophenylamido, oxo, sulfido, methoxide, ethoxide, phenoxide, dimethylphenoxide, dipropylphenoxide, methylthio, ethylthio, phenylthio, dimethylphenylthio, and dipropylphenylthio.

In any formula described herein using the symbol Cp, the Cp may be selected from the "Cp, Cp*, CpR or $(C_5H_{5-y-x}S''_x)$" groups listed at pages 21-27 in Table A of EP 1 753 796.

In any formula described herein using the symbol $(JS'_{z*-1-y})$, the $(JS'_{z*-1-y})$ may be selected from the $(JS'_{z-1-y})$ groups listed at pages 26-27 in Table A of EP 1 753 796.

In any formula described herein using the symbol X, the X may be selected from the "$X_1$ or $X_2$" groups listed at pages 21-27 in Table A of EP 1 753 796 and if the X groups are joined together, then the X may be selected from the "$X_1$ and $X_2$" groups listed at page 27 in Table A of EP 1 753 796.

Preferably, the inventive polymers are made using a catalyst compound represented by the formula:

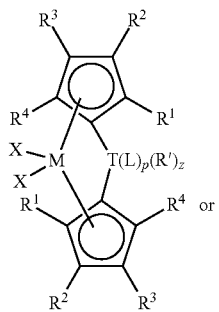

-continued

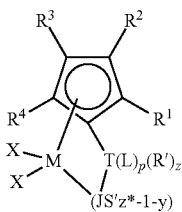

where M is a Group 4 transition metal (preferably Ti, Hf, or Zr); z is 0, 1, 2, 3, 4, 5, 6, 7, or 8 indicating the number of R' groups bound to the bridging group T, p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, an aryl group, a substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated; and each R' is, independently, hydrogen, a $C_1$ to $C_{10}$ alkyl group, a $C_6$ to $C_{24}$ aryl group, or a $C_7$ to $C_{40}$ alkylaryl group; and each L is a heteroatom or heteroatom-containing group bound to T;

$JS'_{z^*-1-y}$ is a heteroatom ligand in which J is an element from Group 15 of the Periodic Table of Elements with a coordination number of 3 or an element from Group 16 with a coordination number of 2 (preferably N, S, O or P, preferably N); S' is a radical group which is a hydrocarbyl, substituted hydrocarbyl, or heteroatom (such as a halogen, butyl, pentyl, hexyl, heptyl, octyl, nonyl, decyl undecyl, dodecyl, including isomers thereof such as cyclododecyl); and z* is the coordination number of the element J, and y is 0 or 1.

The $R^1$, $R^2$, $R^3$, and $R^4$ groups are, preferably, selected from C1 to C6 alkyls or C6 to C12 aryls, or adjacent groups may form an aromatic ring which may be substituted by one or more C1 to C6 alkyls. The metal "M" is preferably zirconium or hafnium, most preferably hafnium. The "T" group is preferably a C1 to C4 divalent alkyl, or a silicon or germanium.

A "hydrocarbyl" is a radical (at least single radical) made of carbon and hydrogen. A "substituted hydrocarbyl" is a radical made of carbon and hydrogen where at least one hydrogen is replaced by another hydrocarbyl group, which itself may be linear or branched. A "heteroatom-containing hydrocarbyl" is a hydrocarbyl that includes at least one "heteroatom", or atom that is not hydrogen or carbon, preferably wherein the heteroatom is selected from silicon (e.g., silane, siloxane, etc.), oxygen (e.g., —O—, or hydroxyl, carboxyl), sulfur (e.g., —S— or thiol, sulfate), nitrogen (e.g., —N— or amine, imine), phosphorous, halogen or perhalogenated hydrocarbon), and other atoms such as aluminum, boron, germanium, titanium, etc.

As used herein, the "L" group, is a chemical moiety bound to the bridging group "T" and comprising at least one heteroatom or heteroatom-containing group. Examples of the "L" group are described further herein, and preferably is represented by the formula:

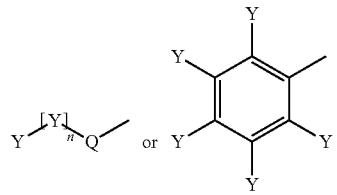

where the open bond is to T and Q is a divalent $C_1$ to $C_6$ hydrocarbyl linker group bound to T; where the open bond is to T and Q is a divalent $C_1$ to $C_6$ hydrocarbyl linker group bound to T; each Y is independently a hydrogen, heteroatom, heteroatom-containing group, $C_1$ to $C_{10}$ hydrocarbyl, $C_2$ to $C_{12}$ substituted hydrocarbyl, $C_6$ to $C_{12}$ aryl, or $C_7$ to $C_{20}$ substituted aryl, provided that at least one Y in each formula is a heteroatom or heteroatom-containing group; and n is 0, 1, 2, 3, 4, 5 or 6. The heteroatom, or heteroatom-containing group is preferably selected from oxygen (e.g., —O—, or hydroxyl, carboxyl), sulfur (e.g., —S— or thiol, sulfate), nitrogen (e.g., —N— or amine, imine), phosphorous, halogen or perhalogenated hydrocarbon). Alternately, at least two Y in the above formulae are a heteroatom or heteroatom-containing group. Alternately, at least three Y in the above formulae are a heteroatom or heteroatom-containing group. Alternately, at least four Y in the above formulae are a heteroatom or heteroatom-containing group.

More preferably, L is a radical bound to "T" comprising perfluoroethyl, perfluorobutyl, perfluoropentyl, perfluorohexyl, nonafluorohexyl, pentafluorophenyl, 2-fluorophenyl, 2,6-difluorophenyl, 2,4,6-trifluorophenyl, 2-dimethylaminophenyl, 2,3-bis(dimethylamino)phenyl, 2,4-bis(dimethylamino)phenyl, 2,5-bis(dimethylamino)phenyl, 2,6-bis(dimethylamino)phenyl, 2,4,6-tris(dimethylamino)phenyl, 2-diethylaminophenyl, 2,3-bis(diethylamino)phenyl, 2,4-bis(diethylamino)phenyl, 2,5-bis(diethylamino)phenyl, 2,6-bis(diethylamino)phenyl, 2,4,6-tris(diethylamino)phenyl, 2-diisopropylaminophenyl, 2,3-bis(diisopropylamino)phenyl, 2,4-bis(diisopropylamino)phenyl, 2,5-bis(diisopropylamino)phenyl, 2,6-bis(diisopropylamino)phenyl, 2,4,6-tris(diisopropylamino)phenyl, 2-dimethylphosphinophenyl, 2,3-bis(dimethylphosphino)phenyl, 2,4-bis(dimethylphosphino)phenyl, 2,5-bis(dimethylphosphino)phenyl, 2,6-bis(dimethylphosphino)phenyl, 2,4,6-tris(dimethylphosphino)phenyl, 2-diethylphosphinophenyl, 2,3-bis(diethylphosphino)phenyl, 2,4-bis(diethylphosphino)phenyl, 2,5-bis(diethylphosphino)phenyl, 2,6-bis(diethylphosphino)phenyl, 2,4,6-tris(diethylphosphino)phenyl, 2-diisopropylphosphinophenyl, 2,3-bis(diisopropylphosphino)phenyl, 2,4-bis(diisopropylphosphino)phenyl, 2,5-bis(diisopropylphosphino)phenyl, 2,6-bis(diisopropylphosphino)phenyl, 2,4,6-tris(diisopropylphosphino)phenyl, 2-hydroxyphenyl, 2,3-dihydroxyphenyl, 2,4-dihydroxyphenyl, 2,5-dihydroxyphenyl, 2,6-dihydroxyphenyl, 2,4,6-trihydroxylphenyl, 2,3,5,6-tetrahydroxyphenyl, 2,3,4,5,6-pentahydroxyphenyl, 2-methoxyphenyl, 2-methoxy-5-fluorophenyl, 2,3-dimethoxyphenyl, 2,4-dimethoxyphenyl, 2,5-dimethoxyphenyl, 2,6-dimethoxyphenyl, 2,4,6- trimethoxylphenyl, 2,3,5,6-tetramethoxyphenyl, 2,3,4,5,6-pentamethoxyphenyl, 2-ethoxyphenyl, 2-ethoxy-5-fluorophenyl, 2,3-diethoxyphenyl, 2,4-diethoxyphenyl, 2,5-diethoxyphenyl, 2,6-diethoxyphenyl, 2,4,6-triethoxyphenyl, 2,3,5,6-tetrathoxyphenyl, 2,3,4,5,6-pentaethoxyphenyl, 2-isopropoxyphenyl, 2-isopropoxy-5-fluorophenyl, 2,3-diisopropoxyphenyl, 2,4-diisopropoxyphenyl, 2,5-diisopropoxyphenyl, 2,6-diisopropoxyphenyl, 2,4,6-triisopropoxylphenyl, 2,3,5,6-tetraisoproxyphenyl, 2,3,4,5,6-pentaisopropoxyphenyl, 2-methylthiophenyl, 2-methylthio-5-fluorophenyl, 2,3-dimethylthiophenyl, 2,4-dimethylthiophenyl, 2,5-dimethylthiophenyl, 2,6-dimethylthiophenyl, 2,4,6-trimethylthiolphenyl, 2,3,5,6-tetramethylthiophenyl, 2,3,4,5,6-pentamethylthiophenyl, 2-ethylthiophenyl, 2-ethylthio-5-fluorophenyl, 2,3-diethylthiophenyl, 2,4-diethylthiophenyl, 2,5-diethylthiophenyl, 2,6-diethylthiophenyl, 2,4,6-triethylthiolphenyl, 2,3,5,6-tetraethylthiophenyl, 2,3,4,5,6-pentaethylthiophenyl, 2-isopropylthiophenyl, 2-isopropylthio-5-fluorophenyl, 2,3-dimthylthiophenyl, 2,4-diisopropylthiophenyl, 2,5-diisopropylthiophenyl, 2,6-diisopropylthiophenyl, 2,4,6-triisopropylthiolphenyl, 2,3,5,6-tetraisopropylthiophenyl, 2,3,4,5,6-pentaisopropylthiophenyl, 2-tert-butylthiophenyl, 2-tert-butylthio-5-fluorophenyl, 2,3-dimthylthiophenyl, 2,4-ditert-butylthiophenyl, 2,5-ditert-butylthiophenyl, 2,6-ditert-butylthiophenyl, 2,4,6-tritert-butylthiolphenyl, 2,3,5,6-tetratert-butylthiophenyl, 2,3,4,5,6-pentatert-butylthiophenyl, dimethylaminomethyl, diethylaminomethyl, di-n-propylaminomethyl, di-isopropylaminomethyl, diphenylaminomethyl, 2-dimethylaminoethyl, 2-diethylaminoethyl, 2-di-n-propylaminoethyl, 2-di-iso-propylaminoethyl, 2-diphenylaminoethyl, 3-dimethylaminopropyl, 3-diethylaminopropyl, 3-di-n-propylaminopropyl, 3-di-isopropylaminopropyl, 3-diphenylaminopropyl, 4-dimethylaminobutyl, 4-diethylaminobutyl, 4-di-n-propylaminobutyl, 4-di-iso-propylaminobutyl, 4-diphenylaminobutyl, dimethylphosphinomethyl, diethylphosphinomethyl, di-n-propylphosphinomethyl, di-isopropylphosphinomethyl, diphenylphosphinomethyl, 2-dimethylphosphinoethyl, 2-diethylphosphinoethyl, 2-di-n-propylphosphinoethyl, 2-di-iso-propylphosphinoethyl, 2-diphenylphosphinoethyl, 3-dimethylphosphinopropyl, 3-diethylphosphinopropyl, 3-di-n-propylphosphinopropyl, 3-di-isopropylphosphinopropyl, 3-diphenylphosphinopropyl, 4-dimethylphosphinobutyl, 4-diethylphosphinobutyl, 4-di-n-propylphosphinobutyl, 4-di-iso-propylphosphinobutyl, 4-diphenylphosphinobutyl, methoxymethyl, ethyoxymethyl, propoxymethyl, isopropoxymethyl, tert-butoxymethyl, phenoxymethyl 2-methoxyethyl, 2-ethoxyethyl, 2-propoxyethyl, 2-isopropoxyethyl, 2-tert-butoxyethyl, 2-phenoxyethyl, 3-methoxypropyl, 3-ethoxypropyl, 3-n-propoxypropyl, 3-isopropoxypropyl, 3-diphenoxypropyl, 4-methoxybutyl, 4-ethyoxybutyl, 4-n-propoxybutyl, 4-isopropoxybutyl, 4-phenoxybutyl, methylthiomethyl, ethylthiomethyl, propylthiomethyl, isopropylthiomethyl, tert-butylthiomethyl, phenylthiomethyl, 2-methylthioethyl, 2-methylthioethyl, 2-propylthioethyl, 2-isopropylthioethyl, 2-tert-butylthioethyl, 2-phenylthioethyl, 3-methylthiopropyl, 3-ethylthiopropyl, 3-n-propylthiopropyl, 3-isoprylthiopropyl, 3-diphenylthiopropyl, 4-methylthiobutyl, 4-ethylthiobutyl, 4-n-propylthiobutyl, 4-isopylthiobutyl, 4-phenylthiobutyl, 2-dimethylphosphinophenyl, 2-diphenylphosphinophenyl, 2-dicyclohexylphosphinophenyl, 2-pyridyl, 3-pyridyl, 4-pyridyl, 2-(4-dimethylaminopyridyl), 3-(4-dimethylaminopyridyl), 4-(4-dimethylaminopyridyl), 2-pyrimidyl, 4-pyrimidyl, 5-pyrimidyl, 6-pyrimidyl, 2-quinolyl, 2-isoquinolyl, 2-tetrahydroisoquinolyl, 4-acridinyl, or 4-(5-methylacridinyl) (for convenience herein, this list of L radicals may be referred to as the "L-list".

Useful (JS'z*-1-y) groups include t-butylamido, phenylamido, n-butylamido, cyclohexylamido, perfluorophenylamido, methylamido, isopropylamido, benzylamido, decylamido, cyclododecylamido, cyclooctylamido, and the like.

More preferably, the inventive metallocene catalyst compound is represented by one or more of the formulae:

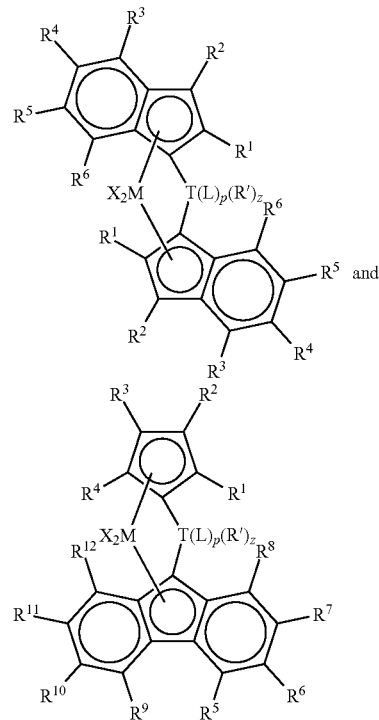

where M is a Group 4 transition metal, preferably zirconium or hafnium, most preferably hafnium; z is 0, 1, 2, 3, 4, 5, 6, 7 or 8 indicating the number of R' groups bound to the bridging group T, and p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups, such as a C1 to C4 divalent alkyl, or a silicon or germanium;

each $R^1$ to $R^{12}$ is, independently hydrogen, a hydrocarbyl group, substituted hydrocarbyl group, aryl group, substituted aryl group, or a heteroatom-containing group; and each R' is, independently, hydrogen, a $C_1$ to $C_{10}$ alkyl group, $C_6$ to $C_{24}$ aryl group, $C_7$ to $C_{40}$ alkylaryl group; and each L is a heteroatom or heteroatom-containing group bound to T as described herein.

Most preferably, each of $R^1$, $R^2$, $R^3$, $R^4$, $R^5$, $R^6$, $R^7$, $R^8$, $R^9$, $R^{10}$, $R^{11}$, and $R^{12}$ is selected from hydrogen, methyl, ethyl, propyl, isopropyl, sec-butyl, butyl, isobutyl, tertiary-butyl, hexyl, cyclohexyl, phenyl, or a combination thereof. Optionally, adjacent groups can form a 4-, 5-, 6- or 7-member saturated or unsaturated ring. In an embodiment of the invention, all $R^1$ to $R^{12}$ groups are hydrogen.

In any of the metallocene structures above, X is preferably selected from the group consisting of hydrocarbyl radicals having from 1 to 10 carbon atoms and halides, and preferably, X is selected from hydrogen, methyl, ethyl, phenyl, chloride, bromide, fluoride, or combinations thereof.

In an embodiment of the invention, z is 0, 1, 2, or 3 and p is 1, 2 or 3. In an embodiment of the invention, z is 0, 1, 2, or 3, p is 1, 2, or 3, and T is a C1 or C2 divalent alkyl, Si or Ge. In an embodiment of the invention, z is 0 or 1, p is 1 or 2, and T is Si.

In an embodiment of the invention, T comprises Si, Ge, C, B, S, N, O, and or Se. In any of the metallocene structures above, $T(L)_p(R')_z$ is preferably represented by one or more groups: $R'_2C$, $R'_2Si$, $R'_2Ge$, $R'C=CR'$ $R'C=CR'_2CR'$, $R'C=CR'_2CR'_2CR'$, $R'C=CR'$, $R'C=CCR'_2$, $R'C=CR'=CCR'_2$, $R'C=CR'CR'=CR'$, $R'C=CR'CR'_2CR'_2$, $R'C=SiR'$, $R'_2SiSiR'_2$, $RC=SiR'_2CR'$, $R'Si=CR'_2SiR'$, $R'C=CSiR'_2$, $R'_2C=GeR'_2$, $R'_2Ge=GeR'_2$, $R'_2C=GeR'_2CR'_2$, $R'_2Ge=CR'_2GeR'_2$, $R'_2Si=GeR'_2$, $R'C=CR'GeR'_2$, $R'B$, $R'_2C-BR'$, $R'_2C-BR'-CR'_2$, $R'_2C-O-CR'_2$, $R'_2CR'_2C-O-CR'_2CR'_2$, $R'_2C-O-CR'_2CR'_2$, $R'_2C-O-CR'=CR'$, $R'_2C-S-CR'_2$, $R'_2CR'_2C-S-CR'_2CR'_2$, $R'_2C-S-CR'_2CR'_2$, $R'_2C-S-CR'=CR'$, $R'_2C-Se-CR'_2$, $R'_2CR'_2C-Se-CR'_2CR'_2$, $R'_2C-Se-CR'_2CR'_2$, $R'_2C-Se-CR'=CR'$, $R'_2C-N=CR'$, $R'_2C-NR'-CR'_2$, $R'_2C-NR'-CR'_2CR'_2$, $R'_2C-NR'-CR'=CR'$, $R'_2CR'_2C-NR'-CR'_2CR'_2$, $R'_2C-P=CR'$, and $R'_2C-PR'-CR'_2$, where R' is hydrogen or a $C_1$ to $C_{20}$ (preferably $C_1$ to $C_8$) containing hydrocarbyl, substituted hydrocarbyl, halocarbyl, substituted halocarbyl, aryl, substituted aryl, silylcarbyl or germylcarbyl substituent and optionally two or more adjacent R' may join to form a substituted or unsubstituted, saturated, partially unsaturated or aromatic, cyclic or polycyclic substituent; provided that at least one (alternately one, two or three, preferably one or two) of the R' groups is replaced by an L, where L is a heteroatom or heteroatom-containing group. Most preferably, $T(L)_p(R')_z$ is selected from C(L)H, C(L)HCH$_2$, C(L)CH$_3$, Si(L)CH$_3$, Si(L)Ph, Si(L)CH$_3$, C(L)Ph; and additionally can be cyclic structures such as carbocycles $C(CR_2)_n(L)$ and $C(CR_2)_n(CRL)$, or silylcycles $Si(CR^2)_n(L)$ and $Si(CR)_n(CRL)$, where R is hydrogen or a $C_1$ to $C_{20}$ (preferably $C_1$ to $C_8$) containing hydrocarbyl or substituted hydrocarbyl, L is a heteroatom or heteroatom-containing group, and n is 1, 2, 3 or 4. These latter structures, which may have open valences anywhere along the chain, may be represented, for example, by:

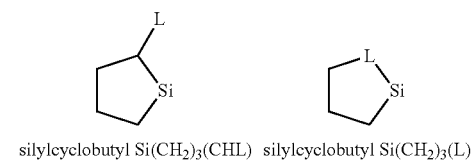

silylcyclobutyl Si(CH$_2$)$_3$(CHL)    silylcyclobutyl Si(CH$_2$)$_3$(L)

Particularly useful catalyst compounds include: (2-methoxyphenyl)(methyl)silyl(tetramethylcyclopentadienyl)(dodecylamido)titanium dimethyl, (2-methoxyphenyl)(methyl)silyl(tetramethylcyclopentadienyl)(dodecylamido) zirconium dimethyl, (2-methoxyphenyl)(methyl)silyl (tetramethylcyclopentadienyl)(dodecylamido)hafnium dimethyl, (phenoxypropyl)(methyl)silyl(tetramethylcyclopentadienyl)(dodecylamido)hafnium dimethyl, (phenoxypropyl)(methyl)silyl(tetramethylcyclopentadienyl)(dodecylamido)zirconium dimethyl, (phenoxypropyl)(methyl)silyl (tetramethylcyclopentadienyl)(dodecylamido)titanium dimethyl, (dimethylaminophenyl)(methyl)silyl(tetramethylcyclopentadienyl)(dodecylamido)hafnium dimethyl, (dimethylaminophenyl)(methyl)silyl(tetramethylcyclopentadienyl)(dodecylamido)zirconium dimethyl, (dimethylaminophenyl)(methyl)silyl(tetramethylcyclopentadienyl)(dodecylamido)titanium dimethyl, rac-(2-methoxyphenyl)(methyl)silyl-bis(indenyl)hafnium dimethyl, rac-(2-dimethylaminophenyl)(methyl)silyl-bis(indenyl)hafnium dimethyl, rac-(phenoxypropyl)(methyl)silyl-bis(indenyl) hafnium dimethyl, rac-(nonafluorohexyl)(methyl)silyl-bis (indenyl)hafnium dimethyl, (2-methoxyphenyl)(methyl)silyl(2,7-di-tert-butylfluorenyl)(cyclopentadienyl)zirconium dimethyl, (2-methoxyphenyl)(methyl)silyl(2,7-di-tert-butylfluorenyl)(cyclopentadienyl)hafnium dimethyl, (2-dimethylaminophenyl)(methyl)silyl(2,7-di-t-butylfluorenyl)(cyclopentadienyl)hafnium dimethyl, (2-methoxyphenyl)(methyl)silyl(2,3,4,5-tetramethylcyclopentadienyl)(indenyl) zirconium dimethyl, (2-methoxyphenyl)(methyl)silyl(2,3,4, 5-tetramethylcyclopentadienyl)(indenyl)hafnium dimethyl, rac-bis(3-phenoxypropyl)silyl bis(indenyl)hafnium dimethyl, rac-(2,5-dimethoxyphenyl)(methyl)silyl-bis(indenyl) hafnium dimethyl, rac-(2,6-dimethoxyphenyl)(methyl)silyl-bis(indenyl)hafnium dimethyl, rac-(2,3-dimethoxyphenyl) (methyl)silyl-bis(indenyl)hafnium dimethyl, and the dichloride, dibromide, diiodide, di-C3 to C12 alkyl or aryl analogs thereof, particularly the dichloride, dibromide, and diphenyl analogs thereof.

The inventive catalyst compounds can be made using conventional synthesis steps, and are desirably made stepwise, by starting first with the "L" group, having a bridging group such as a silyl attached thereto or attaching such a group to form the L and T groups. This is followed by attaching the desired cyclopentadienyl-group or group isolobal to such group (e.g., indenyl), then deprotonating each cyclopentadienyl-group, followed by chelation to the desired transition metal and finally addition of the desired "leaving group" X. The synthesis of various preferred examples are set forth herein.

As is known in the art, single site catalysts such as the metallocenes described herein are preferably used for olefin polymerization in conjunction with at least one "activator" compound. Preferably, the inventive catalyst compound is part of an olefin polymerization catalyst system further comprising an activator. Preferably, no more than one olefin polymerization catalyst is present in the catalyst system. The activator may be any desirable activator compound known in the art, especially boron- and/or aluminum-based compounds as is known. For example, the activator can comprise alumoxane such as methylalumoxane and other aluminum-type activators of single-site catalysts. When alumoxane is the activator of the inventive catalyst compound it may be present in a molar ratio of aluminum to catalyst compound transition metal within the range from 1:1 to 10:1 or 100:1.

The activator may comprise a so-called "non-coordinating" anion activator as is known in the art. Desirably, this activator may be represented by the formula:

$(Z)_d^+(Ar_d^-)$ wherein Z is (Lb-H) or a reducible Lewis Acid, Lb is a neutral Lewis base; H is hydrogen; (Lb-H)+ is a Bronsted acid; $Ar_d^-$ is non-coordinating anion having the charge d−; and d is an integer from 1 to 3. More preferably, the activator is represented by the same formula, wherein $Ar^{d-}$ is a non-coordinating anion having the charge d−; d is an integer from 1 to 3; and Z is a reducible Lewis acid represented by the formula: ($Ar_3C+$), where Ar is aryl or aryl substituted with a heteroatom, a $C_1$ to $C_8$ or $C_{20}$ or $C_{40}$ hydrocarbyl, or a substituted $C_1$ to $C_{40}$ hydrocarbyl. In any case, when such non-coordinating activators are used in conjunction with the inventive catalyst compound, it may be present in a molar ratio of boron to catalyst compound transition metal within the range from 0.9:1 or 1:1 to 2:1 or 10:1.

The non-coordinating activator may preferably be selected from one or more of (where "Me" is methyl): N,N-dimethylanilinium tetrakis(pentafluorophenyl)borate; triphenylcarbenium tetrakis(pentafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl) ammonium tetrakis(perfluoronaphthyl)borate; tri(t-butyl) ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis(perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium)tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis(perfluorobiphenyl)borate; [4-t-butyl-PhNMe2H][(C6F3(C6F5)2)4B]; trimethylammonium tetraphenylborate; triethylammonium tetraphenylborate; tripropylammonium tetraphenylborate; tri(n-butyl)ammonium tetraphenylborate; tri(t-butyl)ammonium tetraphenylborate; N,N-dimethylanilinium tetraphenylborate; N,N-diethylanilinium tetraphenylborate; N,N-dimethyl-(2,4,6-trimethylanilinium)tetraphenylborate; tropillium tetraphenylborate; triphenylcarbenium tetraphenylborate; triphenylphosphonium tetraphenylborate; triethylsilylium tetraphenylborate; benzene(diazonium)tetraphenylborate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium)tetrakis(pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium)tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(t-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyl)borate; N,N-dimethyl-(2,4,6-trimethylanilinium)tetrakis-(2,3,4,6-tetrafluorophenyl) borate; tropillium tetrakis-(2,3,4,6-tetrafluorophenyl)borate; triphenylcarbenium tetrakis-(2,3,4,6-tetrafluorophenyl)borate; triphenylphosphonium tetrakis-(2,3,4,6-tetrafluorophenyl)borate; triethylsilylium tetrakis-(2,3,4,6-tetrafluorophenyl)borate; benzene(diazonium)tetrakis-(2,3,4,6-tetrafluorophenyl)borate; trimethylammonium tetrakis(3,5-bis(trifluoromethyl)phenyl)borate; triethylammonium tetrakis(3,5-bis(trifluoromethyl)phenyl)borate; tripropylammonium tetrakis(3,5-bis(trifluoromethyl)phenyl)borate; tri (n-butyl)ammonium tetrakis(3,5-bis(trifluoromethyl)phenyl)borate; tri(t-butyl)ammonium tetrakis(3,5-bis(trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium)tetrakis(3,5-bis(trifluoromethyl)phenyl)borate; tropillium tetrakis(3,5-bis(trifluoromethyl)phenyl)borate; triphenylcarbenium tetrakis(3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl)phenyl)borate; benzene(diazonium)tetrakis(3,5-bis(trifluoromethyl)phenyl)borate; di-(i-propyl)ammonium tetrakis(pentafluorophenyl)borate; dicyclohexylammonium tetrakis(pentafluorophenyl)borate; tri(o-tolyl)phosphonium tetrakis(pentafluorophenyl)borate; tri(2,6-dimethylphenyl)phosphonium tetrakis(pentafluorophenyl)borate; triphenylcarbenium tetrakis(perfluorophenyl)borate; 1-(4-(tris(pentafluorophenyl)borate)-2,3,5,6-tetrafluorophenyl)pyrrolidinium; tetrakis(pentafluorophenyl)borate; 4-(tris(pentafluorophenyl)borate)-2,3,5,6-tetrafluoropyridine; and triphenylcarbenium tetrakis(3,5-bis(trifluoromethyl)phenyl)borate).

The invention also includes a process for producing a polyolefin copolymer, especially an ethylene copolymer and preferably an ethylene copolymer, comprising contacting ethylene and one or more $C_3$ to $C_{10}$ or $C_{20}$ comonomers with a catalyst system comprising (or consisting essentially of, or consisting of) an activator; and the metallocene catalyst compound represented by the formulae above. Alternatively, the process can be described as a process to tailor comonomer distribution in a polyolefin to produce a copolymer. As used herein, the term "comonomer" is used interchangeably in reference to independent α-olefin molecules and those molecules as they are incorporated into a polymer chain, otherwise known as "comonomer-derived units". Most preferably the comonomers are selected from propylene, 1-butene, 1-pentene, 1-hexene, 1-heptene, 1-octene, 1-nonene, 1-decene, 1-undecene, 1-dodecene and isomers thereof; and most preferably propylene, 1-hexene or 1-octene.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst is in granular form as solid particles (not dissolved in the diluent). This is particularly the case when the catalyst compound, activator, or both are supported separately or together as is known in the art.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents. Preferably, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferably, the copolymer is produced in a single reactor, most preferably in a single reactor in a single stage of polymerization. This means that, for example, throughout the polymerization process, when the catalyst component contacts the ethylene and comonomer, that the reaction conditions remain substantially the same, that is, do not fluctuate (temperature, pressure, concentrations of additives) by no more than 20 or 10 or 5 or 2% from their starting value when the polymerization began, except for the depletion of ethylene and any comonomer present such as in a batch process where ethylene and comonomer are not continuously added or otherwise replenished. Thus, the preferred inventive copolymers are single stage/reactor copolymers having the properties described herein.

The activity of the catalyst compound is preferably at least 20,000 g polymer/mmol catalyst/hour, preferably 50,000 or more g/mmol/hour, or within the range of from 20,000 or 50,000 g/mmol/hr to 100,000 or 200,000 or 400,000 or 600,000 or 800,000 g/mmol/hr. Also, the conversion of olefin monomer may be at least 10%, based upon polymer yield and the weight of the monomer entering the reaction zone, preferably 20% or more, preferably 30% or more, preferably 50% or more, preferably 80% or more.

Preferred polymerizations can be run at any temperature and/or pressure suitable to obtain the desired polymers. Typical temperatures and/or pressures include a temperature in the range of from 0° C. to 300° C., preferably 20° C. to 200° C., preferably 35° C. to 150° C., preferably from 40° C. to 120° C., preferably from 45° C. to 80° C.; and at a pressure in the range of from 0.35 MPa to 10 MPa, preferably from 0.45 MPa to 6 MPa, or preferably from 0.5 MPa to 4 MPa. In a typical polymerization, the run time of the reaction is up to 300 minutes, preferably in the range of from 5 to 250 minutes, or preferably from 10 to 120 minutes.

Preferably, little or no scavenger is used in the process to produce the ethylene copolymer. Preferably, scavenger (such as trialkyl aluminum) is present at zero mol %, alternately the scavenger is present at a molar ratio of scavenger metal to transition metal of less than 100:1, preferably less than 50:1, preferably less than 15:1, preferably less than 10:1. Also, hydrogen may be present in the polymerization reactor at a partial pressure of 0.001 psig to 50 psig (0.007 kPa to 345 kPa), preferably from 0.01 psig to 25 psig (0.07 kPa to 172 kPa), more preferably 0.1 psig to 10 psig (0.7 kPa to 70 kPa).

A "reaction zone," also referred to as a "polymerization zone," is a location in a vessel, or is a vessel, where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Desirably, the polymerization conditions are such that the end result is an ethylene copolymer. The inventive process includes obtaining copolymer having a DSC peak melting temperature, $T_m$, greater than the line represented by $T_m=132-(6.25 \cdot M\%)$, where M % is the mol % comonomer. The equation "$T_m=132-(6.25 \cdot X)$" represents the peak melting point temperature of an ethylene copolymer having a level of comonomer (esp. propylene, hexene or octene) incorporation into a forming ethylene polymer that is completely random. Having a Tm above this line is consistent with non-random distribution of comonomer incorporation either along a single polymer chain, or in the bulk polymer sample.

Crystallization Elution Fractionation (CEF) of a polymer is an indication of the crystallinity and number of polymer chains in a "polymer" sample, which, as is known in the art, is actually a collection of polymer chains which may vary somewhat in size, comonomer incorporation and other properties. Desirably, the process herein generates ethylene copolymers, especially ethylene-propylene, ethylene-hexene or ethylene-octene, wherein one, two or three CEF elution peaks are exhibited below 90 or 110° C., and no CEF elution is exhibited above 90 or 110° C. Preferably, a single CEF elution peaks occurs within a range of from 60 or 70° C. to 100 or 110° C. This is accomplished, preferably, where no more than one olefin polymerization catalyst is present in the catalyst system. Preferably, the inventive copolymers have a DSC peak Tm of within the range from 100 or 105 or 110° C. to 120 or 125 or 130° C. Also, the inventive copolymer preferably has a molecular weight distribution (Mw/Mn), within the range of from 1.5 or 1.8 to 2.2 or 2.5 or 2.0 or 4.0 or 5.0.

Most preferably, the inventive process comprises producing an ethylene copolymer having within the range from 0.2 or 0.4 mol % comonomer to 15 or 18 or 20 mol % comonomer and a DSC peak Tm of within the range from 100 or 105 or 110° C. to 120 or 125 or 130° C., and no CEF elution peaks above 90 or 110° C.

While the molecular weight of the polymers produced herein is influenced by reactor conditions including temperature, monomer concentration and pressure, the presence of chain terminating agents and the like, the homopolymer and copolymer products produced by the present process may have an Mw of about 1,000 to about 2,000,000 g/mol, alternately of about 10,000 to about 1,500,000 g/mol, alternately of about 30,000 to about 1,250,000 g/mol, or alternately of about 75,000 to about 1,000,000 g/mol, alternately of about 100,000 to about 600,000 g/mol as determined by GPC. Preferred polymers produced here may be homopolymers or copolymers. In a preferred embodiment, the comonomer(s) are present at up to 50 mol %, preferably from 0.01 to 40 mol %, preferably 1 to 30 mol %, preferably from 5 to 20 mol %. Now, having described the inventive copolymer, process, and catalyst component useful in the process, described herein in numbered embodiments is:

1. An ethylene copolymer comprising ethylene and a $C_3$ to $C_{10}$ or $C_{20}$ α-olefin, wherein the copolymer having a DSC peak melting temperature, $T_m$, greater than the line represented by $T_m = 132 - (6.25 \cdot M\%)$, where M % is the mol % comonomer.
2. The copolymer of numbered embodiment 1, wherein one, two or three CEF elution peaks are exhibited below 90 or 110° C., and no CEF elution peak is exhibited above 110° C.
3. The copolymer of numbered embodiments 1 or 2, wherein a single CEF elution peak occurs within a range of from 60 or 70° C. to 100 or 110° C.
4. The copolymer of any one of the previous numbered embodiments, made by a process comprising contacting ethylene and one or more $C_3$ to $C_{10}$ or $C_{20}$ comonomers; with a catalyst system comprising (or consisting essentially of, or consisting of):
    1) an activator; and
    2) a catalyst compound represented by the formula:

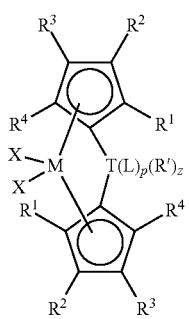

where M is a Group 4 transition metal; z is 0, 1, 2, 3, 4, 5, 6, 7, or 8 indicating the number of R' groups bound to the bridging group T, and p is 1, 2 or 3 indicating the number of L groups bound to the bridging group T;
each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;
T is a bridging group bound to each of the cyclopentadienyl groups, or groups isolobal to cyclopentadienyl;
each $R^1$, $R^2$, $R^3$, and $R^4$ is, independently, hydrogen, a hydrocarbyl group, a substituted hydrocarbyl group, aryl group, substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated; and
each R' is, independently, hydrogen, a $C_1$ to $C_{10}$ alkyl group, a $C_6$ to $C_{24}$ aryl group, or a $C_7$ to $C_{40}$ alkylaryl group; and
each L is a heteroatom or heteroatom-containing group bound to T.
5. The process of numbered embodiment 4, wherein the metallocene catalyst compound represented by the formula:

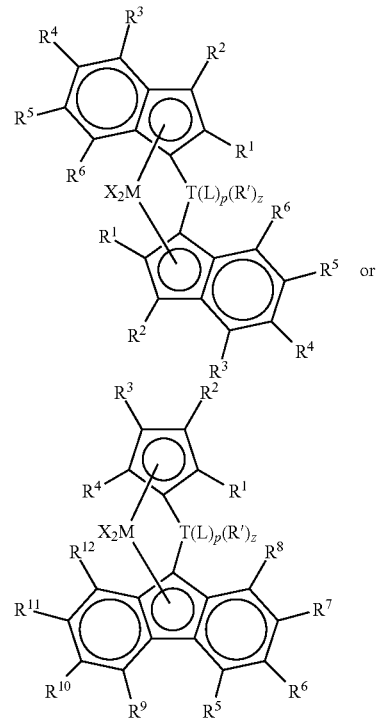

where each $R^1$ to $R^{12}$ is, independently hydrogen, a hydrocarbyl group, substituted hydrocarbyl group, aryl group, substituted aryl group, or a heteroatom-containing group, and M, T, L, R', p, z and X are as described in numbered embodiment 4.
6. The process numbered embodiment 4 or 5, wherein L is represented by the formula:

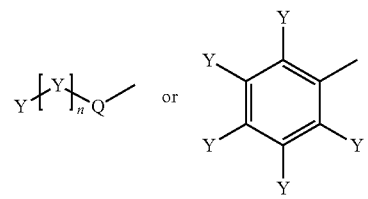

where the open bond is to T and Q is a divalent $C_1$ to $C_6$ hydrocarbyl linker group bound to T;
each Y is independently a hydrogen, heteroatom, heteroatom-containing group, $C_1$ to $C_{10}$ hydrocarbyl, $C_2$ to $C_{12}$ substituted hydrocarbyl, $C_6$ to $C_{12}$ aryl, or $C_7$ to $C_{20}$ substituted aryl, provided that at least one Y in each formula is a heteroatom or heteroatom-containing group; and n is 0, 1, 2, 3, 4, 5 or 6.

7. The process of any one of numbered embodiments 4 through 6, wherein each L radical comprises one or more radicals selected from the L-list.

8. The process of any one of numbered embodiments 4 through 7, wherein the comonomer is propylene, 1-butene, 1-hexene or 1-octene; preferably 1-hexene or 1-octene.

9. The process of any one of numbered embodiments 4 through 8, wherein M is zirconium or hafnium.

10. The process of any one of numbered embodiments 4 through 9, wherein each X is, independently, selected from the group consisting of hydrocarbyl radicals having from 1 to 20 carbon atoms and halides.

11. The process of any one of numbered embodiments 4 through 10, wherein $T(L)p(R')z$ is represented by one or more of the groups: $R'_2C$, $R'_2Si$, $R'_2Ge$, $R'_2C=CR'_2$, $R'_2C=CR'_2CR'_2$, $R'_2C=CR'_2CR'_2CR'_2$, $R'C=CR'$, $R'C=CR'CR'_2$, $R'_2C=CR'=CR'CR'_2$, $R'C=CR'CR'=CR'$, $R'C=CR'CR'_2CR'_2$, $R'_2C=SiR'_2$, $R'_2SiSiR'_2$, $R_2C=SiR'_2CR'_2$, $R'_2Si=CR'_2SiR'_2$, $R'C=CR'SiR'_2$, $R'_2C=GeR'_2$, $R'_2Ge=GeR'_2$, $R'_2C=GeR'_2CR'_2$, $R'_2Ge=CR'_2GeR'_2$, $R'_2Si=GeR'_2$, $R'C=CR'GeR'_2$, $R'B$, $R'_2C-BR'$, $R'_2C-BR'-CR'_2$, $R'_2C-O-CR'_2$, $R'_2CR'_2C-O-CR'_2CR'_2$, $R'_2C-O-CR'_2CR'_2$, $R'_2C-O-CR'=CR'$, $R'_2C-S-CR'_2$, $R'_2CR'2C-S-CR'_2CR'_2$, $R'_2C-S-CR'_2CR'_2$, $R'_2C-S-CR'=CR'$, $R'_2C-Se-CR'_2$, $R'_2CR'_2C-Se-CR'_2CR'_2$, $R'_2C-Se-CR_2CR'_2$, $R'_2C-Se-CR'=CR'$, $R'_2C-N=CR'$, $R'_2C-NR'-CR'_2$, $R'_2C-NR'-CR'_2CR'_2$, $R'_2C-NR'-CR'=CR'$, $R'_2CR'_2C-NR'-CR'_2CR'_2$, $R'_2C-P=CR'$, and $R'_2C-PR'-CR'_2$ where R' is hydrogen or a $C_1$ to $C_{20}$ hydrocarbyl, substituted hydrocarbyl, halocarbyl, substituted halocarbyl, aryl, substituted aryl, silylcarbyl or germylcarbyl substituent and optionally two or more adjacent R' may join to form a substituted or unsubstituted, saturated, partially unsaturated or aromatic, cyclic or polycyclic substituent, provided that at least one (alternately, one, two or three, preferably one or two) of the R' groups is substituted by an L, where L is a heteroatom or heteroatom-containing group.

12. The process of any one of numbered embodiments 4 through 11, wherein $T(L)_p(R')_z$ is selected from C(L)H, C(L)HCH$_2$, C(L)CH$_3$, Si(L)CH$_3$, Si(L)Ph, Si(L)CH$_3$, C(L)Ph, $C(CR_2)_n(L)$, $C(CR_2)_n(CRL)$, $Si(CR_2)_n(L)$, $Si(CR)_n(CRL)$, where R is hydrogen or a $C_1$ $C_{20}$ (preferably $C_1$ to $C_8$) containing hydrocarbyl or substituted hydrocarbyl, each L is a heteroatom or heteroatom-containing group, and n is 1, 2, 3, or 4.

13. The process of any one of numbered embodiments 4 through 12, wherein the activator comprises alumoxane.

14. The process of any one of numbered embodiments 4 through 13, wherein alumoxane is present at a molar ratio of aluminum to catalyst compound transition metal within the range from 1:1 to 10:1 or 100:1.

15. The process of any one of numbered embodiments 4 through 14, wherein the activator comprises a non-coordinating anion activator.

16. The process of any one of the numbered embodiments 4 through 15, wherein the copolymer is produced in a single reactor, most preferably in a single reactor in a single stage of polymerization with a single catalyst component.

17. The copolymer of any one of the numbered embodiments 1 through 3, wherein the copolymer is produced in a single reactor, most preferably in a single reactor in a single stage of polymerization.

18. The catalyst component of any one of claims 4 through 15.

19. The use of the catalyst component of any one of claims 4 through 15 to produce an ethylene copolymer as described herein.

In another embodiment, this invention relates to:

1. A catalyst compound represented by the formula: $(L)_p(R')_zT(Cp)(A)MX_2$ wherein:

Cp is a cyclopentadienyl ring substituted with 0, 1, 2, 3 or 4 substituent groups S", each substituent group S" being, independently, a radical group which is a hydrocarbyl, substituted-hydrocarbyl, or heteroatom or Cp is a cyclopentadienyl ring in which any two adjacent S" groups are joined forming a $C_4$ to $C_{20}$ ring to give a saturated or unsaturated polycyclic cyclopentadienyl ligand, such as substituted or unsubstituted indenyl or flourenyl, where A is bound to M and T, Cp is bound to M and T and L and R' are bound to T;

M is a Group 4 transition metal;

z is 0, 1, 2, 3, 4, 5, 6, 7, or 8 indicating the number of R' groups bound to the bridging group T, p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group;

each $R^1$, $R^2$, $R^3$, and $R^4$ is, independently, hydrogen, a hydrocarbyl group, a substituted hydrocarbyl group, an aryl group, a substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated;

each R' is, independently, hydrogen, a $C_1$ to $C_{10}$ alkyl group, a $C_6$ to $C_{24}$ aryl group, or a $C_7$ to $C_{40}$ alkylaryl group;

each L is a heteroatom or heteroatom-containing group bound to T;

A is Cp or $(JS'_{z^*-1-y})$, where $JS'_{z^*-1-y}$ is a heteroatom ligand in which J is an element from Group 15 with a coordination number of 3 or an element from Group 16 with a coordination number of 2; S' is a radical group which is a hydrocarbyl, substituted hydrocarbyl, or heteroatom; and z* is the coordination number of the element J, and y is 0 or 1.

2. The compound of paragraph 1 wherein the catalyst compound represented by the formula:

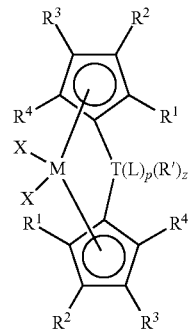

where M is a Group 4 transition metal; z is 0, 1, 2, 3, 4, 5, 6, 7, or 8 indicating the number of R' groups bound to the bridging group T, and p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, aryl group, substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated; and each R' is, independently, hydrogen, a $C_1$ to $C_{10}$ alkyl group, a $C_6$ to $C_{24}$ aryl group, or a $C_7$ to $C_{40}$ alkylaryl group; and each L is a heteroatom or heteroatom-containing group bound to T.

3. The compound of paragraph 2, wherein the catalyst compound is represented by the formula:

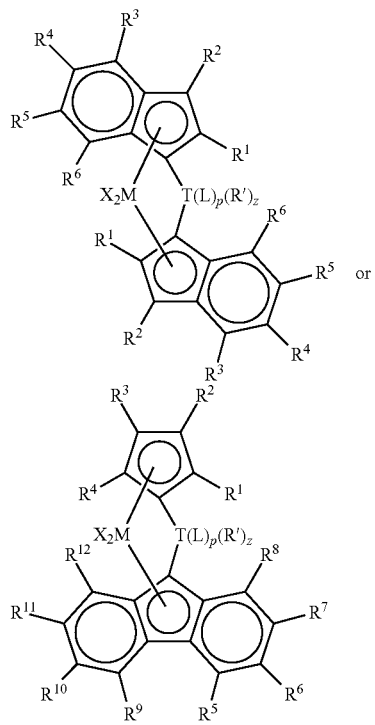

where each $R^1$ to $R^{12}$ is, independently hydrogen, a hydrocarbyl group, substituted hydrocarbyl group, aryl group, substituted aryl group, or a heteroatom-containing group, and X, M, T, L, R', p, and z are as defined in paragraph 1.

4. The compound of paragraph 1, wherein the catalyst compound represented by the formula:

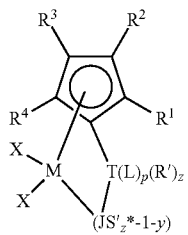

where M is a Group 4 transition metal;
z is 0, 1, 2, 3, 4, 5, 6, 7, or 8 indicating the number of R' groups bound to the bridging group T;
p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, aryl group, substituted aryl group, or a heteroatom-containing group, provided that any of adjacent $R^1$, $R^2$, $R^3$, and $R^4$ groups may form a fused ring or multicenter fused ring system where the rings may be aromatic, partially saturated or saturated; and each R' is, independently, hydrogen, a $C_1$ to $C_{10}$ alkyl group, a $C_6$ to $C_{24}$ aryl group, or a $C_7$ to $C_{40}$ alkylaryl group; and each L is a heteroatom or heteroatom-containing group bound to T;

$JS'_{z^*-1-y}$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, or heteroatom; and z* is the coordination number of the element J, and y is 0 or 1.

5. The compound of paragraph 1, 2, 3, or 4 wherein L is represented by the formulae:

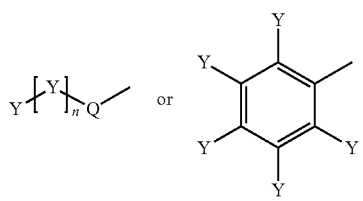

where the open bond is to T and Q is a divalent $C_1$ to $C_6$ hydrocarbyl linker group bound to T;

each Y is independently a hydrogen, heteroatom, heteroatom-containing group, $C_1$ to $C_{10}$ hydrocarbyl, $C_2$ to $C_{12}$ substituted hydrocarbyl, $C_6$ to $C_{12}$ aryl, or $C_7$ to $C_{20}$ substituted aryl, provided that at least one Y in each formula is a heteroatom or heteroatom-containing group; and n is 0, 1, 2, 3, 4, 5 or 6.

6. The compound of any of paragraphs 1 to 5 wherein each L comprises one or more of the radicals listed in the L-list.

7. The compound of any of paragraphs 1 to 6 wherein each X is, independently, selected from the group consisting of hydrocarbyl radicals having from 1 to 20 carbon atoms and halides.

8. The compound of any of paragraphs 1 to 6, wherein all $R^1$ to $R^{12}$ groups are hydrogen.

9. The compound of any of paragraphs 1 to 6, wherein groups $R^1$, $R^2$, $R^3$, $R^4$, $R^5$, $R^6$, $R^7$, $R^8$, $R^9$, $R^{10}$, $R^{11}$, and $R^{12}$ are, independently, hydrogen, methyl, ethyl, propyl, butyl, isobutyl, tert-butyl, or phenyl.

10. The compound of any of paragraphs 1 to 9, wherein $T(L)_p(R')_z$ is represented by one or more of the groups: R'$_2$C, R'$_2$Si, R'$_2$Ge, R'$_2$C=CR'$_2$, R'$_2$C=CR'$_2$CR'$_2$, R'$_2$C=CR'$_2$CR'$_2$, R'C=CR', R'C=CR'CR'$_2$, R'$_2$C=CR'=CR'CR'$_2$, R'C=CR'CR'=CR', R'C=CR'CR'$_2$CR'$_2$, R'$_2$C=SiR'$_2$, R'$_2$SiSiR'$_2$, R$_2$C=SiR'$_2$CR'$_2$, R'$_2$Si=CR'$_2$SiR'$_2$, R'C=CR'SiR'$_2$, R'$_2$C=GeR'$_2$, R'$_2$Ge=GeR'$_2$, R'$_2$C=GeR'$_2$CR'$_2$, R'$_2$Ge=CR'$_2$GeR'$_2$, R'$_2$Si=GeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'2C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$ to $C_{10}$ or $C_{20}$ hydrocarbyl, substituted hydrocarbyl, halocarbyl, substituted halocarbyl, aryl, substituted aryl, silylcarbyl or germylcarbyl substituent and optionally two or more adjacent R' may join to form a substituted or unsubstituted, saturated, partially unsaturated or aromatic, cyclic or polycyclic substituent; and provided that at least one of the R' groups is substituted by an L, where L is as defined in paragraph 1, preferably L is a radical selected from the L-list.

11. The compound of any of paragraphs 1 to 9 wherein $T(L)_p(R')_z$ is selected from C(L)H, C(L)HCH$_2$, C(L)CH$_3$, Si(L)CH$_3$, Si(L)Ph, Si(L)CH$_3$, C(L)Ph, C(CR$_2$)$_n$(L), C(CR$_2$)$_n$(CRL), Si(CR$_2$)$_n$(L), Si(CR)$_n$(CRL), where R is hydrogen or a $C_1$ to $C_8$ or $C_{20}$ containing hydrocarbyl or substituted hydrocarbyl, L is as defined in paragraph 1 and n is 1, 2, 3 or 4.

12. A catalyst system comprising an activator and the catalyst compound of any of paragraphs 1 to 11.

13. A process to polymerize olefins comprising contacting one or more olefins with the catalyst system of paragraph 12.

14. The catalyst system of paragraph 12 or the process of paragraph 13 wherein the activator comprises alumoxane.

15. The catalyst system or the process of paragraph 12, 13 or 14 wherein the activator comprises a non-coordinating anion activator.

16. The catalyst system or the process of paragraph 12, 13, 14 or 15, wherein no more than one olefin polymerization catalyst is present in the catalyst system.

17. The process of paragraphs 13 to 16 wherein the olefins comprise ethylene and one or more C3 to C20 olefins.

18. The process of paragraph 17 where the process produces an ethylene copolymer comprising ethylene and a $C_3$ to $C_{20}$ α-olefin, wherein the copolymer having a DSC peak melting temperature, $T_m$, greater than the line represented by $T_m=132-(6.25\sim M\%)$, where M % is the mol % comonomer.

19. The copolymer of paragraph 18, wherein one, two or three CEF elution peaks are exhibited below 90 or 110° C., and no CEF elution peak is exhibited above 110° C.

20. The copolymer of paragraph 18 or 19, wherein a single CEF elution peak occurs within a range of from 60 or 70° C. to 100 or 110° C.

21. The copolymer of paragraph 18, 19, or 20 wherein the Mw is from 10,000 to 2,000,000 g/mol.

The various descriptive elements and numerical ranges disclosed herein for the process, the catalyst component, and the copolymer can be combined with other descriptive elements and numerical ranges to describe the invention(s); further, for a given element, any upper numerical limit can be combined with any lower numerical limit described herein. The features of the invention are described in the following non-limiting examples.

EXAMPLES

A description follows of the inventive catalysts and their synthesis, inventive copolymers made therefrom and their characterization. The following catalysts were synthesized according to the following description:

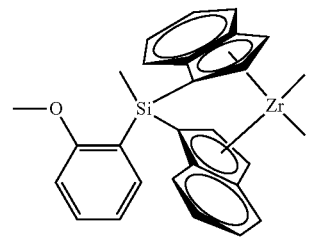

Cat. 1

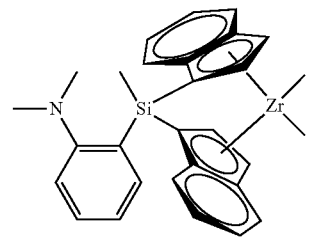

Cat. 2

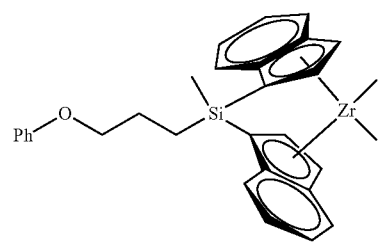

Cat. 3

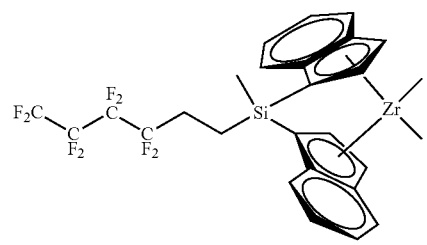

Cat. 4

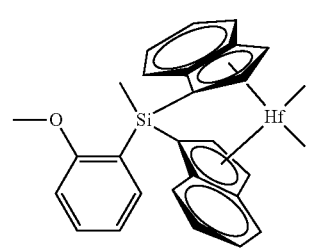

Cat. 5

-continued

Cat. 6

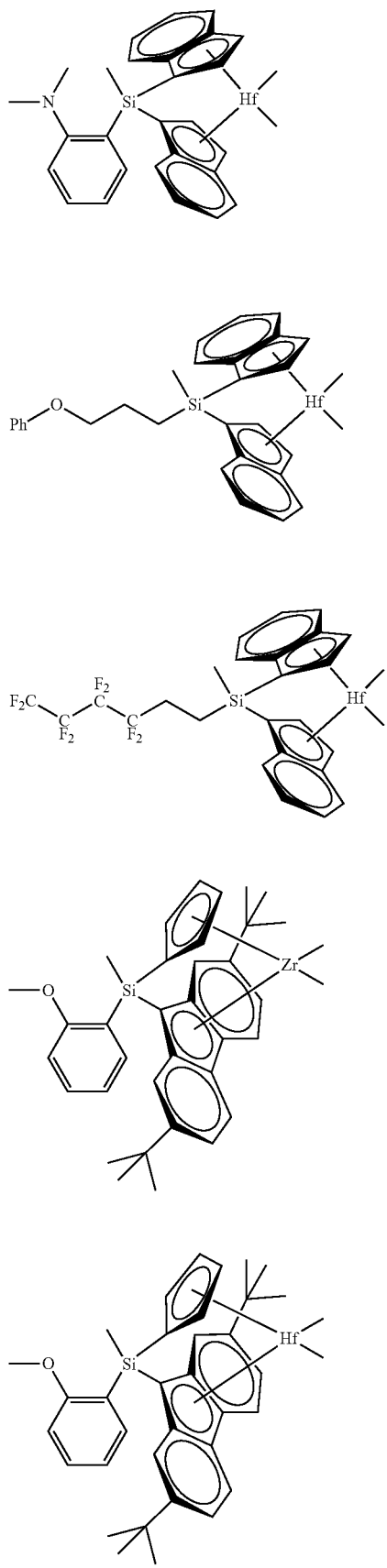

Cat. 7

Cat. 8

Cat. 9

Cat. 10

-continued

Cat. 11

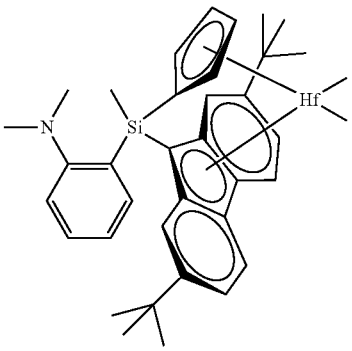

Example 1 rac-(2-methoxyphenyl)(methyl)silyl-bis(indenyl)hafnium(IV)dimethyl

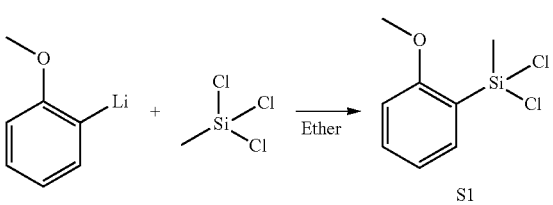

Step 1. 2-(methyldichlorosilyl)-anisole. In a nitrogen-filled glove box a 100 mL round bottom flask was charged with methyltrichlorosilane (27.8 g, 0.186 mol), diethyl ether (60 mL) and a magnetic stir bar, and then cooled to −40° C. in a cold bath. To this stirring mixture a solution of (2-methoxyphenyl)lithium (4.247 g, 0.0372 mol) in diethyl ether (32 mL) was added drop wise. The mixture was allowed to stir for 45 minutes at −40° C., and then allowed to warm to room temperature. After 3 hours the mixture was filtered through celite and concentrated under reduced pressure. The resulting liquid was then purified by vacuum distillation (approx. 65° C.) to afford a colorless oil (S1) (5.34 g, 65%).

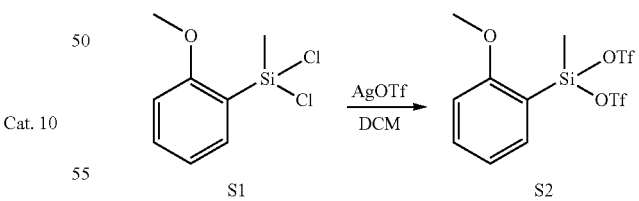

Step 2. (2-methoxyphenyl)(methyl)silanediyl bis(trifluoromethanesulfonate). In a nitrogen-filled glovebox a 100 mL round bottom flask was charged with silver trifluoromethanesulfonate (5.807 g, 22.6 mmol), dichloromethane (50 mL) and a magnetic stir bar. Compound S1 (2.5 g, 11.3 mmol) was added dropwise to the resulting slurry as a neat liquid. The slurry was stirred overnight and then filtered through a pad of celite. Solvent was removed under reduced pressure to afford a light-brown, viscous oil (S2) (4.628 g, 91%).

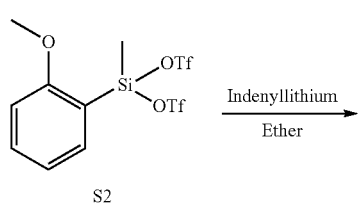

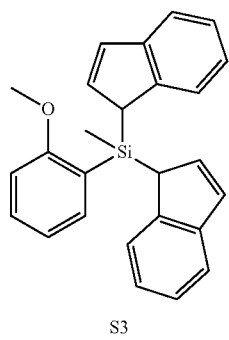

Step 3. di(1H-inden-1-yl)(2-methoxyphenyl)(methyl)silane. In a nitrogen-filled glovebox a 20 mL scintillation vial was charged with the compound S2 (1.317 g, 2.93 mmol), diethyl ether (8 mL), and a magnetic stir bar. In a separate 20 mL scintillation vial, indenyllithium (789 mg, 6.46 mmol) was dissolved in ether (7 mL). Both vials were cooled in freezer (−32° C.) for 1 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing layered celite/silica/celite. The filtrate was concentrated under reduced pressure to afford a pale yellow oil (S3) (1.035 g, 93%).

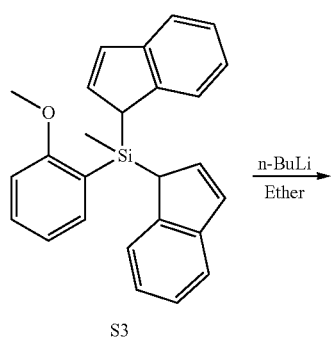

Step 4. 1,1'-((2-methoxyphenyl)(methyl)silanediyl)bis(1H-inden-1-ide). In a nitrogen-filled glovebox a 20 mL scintillation vial was charged with compound S3 (1.035 g, 2.72 mmol), diethyl ether (15 mL), and a magnetic stirbar. The vial was placed in the freezer (−32° C.) for 2 h. n-BuLi (2.72 ml of a 2.5 M solution) was added dropwise to the stirring solution. The mixture was allowed to warm to room temperature. After 4 h, the mixture was concentrated under a flow of nitrogen. The resulting solid was triturated with pentane and an off-white solid was collected by vacuum filtration (S4) (960 mg, 90%).

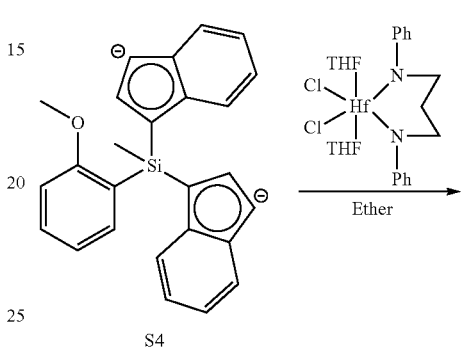

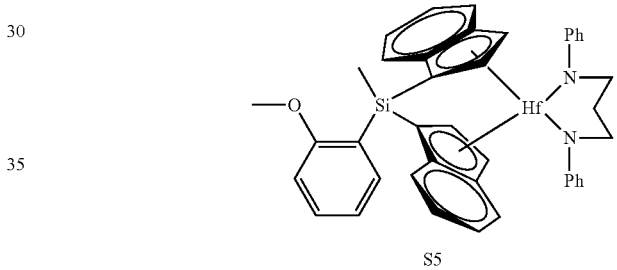

Step 5. In a nitrogen-filled glovebox a 20 mL scintillation vial was charged with compound S4 (326 mg, 0.83 mmol), diethyl ether (9 mL), and a magnetic stirbar. A separate 20 mL scintillation vial was charged with HfCl$_2$(THF)$_2$(PhN(CH$_2$)$_3$NPh) (512 mg, 0.83 mmol) and diethyl ether (9 mL). Both vials were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield an orange oil (S5) (224 mg, 35%).

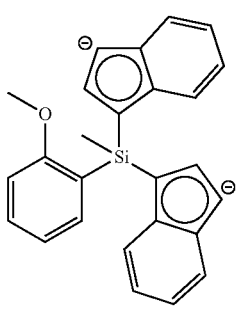

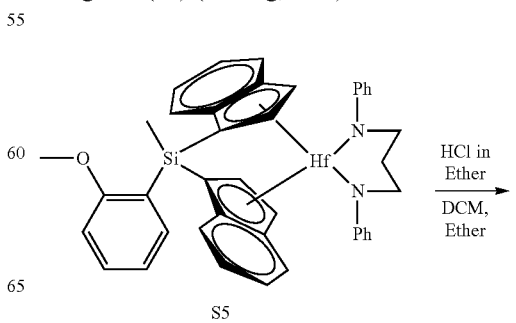

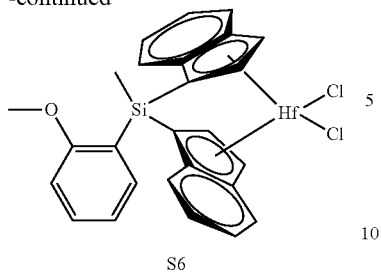

S6

Step 6. In a nitrogen-filled glovebox a 20 mL scintillation vial was charged with compound S5 (224 mg, 0.29 mmol), diethyl ether (4 mL), dichloromethane (4 mL), and a magnetic stirbar. This mixture was cooled in the freezer (−32° C.) and then HCl (0.29 mL, 2M in diethyl ether, 0.58 mmol) was added dropwise. The mixture was allowed to warm to room temperature and stirred. After 2.5 h the mixture was concentrated under reduced pressure and the resulting solid was resuspended in diethyl ether and collected by vacuum filtration to afford a yellow-orange solid (S6) (82 mg, 46%).

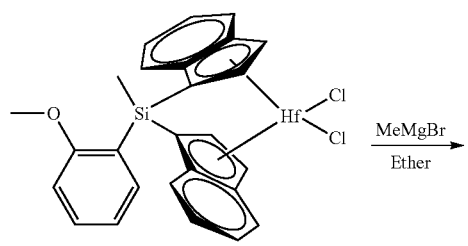

S6

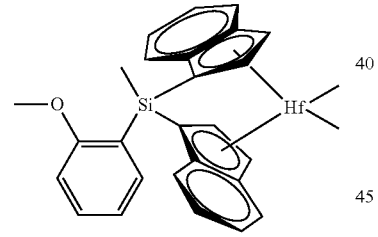

Cat. 5

Step 7. In a nitrogen-filled glovebox a 20 mL scintillation vial was charged with compound S6 (82 mg, 0.13 mmol), diethyl ether (5 mL), and a magnetic stirbar, then placed in the freezer (−32° C.) for 1 h. The mixture was removed from the freezer, stirred, and MeMgBr (0.11 mL, 3M in diethyl ether, 0.33 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure. The resulting orange oil was dissolved in ether (1 mL) and allowed to stand in freezer 2 days. The solvent was decanted to yield orange crystals (Catalyst 5) (32 mg, 42%). 1H NMR (400 MHz, CDCl3) δ 8.0 (dd, 1H, J=9.0, 4.4), 7.49 (d, 1H, J=8.6), 7.42 (t, 2H, J=8.9), 7.27 (dd, 1H, J=5.2, 1.8), 7.1-6.9 (overlapping signals, 6H), 6.6 (t, 2H, J=3.2), 6.55-6.5 (overlapping signals, 2H), 5.84 (dd, 2H, J=5.8, 3.2), 3.1 (s, 3H), 0.97 (s, 3H), −1.1 (s, 3H), −1.2 (s, 3H).

Example 2 rac-(2-dimethylaminophenyl)(methyl)silyl-bis(indenyl)hafnium(IV)dimethyl

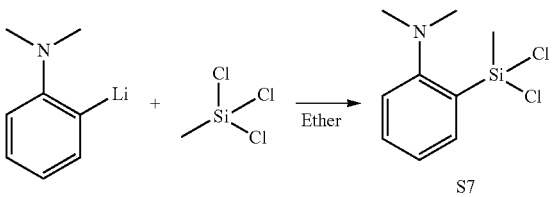

S7

Step 1. 2-(methyldichlorosilyl)-dimethylaniline. In a nitrogen-filled glove box a 100 mL round bottom flask was charged with methyltrichlorosilane (16.0 g, 0.186 mol), diethyl ether (30 mL) and a magnetic stir bar, and then cooled in a freezer (−32° C.) for 1.5 h. To this stirring mixture a cooled solution of (2-dimethylaminophenyl)lithium (2.718 g, 0.0372 mol) in diethyl ether (40 mL) was added dropwise. The mixture was allowed to stir and warm to room temperature. After 2 hours the mixture was filtered through celite and concentrated under reduced pressure. The resulting liquid that was purified by vacuum distillation (approx. 70° C.) to afford a colorless oil (S7) (3.12 g, 62%).

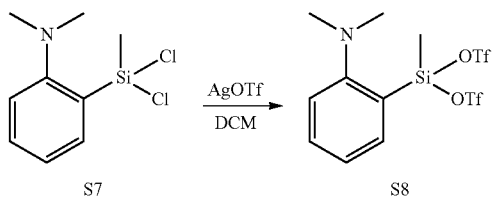 [SMILES: CN(C)c1ccccc1[Si](C)(Cl)Cl ; CN(C)c1ccccc1[Si](C)(OS(=O)(=O)C(F)(F)F)OS(=O)(=O)C(F)(F)F ; "S7" ; "S8" ; "AgOTf"]

S7　　　　　S8

Step 2. (2-dimethylaminophenyl)(methyl)silanediyl bis(trifluoromethanesulfonate). In a nitrogen-filled glovebox a 100 mL round bottom flask was charged with silver trifluoromethanesulfonate (6.844 g, 0.0266 mol), dichloromethane (50 mL) and a magnetic stir bar. Compound S7 was added dropwise to the resulting slurry as a neat liquid. The slurry was stirred overnight and then filtered through a pad of celite. Solvent was removed under reduced pressure to afford a light-brown, viscous oil (S8) (5.908 g, 96%).

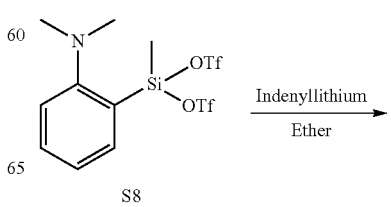

S8

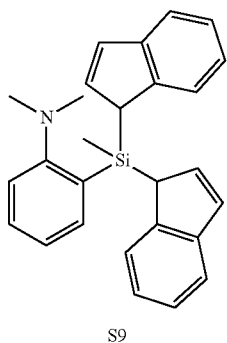

S9

Step 3. di(1H-inden-1-yl)(2-dimethylaminophenyl)(methyl)silane. In a nitrogen-filled glovebox a 20 mL scintillation vial was charged with the compound S8 (1.436 g, 3.11 mmol), diethyl ether (8 mL), and a magnetic stir bar. In a separate 20 mL scintillation vial indenyllithium (836 mg, 6.85 mmol) was dissolved in ether (8 mL). Both vials were cooled in freezer (−32° C.) for 1 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing layered celite/silica/celite. The filtrate was concentrated under reduced pressure to afford a pale yellow oil (S9) (914 mg, 75%).

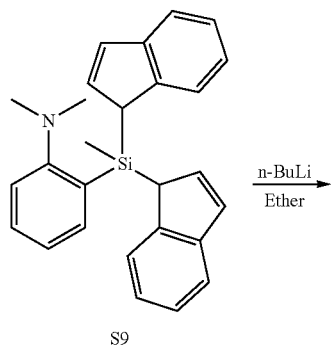

S9

Step 4. 1,1'-((2-dimethylaminophenyl)(methyl)silanediyl)bis(1H-inden-1-ide). In a nitrogen-filled glovebox a 20 mL scintillation vial was charged with compound S9 (914 mg, 2.32 mmol), diethyl ether (18 mL), and a magnetic stirbar. The vial was placed in the freezer (−32° C.) for 2 h. n-BuLi (2.32 mL of a 2.5M solution) was added dropwise to the stirring solution. The mixture was allowed to warm to room temperature. After 4 h, the mixture was concentrated under a flow of nitrogen. The resulting solid was triturated with pentane and an off-white solid was collected by vacuum filtration and dried under reduced pressure (S10) (820 mg, 87%).

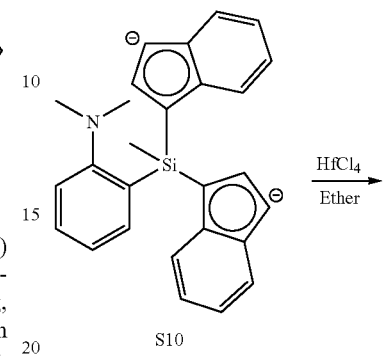

S10

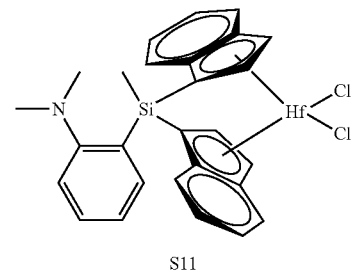

S11

Step 5. In a nitrogen-filled glovebox a 20 mL scintillation vial was charged with compound S10 (300 mg, 0.74 mmol), diethyl ether (9 mL), and a magnetic stirbar. A separate 20 mL scintillation vial was charged with the HfCl$_4$ (344 mg, 0.74 mmol) and diethyl ether (9 mL). Both vials were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield an orange oil (S11) (430 mg (mixed isomers, 91%).

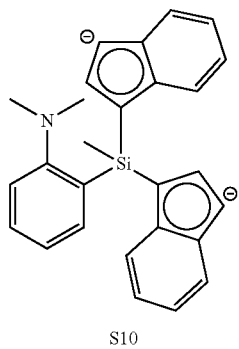

S11

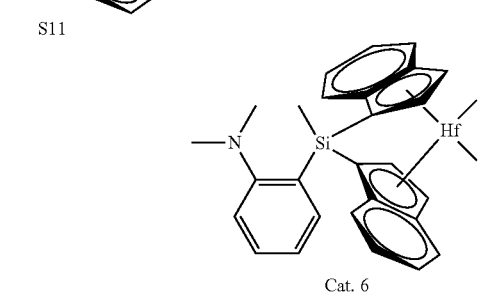

Cat. 6

Step 6. In a nitrogen-filled glovebox a 20 mL scintillation vial was charged with compound S11 (430 mg (mixed isomers), 0.67 mmol), diethyl ether (10 mL), toluene (3 mL), and a magnetic stirbar, then placed in the freezer (−32° C.) for 1 h. The mixture was removed from the freezer, stirred, and MeMgBr (0.11 mL, 3M in diethyl ether, 0.33 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure. The resulting orange oil was dissolved in toluene (1 mL) and allowed to stand in freezer 2 days. The solvent was decanted to yield orange crystals (Catalyst 6) (32 mg, 42%). 1H NMR (400 MHz, CDCl3) δ 8.1 (d, 1H, J=7.2), 7.48 (m, 3H), 7.29 (t, 1H, J=7.8), 7.08 (t, 2H, J=9.22), 7.1-6.9 (overlapping signals, 3H), 6.88 (d, 1H, J=8.5), 6.62 (d, 2H, J=15.6), 6.49 (t, 1H, J=7.3), 5.9 (d, 2H, J=27.7), 2.36 (s, 6H), 0.99 (s, 3H), −1.05 (s, 3H), −1.18 (s, 3H).

Example 3 rac-(phenoxypropyl)(methyl)silyl-bis(indenyl)hafnium(IV)dimethyl

Step 1. (phenoxypropyl)(methyl)silanediyl bis(trifluoromethanesulfonate). In a nitrogen-filled glovebox a 100 mL round bottom flask was charged with silver trifluoromethanesulfonate (6.167 g, 0.024 mol), dichloromethane (60 mL) and a magnetic stir bar. Compound (phenoxypropyl)(methyl)dichlorosilane (3 g, 0.012 mol) was added dropwise to the resulting slurry as a neat liquid. The slurry was stirred overnight and then filtered through a pad of celite. Solvent was removed under reduced pressure to afford a rust-colored, viscous oil (S12) (5.635 g, 99%).

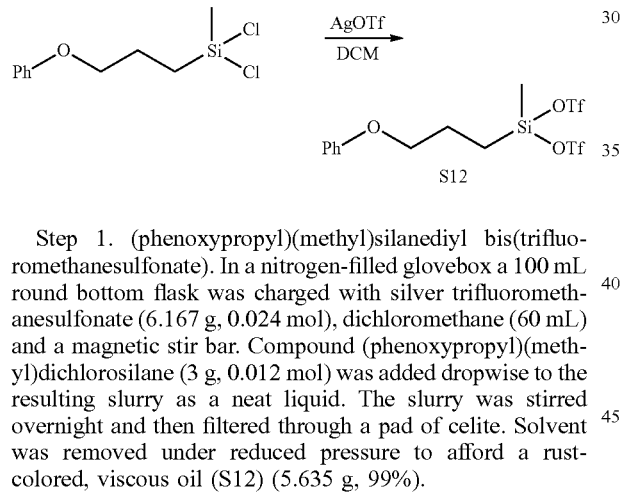

Step 2. di(1H-inden-1-yl)(phenoxypropyl)(methyl)silane. In a nitrogen-filled glovebox a 100 mL round bottom flask was charged with compound S12 (2.00 g, 4.12 mmol), diethyl ether (50 mL), and a magnetic stir bar. In a 20 mL scintillation vial indenyllithium (1.128 g, 9.24 mmol) was dissolved in ether (19 mL). Both solutions were cooled in freezer (−32° C.) for 1 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing celite/silica/celite. The filtrate was concentrated under reduced pressure to afford a yellow oil (S13) (1.56 g, 91%).

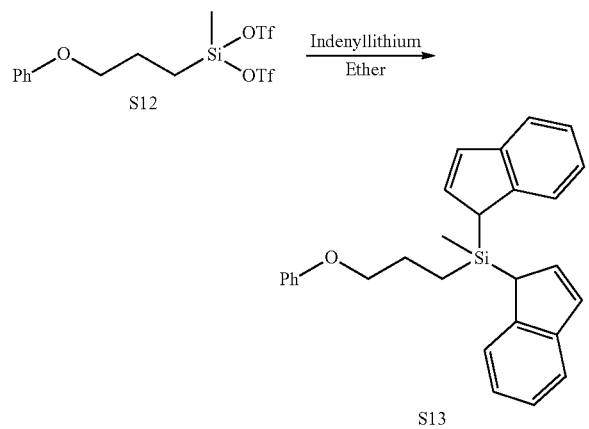

Step 3. 1,1'-((phenoxypropyl)(methyl)silanediyl)bis(1H-inden-1-ide). In a nitrogen-filled glovebox a 100 mL round bottom flask was charged with compound S13 (1.56 g, 3.82 mmol), pentane (50 mL), and a magnetic stirbar. The vial was placed in the freezer (−32° C.) for 2 h. n-BuLi (5.3 ml of a 1.6 M solution) was added dropwise to the stirring solution. The mixture was allowed to warm to room temperature. After 24 h an off-white solid was collected by vacuum filtration. This solid was resuspended in pentane (40 mL) and n-BuLi (0.75 mL of a 2.5 M solution) was added, to this ether (40 mL) was added slowly. After 4 h, the mixture was concentrated under flow of nitrogen. The resulting solid was triturated with pentane and an off-white solid was collected by vacuum filtration and dried under reduced pressure (S14) (1.413 mg, 88%).

Step 4. In a nitrogen-filled glovebox a 20 mL scintillation vial was charged with compound S14 (580 mg, 1.38 mmol), diethyl ether (10 mL), and a magnetic stirbar. A 100 mL round bottom flask was charged with the HfCl2(THF)2(PhN(CH2)3NPh) (850 mg, 1.38 mmol) and diethyl ether (55 mL). Both mixtures were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield an orange oil (S15) (838 mg, 75%).

Step 5. In a nitrogen-filled glovebox a 100 mL round bottom flask was charged with compound S15 (447 mg, 0.552 mmol), diethyl ether (30 mL), dichloromethane (30 mL), and a magnetic stirbar. This mixture was cooled in the freezer (−32° C.) for 2 h and then HCl (0.55 mL, 2M in diethyl ether, 1.10 mmol) was added dropwise. The mixture was allowed to warm to room temperature and stirred. After 2.5 h the mixture was concentrated under reduced pressure and the resulting solid was resuspended in diethyl ether (7 mL) and collected by vacuum filtration to afford a yellow solid (S16) (182 mg, 50%).

Step 6. In a nitrogen-filled glovebox a 20 mL scintillation vial was charged with compound S16 (182 mg, 0.28 mmol), diethyl ether (18 mL), and a magnetic stirbar, then placed in the freezer (−32° C.) for 1 h. The mixture was removed from the freezer, stirred, and MeMgBr (0.23 mL, 3M in diethyl ether, 0.69 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure to yield an orange glass-like solid (Catalyst 7) (102 mg, 60%). 1H NMR (400 MHz, CDCl3) δ 7.45 (d, 2H, J=8.2), 7.36 (d, 2H, J=9.2), 7.26 (d, 1H, J=8.8), 7.13 (m, 2H), 7.0-6.8 (overlapping signals, 6H), 6.61 (d, 2H, J=9.0), 5.65 (overlapping signals, 2H), 3.72 (t, 2H, J=6.2), 1.88 (m, 2H), 1.38 (m, 2H), 0.58 (s, 3H), −1.15 (s, 3H), −1.18 (s, 3H).

Example 4 rac-(nonafluorohexyl)(methyl)silyl-bis(indenyl)hafnium(IV)dimethyl

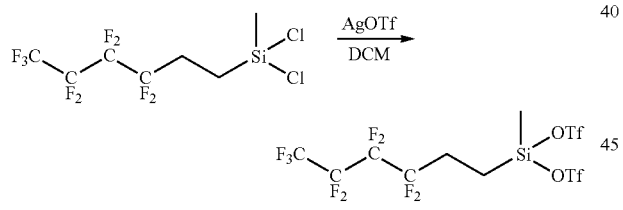

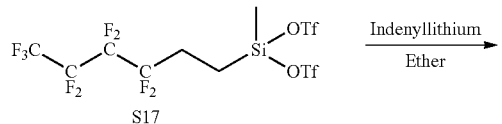

Step 1. (nonafluorohexyl)(methyl)silanediyl bis(trifluoromethanesulfonate). In a nitrogen-filled glovebox a 100 mL round bottom flask was charged with silver trifluoromethanesulfonate (4.28 g, 16.7 mmol), dichloromethane (50 mL) and a magnetic stir bar. Compound (nonafluorohexyl)(methyl)dichlorosilane (3 g, 8.31 mmol) was added dropwise to the resulting slurry as a neat liquid. The slurry was stirred overnight and then filtered through a pad of celite. Solvent was removed to afford a yellow oil (S17) (4.714 g, 96%).

-continued

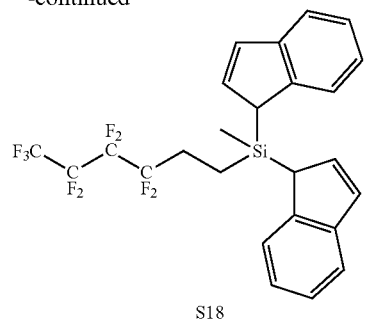

Step 2. di(1H-inden-1-yl)(nonafluorohexyl)(methyl)silane. In a nitrogen-filled glovebox a 100 mL round bottom flask was charged with compound S17 (2.00 g, 3.4 mmol), diethyl ether (50 mL), and a magnetic stir bar. In a 20 mL scintillation vial indenyllithium (0.913 g, 7.48 mmol) was dissolved in ether (19 mL). Both solutions were cooled in freezer (−32° C.) for 1 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing celite/silica/celite. The filtrate was concentrated under reduced pressure to afford a yellow oil (S18) (1.647 g, 93%).

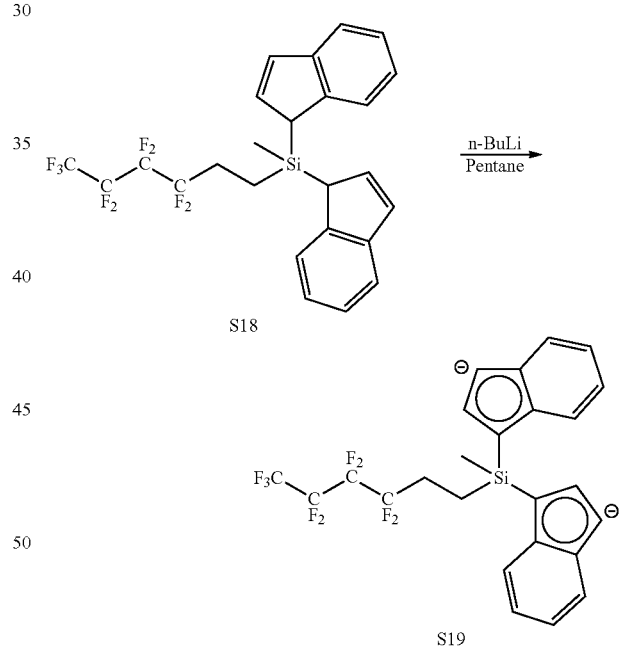

Step 3. 1,1'-((nonafluorohexyl)(methyl)silanediyl)bis(1H-inden-1-ide). In a nitrogen-filled glovebox a 100 mL round bottom flask was charged with compound S18 (1.647 g, 3.16 mmol), pentane (40 mL), and a magnetic stirbar. n-BuLi (3.0 ml of a 2.5 M solution) was added dropwise to the stirring solution and then ether was added until the reaction was homogeneous. After 24 h the mixture was concentrated under a flow of nitrogen and then toluene was added and a light pink solid was collected by vacuum filtration then washed with pentane (S19) (1.62 mg, 96%).

Step 4. In a nitrogen-filled glovebox a 20 mL scintillation vial was charged with compound S19 (419 mg, 0.787 mmol), diethyl ether (10 mL), and a magnetic stirbar. A 100 mL round bottom flask was charged with the hafnium complex (0.485 mg, 0.787 mmol) and diethyl ether (50 mL). Both were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield a brown-orange oil (S20) (524 mg, 72%).

Step 5. In a nitrogen-filled glovebox a 100 mL round bottom flask was charged with compound S20 (524 mg, 0.569 mmol), diethyl ether (50 mL), and a magnetic stirbar. This mixture was cooled in the freezer (−32° C.) for 2 h and then HCl (0.55 mL, 2M in diethyl ether, 1.10 mmol) was added dropwise. The mixture was allowed to warm to room temperature and stirred. After 2.5 h the mixture was concentrated under reduced pressure to approximately 10 mL and the resulting slurry was collected by vacuum filtration to afford a yellow solid (S21) (180 mg, 41%).

Step 6. In a nitrogen-filled glovebox a 20 mL scintillation vial was charged with compound S21 (180 mg, 0.23 mmol), diethyl ether (18 mL), and a magnetic stirbar, then placed in the freezer (−32° C.) for 1 h. The mixture was removed from the freezer, stirred, and MeMgBr (0.2 mL, 3M in diethyl ether, 0.6 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure, and then triturated with pentane to yield an orange-yellow solid (Catalyst 8) (143 mg, 84%). 1H NMR (400 MHz, CDCl$_3$) δ 7.4 (d, 2H, J=8.6), 7.2-7.0 (m, 3H), 6.88 (t, 1H, J=7.6), 6.7 (t, 1H, J=7.6), 6.59 (d, 1H, J=3.6), 6.55 (d, 1H, J=4.0), 5.54 (d, 1H, J=3.2), 5.17 (d, 1H, J=3.2), 2.19 (m, 2H), 1.4 (m, 2H), 0.38 (s, 3H) −1.19 (s, 3H), −1.23 (s, 3H). F19-NMR (376 MHz, CDCl$_3$) δ −81.0, −115.2, −123.7, −125.8.

Example 5

(2-methoxyphenyl)(methyl)silyl(2,7-di-tert-butyl-fluorenyl)(cyclopentadienyl)zirconium(IV)dimethyl Step 1. 2-(methyldichlorosilyl)-anisole. In a nitrogen-filled glove box a 100 mL round bottom flask was charged with methyltrichlorosilane (27.8 g, 0.186 mol), diethyl ether (60 mL) and a magnetic stir bar, and then cooled to −40° C. in a cold bath. To this stirring mixture a solution of (2-methoxyphenyl)lithium (4.247 g, 0.0372 mol) in diethyl ether (32 mL) was added dropwise. The mixture was allowed to stir for 45 minutes at −40° C., and then allowed to warm to room temperature. After 3 hours the mixture was filtered through celite and concentrated under reduced pressure. The resulting liquid was purified by vacuum distillation (approx. 65° C.) to afford a colorless oil (S1) (5.34 g, 65%).

Step 2. chloro(2,7-di-tert-butyl-9H-fluoren-9-yl)(2-methoxyphenyl)(methyl)silane. In a nitrogen-filled glovebox a 100 mL round bottom flask was charged with compound S1 (2.00 g, 9.04 mmol), pentane (60 mL), and a magnetic stir bar. Lithium 2,7-di-t-butylfluorenide (0.913 g, 7.48 mmol) was added as a solid to the solution of silane while stirring. The mixture was left to stir overnight at room temperature. The resulting slurry was filtered through a plug of celite. The filtrate was concentrated under reduced pressure to afford a white solid (S22) (3.81 g, 91%).

Step 3. (2,7-di-tert-butyl-9H-fluoren-9-yl)(2-methoxyphenyl)(methyl)silyl trifluoromethanesulfonate. In a nitrogen-filled glovebox a 100 mL round bottom flask was charged with compound 22 (3.81 g, 8.23 mmol), dichloromethane (60 mL) and a magnetic stir bar. Silver trifluoromethanesulfonate (2.115 g, 8.23 mmol), was added as a solid. The slurry was stirred 2 h at room temperature and then filtered through a pad of celite. Solvent was removed under reduced pressure to afford a white solid (S23) (4.68 g, 98%).

Step 4. In a nitrogen-filled glovebox a 20 scintillation vial was charged with compound S23 (641 mg, 1.11 mmol), diethyl ether (10 mL), and a magnetic stir bar. In a separate 20 mL scintillation vial cyclopentadienyllithium (88 mg, 1.22 mmol) was dissolved in ether (10 mL). Both solutions were cooled in freezer (−32° C.) for 2 h. The solution of cyclopentadienyllithium was added dropwise to the solution of silane while stirring. The mixture was allowed to warm to room temperature and left to stir overnight. The mixture was concentrated under a flow of nitrogen and triturated with pentane. The resulting slurry was filtered through a plug containing celite/silica/celite. The filtrate was concentrated under reduced pressure to afford a colorless oil (S24) (442 mg, 81% (crude)).

Step 5. In a nitrogen-filled glovebox a 20 mL scintillation vial was charged with compound S24 (442 mg, 0.9 mmol), pentane (8 mL), ether (4 mL), and a magnetic stirbar. The mixture was cooled in the freezer (−32° C.) for 1 h. The mixture was removed from the freezer and n-BuLi (0.76 ml of a 2.5 M solution) was added dropwise to the stirring solution. After 5 h the mixture was concentrated under flow of nitrogen and the resulting solid was triturated with pentane, collected by vacuum filtration, and washed with pentane to afford an off-white solid (S25) (447 mg, 98%).

Step 6. In a nitrogen-filled glovebox a 20 mL scintillation vial was charged with compound S25 (190 mg, 0.377 mmol), diethyl ether (4 mL), and a magnetic stirbar. A 20 mL scintillation vial was charged with the zirconium tetrachloride (88 mg, 0.377 mmol), pentane (2 mL), and diethyl ether (8 mL). Both were cooled in the freezer (−32° C.) for 30 minutes. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield a yellow oil (S26) (207 mg, 84%).

Step 7. In a nitrogen-filled glovebox a 20 mL scintillation vial was charged with compound S26 (207 mg, 0.32 mmol), diethyl ether (15 mL), and a magnetic stirbar, then placed in the freezer (−32° C.) for 1 h. The mixture was removed from the freezer, stirred, and MeMgBr (0.26 mL, 3M in diethyl ether, 0.79 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure to yield a yellow solid (Catalyst 9) (145 mg, 75%). 1H NMR (400 MHz, CDCl$_3$) δ 8.10 (d, 1H, J=6.7), 7.94 (dd, 2H, J=11.9, 8.6), 7.57 (s, 1H), 7.51 (dd, 1H, J=8.7, 1.7), 7.43 (dd, 1H, J=8.7, 1.7), 7.27 (t, 1H, J=8.7), 7.0 (m, 1H), 6.8 (s, 1H), 6.54 (d, 1H, J=8.0), 6.51 (q, 1H, J=2.6), 6.46 (q, 1H, J=2.5), 5.7 (q, 1H, J=2.3), 5.66 (q, 1H, J=2.3), 3.07 (s, 3H), 1.29 (s, 9H), 1.16 (s, 3H), 1.05 (s, 9H), −1.14 (s, 3H), −1.17 (s, 3H).

Example 6

(2-methoxyphenyl)(methyl)silyl(2,7-di-tert-butyl-fluorenyl)(cyclopentadienyl)hafnium(IV)dimethyl Step 1. 2-(methyldichlorosilyl)-anisole. In a nitrogen-filled glove box a 100 mL round bottom flask was charged with methyltrichlorosilane (27.8 g, 0.186 mol), diethyl ether (60 mL) and a magnetic stir bar, and then cooled to −40° C. in a cold bath. To this stirring mixture a solution of (2-methoxyphenyl)lithium (4.247 g, 0.0372 mol) in diethyl ether (32 mL) was added dropwise. The mixture was allowed to stir for 45 minutes at −40° C., and then allowed to warm to room temperature. After 3 hours the mixture was filtered through celite and concentrated under reduced pressure. The resulting liquid was purified by vacuum distillation (approx. 65° C.) to afford a colorless oil (S1) (5.34 g, 65%).

Step 2. chloro(2,7-di-tert-butyl-9H-fluoren-9-yl)(2-methoxyphenyl)(methyl)silane. In a nitrogen-filled glovebox a 100 mL round bottom flask was charged with compound S1 (2.00 g, 9.04 mmol), pentane (60 mL), and a magnetic stir bar. Lithium 2,7-di-t-butylfluorenide (0.913 g, 7.48 mmol) was added as a solid to the solution of silane while stirring. The mixture was left to stir overnight at room temperature. The resulting slurry was filtered through a plug of celite. The filtrate was concentrated under reduced pressure to afford a white solid (S22) (3.81 g, 91%).

Step 3. (2,7-di-tert-butyl-9H-fluoren-9-yl)(2-methoxyphenyl)(methyl)silyl trifluoromethanesulfonate. In a nitrogen-filled glovebox a 100 mL round bottom flask was charged with compound 22 (3.81 g, 8.23 mmol), dichloromethane (60 mL) and a magnetic stir bar. Silver trifluoromethanesulfonate (2.115 g, 8.23 mmol), was added as a solid. The slurry was stirred 2 h at room temperature and then filtered through a pad of celite. Solvent was removed under reduced pressure to afford a white solid (S23) (4.68 g, 98%).

Step 4. In a nitrogen-filled glovebox a 20 scintillation vial was charged with compound S23 (641 mg, 1.11 mmol), diethyl ether (10 mL), and a magnetic stir bar. In a separate 20 mL scintillation vial cyclopentadienyllithium (88 mg, 1.22 mmol) was dissolved in ether (10 mL). Both solutions were cooled in freezer (−32° C.) for 2 h. The solution of cyclopentadienyllithium was added dropwise to the solution of silane while stirring. The mixture was allowed to warm to room temperature and left to stir overnight. The mixture was concentrated under a flow of nitrogen and triturated with pentane. The resulting slurry was filtered through a plug containing celite/silica/celite. The filtrate was concentrated under reduced pressure to afford a colorless oil (S24) (442 mg, 81%).

Step 5. In a nitrogen-filled glovebox a 20 mL scintillation vial was charged with compound S24 (442 mg, 0.9 mmol), pentane (8 mL), ether (4 mL), and a magnetic stirbar. The mixture was cooled in the freezer (−32° C.) for 1 h. The mixture was removed from the freezer and n-BuLi (0.76 ml of a 2.5 M solution) was added dropwise to the stirring solution. After 5 h the mixture was concentrated under a flow of nitrogen and the resulting solid was triturated with pentane, collected by vacuum filtration, and washed with pentane to afford an off-white solid. (S25) (447 mg, 98%).

Step 6. In a nitrogen-filled glovebox a 20 mL scintillation vial was charged with compound S25 (112 mg, 0.23 mmol), diethyl ether (7 mL), and a magnetic stirbar. A 20 mL scintillation vial was charged with $HfCl_4(THF)_2$ (106 mg, 0.23 mmol) and diethyl ether (7 mL). Both were cooled in the freezer (−32° C.) for 1 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield a yellow oil (S27) (161 mg, 95%).

Step 7. In a nitrogen-filled glovebox a 20 mL scintillation vial was charged with compound S27 (161 mg, 0.22 mmol), diethyl ether (10 mL), and a magnetic stirbar, then placed in the freezer (−32° C.) for 1 h. The mixture was removed from the freezer, stirred, and MeMgBr (0.18 mL, 3M in diethyl ether, 0.54 mmol) was added dropwise. The mixture was allowed to warm to room temperature and stir 4 h. The mixture was then concentrated under a flow of nitrogen. Toluene was added and removed under reduced pressure then added again. The slurry was filtered through celite and concentrated under reduced pressure, redissolved in toluene (1 mL) and allowed to stand in the freezer (−32° C.) overnight. The solvent was decanted and crystals dried under reduced pressure to afford a yellow solid (Catalyst 10) (114 mg, 75%). 1H NMR (400 MHz, $CDCl_3$) δ 8.12 (m, 1H), 7.94 (dd, 2H, J=13.4, 8.8), 7.6 (s, 1H), 7.44 (d, 1H, J=8.7), 7.35 (s, 1H), 7.27 (t, 1H, J=7.8), 7.0 (m, 1H), 6.95 (s, 1H), 6.87 (s, 1H), 6.55 (d, 1H, J=8.4), 6.39 (d, 2H, J=21.0), 5.66 (d, 2H, J=6.9), 3.07 (s, 3H), 1.31 (s, 9H), 1.18 (s, 3H), 1.07 (s, 9H), −1.35 (s, 3H), −1.37 (s, 3H).

Example 7

(2-dimethylaminophenyl)(methyl)silyl(2,7-di-t-butylfluorenyl)(cyclopentadienyl)hafnium(IV)dimethyl Step 1. 2-(methyldichlorosilyl)-dimethylaniline. In a nitrogen-filled glove box a 100 mL round bottom flask was charged with methyltrichlorosilane (16.0 g, 0.186 mol), diethyl ether (30 mL) and a magnetic stir bar, and then cooled in a freezer (−32° C.) for 1.5 h. To this stirring mixture a cooled solution of (2-dimethylaminophenyl)lithium (2.718 g, 0.0372 mol) in diethyl ether (40 mL) was added dropwise. The mixture was allowed to stir and warm to room temperature. After 2 hours the mixture was filtered through celite and concentrated under reduced pressure. The resulting liquid was purified by vacuum distillation (approx. 70° C.) to afford a colorless oil (S7) (3.12 g, 62%).

Step 2. chloro(2,7-di-tert-butyl-9H-fluoren-9-yl)(2-methoxyphenyl)(methyl)silane. In a nitrogen-filled glovebox a 20 mL scintillation vial was charged with compound S7 (430 mg, 1.83 mmol), ether (10 mL), and a magnetic stir bar and then cooled in a freezer (−32° C.) for 1 h. Lithium 2,7-di-t-butylfluorenide (522 mg, 1.83 mmol) was added as a solution in ether (10 mL) to the solution of silane while stirring. The mixture was left to stir overnight at room temperature. The resulting slurry was filtered through a plug of celite. The filtrate was concentrated under reduced pressure to afford a yellow solid (S28) (858 mg, 98%).

Step 3. (2,7-di-tert-butyl-9H-fluoren-9-yl)(2-methoxyphenyl)(methyl)silyl trifluoromethanesulfonate. In a nitrogen-filled glovebox a 20 mL scintillation vial was charged with compound 28 (858 mg, 1.8 mmol), dichloromethane (10 mL) and a magnetic stir bar. Silver trifluoromethanesulfonate (486 mg, 1.9 mmol), was added as a solid. The slurry was stirred for 2 h at room temperature and then filtered through a pad of celite/silica/celite. Solvent was removed under reduced pressure to afford a pale yellow oil (S29) (371 mg, 35%).

Step 4. In a nitrogen-filled glovebox a 20 scintillation vial was charged with compound S29 (371 mg, 0.63 mmol), diethyl ether (10 mL), and a magnetic stir bar. In a separate 20 mL scintillation vial cyclopentadienyllithium (62 mg, 0.66 mmol) was suspended in ether (10 mL). Both solutions were cooled in freezer (−32° C.) for 2 h. The solution of cyclopentadienyllithium was added dropwise to the solution of silane while stirring. The mixture was allowed to warm to room temperature and left to stir overnight. The mixture was concentrated under a flow of nitrogen and triturated with pentane. The resulting slurry was filtered through a plug containing celite/silica/celite. The filtrate was concentrated under reduced pressure to afford a yellow oil (S30) (290 mg, 91%).

Step 5. In a nitrogen-filled glovebox a 20 mL scintillation vial was charged with compound S30 (290 mg, 0.57 mmol), ether (10 mL), and a magnetic stirbar. The mixture was cooled in the freezer (−32° C.) for 1 h. The mixture was removed from the freezer and n-BuLi (0.57 ml of a 2.5 M solution) was added dropwise to the stirring solution. After 5 h the mixture was concentrated under a flow of nitrogen and the resulting solid was triturated with pentane, collected by vacuum filtration, and washed with pentane to afford an off-white solid (S31) (317 mg, 94%).

Step 6. In a nitrogen-filled glovebox a 20 mL scintillation vial was charged with compound S31 (317 mg, 0.536 mmol), diethyl ether (10 mL), and a magnetic stirbar. A 20 mL scintillation vial was charged with hafnium(IV)tetrachloride bis(THF) (249 mg, 0.536 mmol) and diethyl ether (5 mL). Both were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield a yellow oil (S32) (387 mg, 96%).

Step 7. In a nitrogen-filled glovebox a 20 mL scintillation vial was charged with compound S32 (130 mg, 0.17 mmol), diethyl ether (10 mL), and a magnetic stirbar, then placed in the freezer (−32° C.) for 1 h. The mixture was removed from the freezer, stirred, and MeMgBr (0.12 mL, 3M in diethyl ether, 0.35 mmol) was added dropwise. The mixture was allowed to warm to room temperature and stir 4 h. The mixture was then concentrated under a flow of nitrogen. Toluene was added and removed under reduced pressure then added again. The slurry was filtered through celite and concentrated under reduced pressure to yield a yellow-orange oil. (Catalyst 11) (120 mg, 97%). 1H NMR (400 MHz, CDCl$_3$) δ 8.21 (s, 1H), 7.96 (dd, 2H, J=14.9, 8.8), 7.63 (s, 1H), 7.50 (d, 1H, J=8.8), 7.43 (d, 1H, J=8.8), 7.28 (t, 1H, J=7.6), 7.05 (d, 1H, J=8.0), 6.72 (s, 1H), 6.45 (s, 1H), 6.38 (d, 1H, J=8.4), 5.69 (d, 2H, J=21.0), 2.26 (s, 6H), 1.31 (s, 9H), 1.2 (s, 3H), 1.05 (s, 9H), −1.33 (s, 3H), −1.35 (s, 3H).

Example 8

(2-methoxyphenyl)(methyl)silyl(2,3,4,5-tetramethyl-cyclopentadienyl)(indenyl)zirconium(IV)dimethyl Step 1. 2-(methyldichlorosilyl)-anisole. In a nitrogen-filled glove box a 100 mL round bottom flask was charged with methyltrichlorosilane (27.8 g, 0.186 mol), diethyl ether (60 mL) and a magnetic stir bar, and then cooled to −40° C. in a cold bath. To this stirring mixture a solution of (2-methoxyphenyl)lithium (4.247 g, 0.0372 mol) in diethyl ether (32 mL) was added dropwise. The mixture was allowed to stir for 45 minutes at −40° C., and then allowed to warm to room temperature. After 3 hours the mixture was filtered through celite and concentrated under reduced pressure. The resulting liquid was purified by vacuum distillation (approx. 65° C.) to afford a colorless oil (S1) (5.34 g, 65%).

Step 2. chloro(2-methoxyphenyl)(methyl)(2,3,4,5-tetramethylcyclopenta-2,4-dienyl)silane. In a nitrogen-filled glovebox a 100 mL round bottom flask was charged with compound S1 (2.462 g, 11.13 mmol), ether (30 mL), THF (10 mL) and a magnetic stir bar. Sodium tetramethylcyclopentadienide (1.685 g, 11.69 mmol) was added as a suspension in ether (20 mL) to the solution of silane while stirring. The mixture was left to stir overnight at room temperature. The resulting slurry was evaporated under a flow of nitrogen, triturated with pentane and filtered through a plug of celite. The filtrate was concentrated under reduced pressure to afford a white solid (S33) (2.839 g, 83%).

Step 3. (1H-inden-1-yl)(2-methoxyphenyl)(methyl)(2,3,4,5-tetramethylcyclopenta-2,4-dienyl)silane. In a nitrogen-filled glovebox a 20 scintillation vial was charged with compound S33 (228 mg, 0.74 mmol), diethyl ether (8 mL), and a magnetic stir bar. In a separate 20 mL scintillation vial indenyllithium (96 mg, 0.78 mmol) was dissolved in ether (8 mL). Both solutions were cooled in freezer (−32° C.) for 1 h. The solution of indenyllithium was added dropwise to the solution of silane while stirring. The mixture was allowed to warm to room temperature and left to stir overnight. The mixture was concentrated under a flow of nitrogen and triturated with pentane. The resulting slurry was filtered through a plug containing celite/silica/celite. The filtrate was concentrated under reduced pressure to afford a colorless oil (S34) (233 mg, 81%).

Step 4. 1-((2-methoxyphenyl)(methyl)(2,3,4,5-tetramethylcyclopenta-2,4-dien-1-ideyl)silyl)-1H-inden-1-ide. In a nitrogen-filled glovebox a 20 mL scintillation vial was charged with compound S34 (233 mg, 0.60 mmol), ether (10 mL), and a magnetic stirbar. The mixture was cooled in the freezer (−32° C.) for 1 h. The mixture was removed from the freezer and n-BuLi (0.84 ml of a 2.5 M solution) was added dropwise to the stirring solution allowed to stir overnight. The mixture was concentrated under a flow of nitrogen and the resulting solid was triturated with pentane, collected by vacuum filtration, and washed with pentane to afford an off-white solid (S35) (215 mg, 89%).

Step 5. In a nitrogen-filled glovebox a 20 mL scintillation vial was charged with compound S35 (215 mg, 0.54 mmol), diethyl ether (7 mL), and a magnetic stirbar. A 20 mL scintillation vial was charged with ZrCl4 (126 mg, 0.54 mmol) and diethyl ether (8 mL). Both were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield a yellow oil (S36) (200 mg, 68%).

Step 6. In a nitrogen-filled glovebox a 20 mL scintillation vial was charged with compound S36 (200 mg, 0.37 mmol), diethyl ether (10 mL), and a magnetic stirbar, then placed in the freezer (−32° C.) for 2 h. The mixture was removed from the freezer, stirred, and MeMgBr (0.31 mL, 3M in diethyl ether, 0.92 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure yielding a yellow semi-solid. (Catalyst 12) (48 mg, 26%). 1H NMR (400 MHz, CDCl$_3$) δ 7.99 (s, 1H), 7.67 (d, 1H, J=8.5), 7.45 (d, 1H, J=9.5), 7.21 (m, 3H), 6.9 (m, 2H), 6.52 (d, 1H, J=8.2), 5.78 (s, 1H), 3.28 (s, 3H), 1.87 (s, 3H), 1.82 (s, 3H), 1.76 (s, 3H), 1.40 (s, 3H), 1.03 (s, 3H), −0.2 (s, 3H), −1.3 (s, 3H).

Example 9

(2-methoxyphenyl)(methyl)silyl(2,3,4,5-tetramethylcyclopentadienyl)(indenyl)hafnium(IV)dimethyl Step 1. 2-(methyldichlorosilyl)-anisole. In a nitrogen-filled glove box a 100 mL round bottom flask was charged with methyltrichlorosilane (27.8 g, 0.186 mol), diethyl ether (60 mL) and a magnetic stir bar, and then cooled to −40° C. in a cold bath. To this stirring mixture a solution of (2-methoxyphenyl)lithium (4.247 g, 0.0372 mol) in diethyl ether (32 mL) was added dropwise. The mixture was allowed to stir for 45 minutes at −40° C., and then allowed to warm to room temperature. After 3 hours the mixture was filtered through celite and concentrated under reduced pressure. The resulting liquid was purified by vacuum distillation (approx. 65° C.) to afford a colorless oil (S1) (5.34 g, 65%).

Step 2. chloro(2-methoxyphenyl)(methyl)(2,3,4,5-tetramethylcyclopenta-2,4-dienyl)silane. In a nitrogen-filled glovebox a 100 mL round bottom flask was charged with compound S1 (2.462 g, 11.13 mmol), ether (30 mL), THF (10 mL) and a magnetic stir bar. Sodium tetramethylcyclopentadienide (1.685 g, 11.69 mmol) was added as a suspension in ether (20 mL) to the solution of silane while stirring. The mixture was left to stir overnight at room temperature. The resulting slurry was evaporated under a flow of nitrogen, triturated with pentane and filtered through a plug of celite. The filtrate was concentrated under reduced pressure to afford a white solid (S33) (2.839 g, 83%).

Step 3. (1H-inden-1-yl)(2-methoxyphenyl)(methyl)(2,3,4,5-tetramethylcyclopenta-2,4-dienyl)silane. In a nitrogen-filled glovebox a 20 scintillation vial was charged with compound S33 (228 mg, 0.74 mmol), diethyl ether (8 mL), and a magnetic stir bar. In a separate 20 mL scintillation vial indenyllithium (96 mg, 0.78 mmol) was dissolved in ether (8 mL). Both solutions were cooled in freezer (−32° C.) for 1 h. The solution of indenyllithium was added dropwise to the solution of silane while stirring. The mixture was allowed to warm to room temperature and left to stir overnight. The mixture was concentrated under a flow of nitrogen and triturated with pentane. The resulting slurry was filtered through a plug containing celite/silica/celite. The filtrate was concentrated under reduced pressure to afford a colorless oil (S34) (233 mg, 81%).

Step 4. 1-((2-methoxyphenyl)(methyl)(2,3,4,5-tetramethylcyclopenta-2,4-dien-1-ideyl)silyl)-1H-inden-1-ide. In a nitrogen-filled glovebox a 20 mL scintillation vial was charged with compound S34 (233 mg, 0.60 mmol), ether (10 mL), and a magnetic stirbar. The mixture was cooled in the freezer (−32° C.) for 1 h. The mixture was removed from the freezer and n-BuLi (0.84 ml of a 2.5 M solution) was added dropwise to the stirring solution allowed to stir overnight. The mixture was concentrated under a flow of nitrogen and the resulting solid was triturated with pentane, collected by vacuum filtration, and washed with pentane to afford an off-white solid (S35) (215 mg, 89%).

Step 5. In a nitrogen-filled glovebox a 20 mL scintillation vial was charged with compound S35 (239 mg, 0.60 mmol), diethyl ether (3 mL), and a magnetic stirbar. A separate 20 mL scintillation vial was charged with HfCl$_2$(THF)$_2$(PhN(CH$_2$)$_3$NPh) (370 mg, 0.60 mmol) and diethyl ether (3 mL). Both vials were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield an orange oil (S37) (464 mg, 98%).

Step 6. In a nitrogen-filled glovebox a 20 mL scintillation vial was charged with compound S37 (464 mg, 0.61 mmol), diethyl ether (3 mL), dichloromethane (3 mL), and a magnetic stirbar. This mixture was cooled in the freezer (−32° C.) and then HCl (0.61 mL, 2M in diethyl ether, 0.58 mmol) was added dropwise. The mixture was allowed to warm to room temperature and stirred. After 2.5 h the mixture was concentrated under reduced pressure and the resulting solid was resuspended in diethyl ether and collected by vacuum filtration to afford a yellow-orange solid (S38) (381 mg, 97%).

Step 7. In a nitrogen-filled glovebox a 20 mL scintillation vial was charged with compound S38 (381 mg, 0.60 mmol), diethyl ether (3 mL), THF (3 mL) and a magnetic stirbar, then placed in the freezer (−32° C.) for 1 h. The mixture was removed from the freezer, stirred, and MeMgBr (0.11 mL, 3M in diethyl ether, 0.33 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure. The resulting oil was stirred in pentane and the solid collected by vacuum filtration. The resulting lightly colored solid was dissolved in toluene (1 mL) and allowed to stand inside a vial containing pentane in freezer overnight. The solvent was evaporated to yield a viscous light orange oil (Catalyst 13) (265 mg, 74%). 1H NMR (400 MHz, CDCl$_3$) δ 8.0 (s, 1H), 7.67 (d, 1H, J=8.8), 7.47 (d, 1H, J=8.8), 7.35 (s, 1H), 7.2-6.9 (overlapping signals, 3H), 6.53 (d, 2H, J=8.4), 5.76 (d, 1H, J=3.2), 3.28 (s, 3H), 2.10 (s, 3H), 1.89 (s, 3H), 1.82 (s, 3H), 1.77 (s, 3H), 1.04 (s, 3H), −0.38 (s, 3H), −1.5 (s, 3H).

Example 10 rac-bis(3-phenoxypropyl)silyl bis(indenyl)hafnium(IV)dimethyl

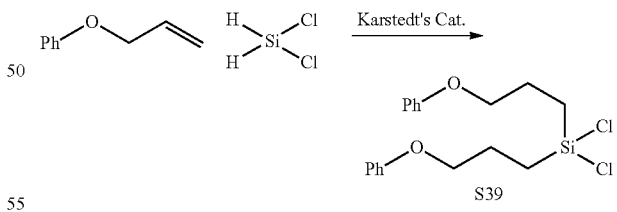

Step 1. dichlorobis(3-phenoxypropyl)silane. In a nitrogen filled glovebox a 20 mL scintillation vial was charged with allyl phenyl ether (6.58 mL, 48.0 mmol), Dichlorosilane (9.459 g (25% wt. In Xylenes), 23.4 mmol), and karstedt's catalyst (5 drops of 2% Pt by wt. in xylene). The vial was sealed and allowed to stir at room temperature for 3 days. Then another drop of karstedt's catalyst was added the vial resealed and allowed to stir at room temperature for 24 h. Then another 2 drops of karstedt's catalyst was added the vial resealed and allowed to stir at room temperature for 24 h. The reaction mixture was distilled through a short path distillation apparatus collected in 20 degree increments starting at 100° C. Compound distilled at 180° C. under reduced pressure (approximately 2.0 torr). It was further purified via pentane recrystallization at −35° C. The pentane was decanted yielding a white crystalline solid S39 (2.966 g, 35%).

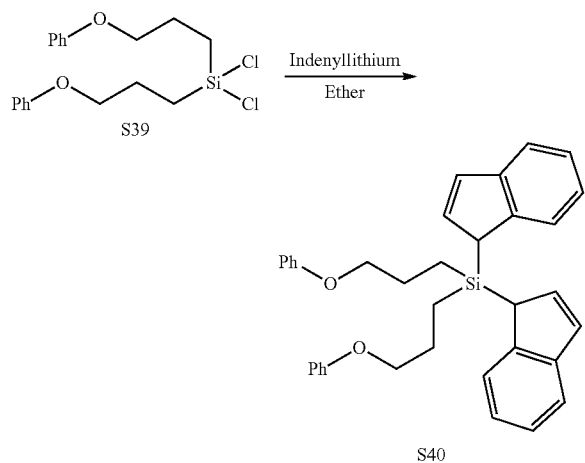

Step 2. di(1H-inden-1-yl)bis(3-phenoxypropyl)silane. In a nitrogen-filled glovebox a 20 mL scintillation vial was charged with compound S39 (1.896 g, 5.4 mmol), diethyl ether (10 mL), and a magnetic stir bar. In a 20 mL scintillation vial indenyllithium (1.316 g, 10.8 mmol) was dissolved in ether (10 mL). Both solutions were cooled in freezer (−32° C.) for 1 h. The solution of indenyllithium was added dropwise to the solution of silane while stirring. The vial was sealed and the mixture was heated to 30° C. and left to stir overnight. The mixture was concentrated under reduced pressure and triturated with 1:1 pentane:toluene. The resulting slurry was filtered through a plug containing celite/silica/celite. The filtrate was concentrated, and purified via column chromatography with pentane:toluene (99:1) as the solvent. Evaporation of later fractions afforded a colorless oil (S40) (987 mg, 36%).

Step 3. 1,1'-(bis(3-phenoxypropyl)silanediyl)bis(1H-inden-1-ide). In a nitrogen-filled glovebox a 50 mL round bottom flask was charged with compound S40 (725 mg, 1.36 mmol), pentane (20 mL), diethyl ether (10 mL), and a magnetic stirbar. The flask was placed in the freezer (−32° C.) for 2 h. n-BuLi (1.87 ml of a 1.6 M solution, 2.99 mmol) was added dropwise to the stirring solution. The mixture was allowed to warm to room temperature. After 2 h an off-white solid was collected by vacuum filtration and dried under reduced pressure (S41) (497 mg, 70%).

Step 4. In a nitrogen-filled glovebox a 20 mL scintillation vial was charged with compound S41 (325 mg, 0.60 mmol), diethyl ether (3 mL), and a magnetic stirbar. A 20 mL scintillation vial was charged with the HfCl$_2$(THF)$_2$(PhN(CH$_2$)$_3$NPh) (368 mg, 0.60 mmol) and diethyl ether (3 mL). Both mixtures were cooled in the freezer (−32° C.) for 2 h. The mixtures were combined, stirred, and allowed to warm to room temperature. After stirring overnight the mixture was concentrated under a flow of nitrogen. Toluene was added and removed under reduced pressure then added again. The resulting slurry was filtered through a pad of celite. The filtrate was concentrated under reduced pressure to yield an orange oil (S42) (580 mg, quantitative).

Step 5. In a nitrogen-filled glovebox a 20 mL scintillation vial was charged with compound S42 (580 mg, 0.63 mmol), diethyl ether (3 mL), dichloromethane (3 mL), and a magnetic stirbar. This mixture was cooled in the freezer (−32° C.) for 2 h and then HCl (0.63 mL, 2M in diethyl ether, 1.26 mmol) was added dropwise. The mixture was allowed to warm to room temperature and stirred. After 2.5 h the mixture was concentrated under reduced pressure and the resulting solid was resuspended in diethyl ether (7 mL), cooled in the freezer for 2 h and collected by vacuum filtration to afford a yellow solid (S43) (100 mg, 21%).

Step 6. In a nitrogen-filled glovebox a 20 mL scintillation vial was charged with compound S43 (100 mg, 0.13 mmol), diethyl ether (5 mL), and a magnetic stirbar, then placed in the freezer (−32° C.) for 1 h. The mixture was removed from the freezer, stirred, and Me$_2$Mg (11 mg, in diethyl ether (2 mL), 0.19 mmol) was added dropwise. The mixture was allowed to warm to room temperature and stir overnight. The mixture was then concentrated under a flow of nitrogen. Toluene was added and removed under reduced pressure then added again. The slurry was filtered through celite and concentrated under reduced pressure to yield a viscous orange oil (Catalyst 14) (102 mg, 60%). 1H NMR (400 MHz, CDCl$_3$) δ 7.47 (d, 4H, J=8.6), 7.41 (d, 4H, J=8.7), 7.19 (d, 2H, J=8.6), 7.2-6.7 (overlapping signals, 6H), 6.63 (dd, 4H, J=3.3, 0.6), 5.7 (d, 2H, J=3.24), 3.75 (t, 4H, J=5.9), 1.9 (m, 4H), 1.35 (m, 4H), −1.15 (s, 6H).

Example 11 rac-(2,5-dimethoxyphenyl)(methyl)silyl-bis(indenyl)hafnium(IV)dimethyl

Step 1. dichloro(2,5-dimethoxyphenyl)(methyl)silane. In a nitrogen-filled glove box a 250 mL round bottom flask was charged with methyltrichlorosilane (40.8 mL, 0.348 mol), diethyl ether (150 mL) and a magnetic stir bar, and then cooled to −35° C. in the freezer. To this stirring mixture a solution of (2,5-dimethoxyphenyl)lithium (5.008 g, 0.0348 mol) in diethyl ether (50 mL) was added dropwise. The mixture was allowed to stir and warm to room temperature. After 24 hours the mixture was filtered through celite and concentrated under reduced pressure. The resulting liquid was then purified by vacuum distillation (145° C., at approx. 1 torr) to afford a colorless oil (S44) (6.33 g, 73%).

Step 2. (2,5-dimethoxyphenyl)(methyl)silanediyl bis(trifluoromethanesulfonate). In a nitrogen-filled glovebox a 50 mL round bottom flask was charged with silver trifluoromethanesulfonate (2.57 g, 10.0 mmol), toluene (20 mL) and a magnetic stir bar. Compound S44 (1.223 g, 4.9 mmol) in toluene (10 mL) was added dropwise to the resulting slurry. The slurry was stirred 5 h and then filtered through a pad of celite. Solvent was removed under reduced pressure to afford colorless viscous oil (S45) (1.381 g, 59%).

Step 3. di(1H-inden-1-yl)(2,5-dimethoxyphenyl)(methyl)silane. In a nitrogen-filled glovebox a 20 mL scintillation vial was charged with the compound S45 (874 mg, 1.83 mmol), diethyl ether (10 mL), and a magnetic stir bar. In a separate 20 mL scintillation vial, indenyllithium (446 mg, 3.65 mmol) was dissolved in ether (10 mL). Both vials were cooled in freezer (−32° C.) for 1 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing layered celite/silica/celite. The filtrate was concentrated under reduced pressure to afford a colorless oil (S46) (742 mg, 99%).

Step 4. 1,1'-((2,5-dimethoxyphenyl)(methyl)silanediyl) bis(1H-inden-1-ide). In a nitrogen-filled glovebox a 20 mL scintillation vial was charged with compound S46 (835 mg, 2.03 mmol), diethyl ether (4 mL), pentane (2 mL) and a magnetic stirbar. The vial was placed in the freezer (−32° C.) for 2 h. n-BuLi (2.61 ml of a 1.6 M solution) was added dropwise to the stirring solution. The mixture was allowed to warm to room temperature. After 1.5 h, the mixture was concentrated under a flow of nitrogen. The resulting solid was triturated with pentane and an off-white solid was collected by vacuum filtration. (S47) (448 mg, 50%).

Step 5. In a nitrogen-filled glovebox a 20 mL scintillation vial was charged with compound S47 (448 mg, 1.06 mmol), diethyl ether (8 mL), and a magnetic stirbar. A separate 20 mL scintillation vial was charged with $HfCl_2(THF)_2(PhN(CH_2)_3NPh)$ (653 mg, 1.06 mmol) and diethyl ether (8 mL). Both vials were cooled in the freezer (−32° C.) for 2 h. The mixtures were combined, stirred, and allowed to warm to room temperature. After stirring overnight the mixture was concentrated under a flow of nitrogen. Toluene was added and the resulting slurry was filtered through a pad of celite. The filtrate was concentrated under reduced pressure to yield an orange oil (S48) (861 mg, quant.).

Step 6. In a nitrogen-filled glovebox a 20 mL scintillation vial was charged with compound S48 (861 mg, 1.06 mmol), dichloromethane (5 mL), and a magnetic stirbar. This mixture was cooled in the freezer (−32° C.) and then HCl (0.72 mL, 3M in diethyl ether, 2.12 mmol) was added dropwise. The mixture was allowed to warm to room temperature and stirred. After 3 h the mixture was concentrated under reduced pressure and the resulting solid was resuspended in diethyl ether and collected by vacuum filtration, and washed with diethyl ether to afford a yellow-orange solid (S49) (265 mg, 38%).

Step 7. In a nitrogen-filled glovebox a 20 mL scintillation vial was charged with compound S49 (265 mg, 0.40 mmol), diethyl ether (5 mL), and a magnetic stirbar, then placed in the freezer (−32° C.) for 1 h. The mixture was removed from the freezer, stirred, and $Me_2Mg$ (45 mg, 0.83 mmol), in diethyl ether (5 mL), was added dropwise. The mixture was allowed to warm to room temperature and stir overnight. The mixture was then concentrated under a flow of nitrogen. Toluene was added and the slurry was filtered through celite and concentrated under reduced pressure to yield an orange oil (Catalyst 15) (190 mg, 79%). 1H NMR (400 MHz, $CDCl_3$) δ 7.77 (d, 1H, J=3.2), 7.47 (d, 1H, J=8.5), 7.40 (q, 2H, J=8.3), 7.02 (m, 2H), 6.93 (m, 2H), 6.63 (dd, 2H, J=9.3, 3.2), 6.55-6.5 (overlapping signals, 2H), 5.89 (d, 1H, J=3.3), 5.83 (d, 1H, J=3.2), 3.36 (s, 3H), 3.18 (s, 3H), 1.00 (s, 3H), −1.11 (s, 3H), −1.18 (s, 3H).

Example 12 rac-(2,6-dimethoxyphenyl)(methyl)silyl-bis(indenyl) hafnium(IV)dimethyl

Step 1. dichloro(2,6-dimethoxyphenyl)(methyl)silane. In a nitrogen-filled glove box a 250 mL round bottom flask was charged with methyltrichlorosilane (40.8 mL, 0.348 mol), diethyl ether (150 mL) and a magnetic stir bar, and then cooled to −35° C. in the freezer. To this stirring mixture a solution of (2,6-dimethoxyphenyl)lithium (5.01 g, 0.0348 mol) in diethyl ether (50 mL) was added dropwise. The mixture was allowed to stir and warm to room temperature. After 24 hours the mixture was filtered through celite and concentrated under reduced pressure. The resulting liquid was then purified by vacuum distillation (180° C., at approx. 1 torr) to afford a colorless oil (S50) (2.748 g, 31%).

Step 2. (2,6-dimethoxyphenyl)(methyl)silanediyl bis(trifluoromethanesulfonate). In a nitrogen-filled glovebox a 20 mL scintillation vial was charged with silver trifluoromethanesulfonate (2.64 g, 10.3 mmol), toluene (9 mL) and a magnetic stir bar. Compound S50 (1.258 g, 5.0 mmol) in toluene (9 mL) was added dropwise to the resulting slurry. The slurry was stirred 2 h and then filtered through a pad of celite. Solvent was removed under reduced pressure to afford a colorless viscous oil (S51) (2.32 g, 97%).

Step 3. di(1H-inden-1-yl)(2,6-dimethoxyphenyl)(methyl)silane. In a nitrogen-filled glovebox a 50 mL round bottom flask was charged with the compound S51 (2.32 g, 4.8 mmol), diethyl ether (20 mL), and a magnetic stir bar. In a 20 mL scintillation vial, indenyllithium (1.18 g, 9.7 mmol) was dissolved in ether (20 mL). Both solutions were cooled in freezer (−32° C.) for 2 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing layered celite/silica/celite. The filtrate was concentrated under reduced pressure to afford a colorless oil (S52) (1.91 g, 96%).

Step 4. 1,1'-((2,6-dimethoxyphenyl)(methyl)silanediyl) bis(1H-inden-1-ide). In a nitrogen-filled glovebox a 20 mL scintillation vial was charged with compound S52 (835 mg, 2.03 mmol), diethyl ether (10 mL), pentane (5 mL) and a magnetic stirbar. The vial was placed in the freezer (−32° C.) for 2 h. n-BuLi (2.61 ml of a 1.6 M solution) was added dropwise to the stirring solution. The mixture was allowed to warm to room temperature. After 4 h, the mixture was concentrated under a flow of nitrogen. The resulting solid was triturated with pentane and an off-white solid was collected by vacuum filtration. (S53) (2.018 g, 96%).

Step 5. In a nitrogen-filled glovebox a 20 mL scintillation vial was charged with compound S53 (656 mg, 1.55 mmol), diethyl ether (9 mL), and a magnetic stirbar. A separate 20 mL scintillation vial was charged with $HfCl_2(THF)_2(PhN(CH_2)_3NPh)$ (957 mg, 1.55 mmol) and diethyl ether (9 mL). Both vials were cooled in the freezer (−32° C.) for 2 h. The mixtures were combined, stirred, and allowed to warm to room temperature. After stirring overnight the mixture was concentrated under a flow of nitrogen. Toluene was added and the resulting slurry was filtered through a pad of celite. The filtrate was concentrated under reduced pressure to yield an orange oil (S54) (1.110 g, 88%).

Step 6. In a nitrogen-filled glovebox a 20 mL scintillation vial was charged with compound S54 (1.11 g, 1.4 mmol), dichloromethane (10 mL), and a magnetic stirbar. This mixture was cooled in the freezer (−32° C.) and then HCl (0.92 mL, 3M in diethyl ether, 2.74 mmol) was added dropwise. The mixture was allowed to warm to room temperature and stirred. After 3 h the mixture was concentrated under reduced pressure and the resulting solid was resuspended in diethyl ether and collected by vacuum filtration, and washed with diethyl ether to afford a yellow-orange solid. This solid was dissolved in warm diethyl ether (3 mL) and then placed in the freezer. The following day the liquid was decanted and the crystals washed with cold diethyl ether, affording yellow-orange crystals. (S55) (513 mg, 57%).

Step 7. In a nitrogen-filled glovebox a 20 mL scintillation vial was charged with compound S55 (191 mg, 0.53 mmol), diethyl ether (10 mL), and a magnetic stirbar, then placed in the freezer (−32° C.) for 1 h. The mixture was removed from the freezer, stirred, and Me₂Mg (73 mg, 1.33 mmol), in diethyl ether (5 mL), was added dropwise. The mixture was allowed to warm to room temperature and stir overnight. The mixture was then concentrated under a flow of nitrogen. Toluene was added and the slurry was filtered through celite and concentrated under reduced pressure to yield an orange oil (Catalyst 16) (177 mg, 99%). 1H NMR (400 MHz, CDCl₃) δ 7.48 (m, 3H), 7.23 (t, 1H, J=8.3), 7.1-6.95 (overlapping signals, 3H), 6.6 (m, 2H), 6.32 (d, 2H, J=8.3), 5.82 (d, 2H, J=16.7), 3.1 (s, 6H), 1.07 (s, 3H), −1.09 (s, 3H), −1.14 (s, 3H).

Example 13 rac-(2,3-dimethoxyphenyl)(methyl)silyl-bis(indenyl) hafnium(IV)dimethyl

Step 1. dichloro(2,3-dimethoxyphenyl)(methyl)silane. In a nitrogen-filled glove box a 250 mL round bottom flask was charged with methyltrichlorosilane (40.2 mL, 0.343 mol), diethyl ether (150 mL) and a magnetic stir bar, and then cooled to −35° C. in the freezer. To this stirring mixture a solution of (2,3-dimethoxyphenyl)lithium (4.935 g, 0.0343 mol) in diethyl ether (50 mL) was added dropwise. The mixture was allowed to stir and warm to room temperature. After 24 hours the mixture was filtered through celite and concentrated under reduced pressure. The resulting liquid was then purified by vacuum distillation (140° C., at approx. 1 torr) to afford a colorless oil (S56) (4.523 g, 53%).

Step 2. (2,3-dimethoxyphenyl)(methyl)silanediyl bis(trifluoromethanesulfonate). In a nitrogen-filled glovebox a 20 mL scintillation vial was charged with silver trifluoromethanesulfonate (4.331 g, 16.85 mmol), toluene (9 mL) and a magnetic stir bar. Compound S56 (2.016 g, 8.03 mmol) in toluene (9 mL) was added dropwise to the resulting slurry. The slurry was stirred at room temperature for 3 h and then placed in the freezer overnight. The following day the mixture was removed from the freezer and allowed to stir at room temperature for 30 minutes and then filtered through a pad of celite. Solvent was removed under reduced pressure to afford light brown oil (S57) (3.404 g, 89%).

Step 3. di(1H-inden-1-yl)(2,3-dimethoxyphenyl)(methyl) silane. In a nitrogen-filled glovebox a 50 mL round bottom flask was charged with the compound S57 (4.04 g, 8.4 mmol), diethyl ether (20 mL), and a magnetic stir bar. In a 20 mL scintillation vial, indenyllithium (2.06 g, 9.7 mmol) was dissolved in ether (20 mL). Both solutions were cooled in freezer (−32° C.) for 2 h. The solution of indenyllithium was added dropwise to the solution of silane while stirring. The mixture was allowed to warm to room temperature and left to stir overnight. The mixture was concentrated under reduced pressure and triturated with pentane. The resulting slurry was filtered through a plug containing layered celite/silica/celite. The filtrate was concentrated under reduced pressure to afford a colorless oil (S58) (3.178 g, 92%).

Step 4. 1,1'-((2,3-dimethoxyphenyl)(methyl)silanediyl) bis(1H-inden-1-ide). In a nitrogen-filled glovebox a 50 mL round bottom flask was charged with compound S58 (835 mg, 2.03 mmol), diethyl ether (15 mL), pentane (25 mL) and a magnetic stirbar. The vial was placed in the freezer (−32° C.) for 2 h. n-BuLi (9.92 ml of a 1.6 M solution, 15.87 mmol) was added dropwise to the stirring solution. The mixture was allowed to warm to room temperature. After 4 h, the mixture was concentrated under a flow of nitrogen. The resulting solid was triturated with pentane and an off-white solid was collected by vacuum filtration. This solid was dissolved in ether and then precipitated with pentane affording an off-white solid after vacuum filtration (S59) (1.891 g, 58%).

Step 5. In a nitrogen-filled glovebox a 20 mL scintillation vial was charged with compound S59 (738 mg, 1.75 mmol), diethyl ether (10 mL), and a magnetic stirbar. A separate 20 mL scintillation vial was charged with HfCl₂(THF)₂(PhN (CH₂)₃NPh) (1.079 g, 1.75 mmol) and diethyl ether (10 mL). Both vials were cooled in the freezer (−32° C.) for 2 h. The mixtures were combined, stirred, and allowed to warm to room temperature. After stirring overnight the mixture was concentrated under a flow of nitrogen. Toluene was added and the resulting slurry was filtered through a pad of celite. The filtrate was concentrated under reduced pressure to yield an orange oil (S60) (1.455 g, quant.).

Step 6. In a nitrogen-filled glovebox a 20 mL scintillation vial was charged with compound S60 (1.455 g, 1.79 mmol), dichloromethane (10 mL), and a magnetic stirbar. This mixture was cooled in the freezer (−32° C.) and then HCl (1.2 mL, 3M in diethyl ether, 3.59 mmol) was added dropwise. The mixture was allowed to warm to room temperature and stirred. After 3 h the mixture was concentrated under reduced pressure and the resulting solid was resuspended in diethyl ether and collected by vacuum filtration, and washed with diethyl ether to afford a yellow-orange solid. This solid was recrystallized from ether and washed with ether after filtration to yield yellow-orange crystals (S61) (333 mg, 28%).

Step 7. In a nitrogen-filled glovebox a 20 mL scintillation vial was charged with compound S61 (333 mg, 0.5 mmol), diethyl ether (7 mL), and a magnetic stirbar, then placed in the freezer (−32° C.) for 1 h. The mixture was removed from the freezer, stirred, and Me₂Mg (83 mg, 1.5 mmol), in diethyl ether (3 mL), was added dropwise. The mixture was allowed to warm to room temperature and stir overnight. The mixture was then concentrated under a flow of nitrogen. Toluene was added and the slurry was filtered through celite and concentrated under reduced pressure to yield an orange oil (Catalyst 17) (280 mg, 90%). 1H NMR (400 MHz, CDCl₃) δ 7.65 (dd, 1H, J=7.3, 1.4), 7.47 (dd, 2H, J=15.6, 8.5), 7.40 (dd, 1H, J=8.7, 0.8), 7.1-6.9 (overlapping signals, 5H), 6.72 (dd, 1H, J=8.1, 1.1), 6.64 (dd, 2H, J=8.6, 3.0), 6.5 (t, 1H, J=7.67), 5.93 (d, 1H, J=3.4), 5.90 (d, 1H, J=3.2), 3.65 (s, 3H), 3.25 (s, 3H), 1.01 (s, 3H), −1.07 (s, 3H), −1.18 (s, 3H).

Polymerization Characteristics. Each catalyst compound was tested for its polymerization activity, and the polymer produced. Triphenylcarbenium tetrakis(pentafluorophenyl) borate (activator A) and N,N-dimethylanilinium tetrakis (pentafluorophenyl)borate (activator B) were employed as activators. In particular, ethylene-hexene copolymers were produced as described and summarized in Table 1A, and the melting point (DSC) and fractionation (CEF) were measured and summarized in Table 1B. The melting temperatures of the polymers made using each catalyst in examples 1 to 22 are plotted as a function of 1-hexene incorporation, shown in FIG. 1.

More particularly, under nitrogen purge, a 2 L autoclave was charged with isohexanes (700 mL), 1-hexene (30 mL, but this varies as in Table 1A) and TIBAL (triisobutylaluminum, Aldrich) (1.0 mL, 1.0 M in toluene). The autoclave was heated to the temperature indicated in Table 1, and allowed to stabilize. Ethylene was added (120 psig/0.83 MPa), and the catalyst system was then introduced as a pre-mixed solution of the metallocene and activator in a toluene solution, via catalyst tube with isohexanes (100 mL).

After polymerization was complete, the autoclave contents were cooled to room temperature and the excess pressure vented. The contents were transferred into a glass or plastic container containing MeOH. The liquids were decanted, and volatiles were removed by a nitrogen purge. The polymer was dried in a vacuum at 70° C. overnight. Results are tabulated below in Table 1.

Differential Scanning Calorimetry. Differential Scanning Calorimetry (DSC) measurements were performed on a TA-Q200 instrument to determine the melting point of the polymers. Samples were pre-equilibrated at 25° C., heated to 200° C. at a rate of 10° C./min, and then equilibrated at 200° C. for 10 min. The samples were then cooled to −20° C. at a rate of 10° C./min, followed by equilibration at −20° C. for 10 min. The samples were then again heated to 200° C. at a rate of 10° C./min. The melting temperatures (Tm's) reported are the peak melting temperatures from the second heat unless otherwise specified.

1H NMR. 1H NMR data was collected at either room temperature or 120° C. (for purposes of the claims, 120° C. shall be used) in a 5 mm probe using a Varian spectrometer with a 1Hydrogen frequency of at least 400 MHz. Data was recorded using a maximum pulse width of 45°, 8 seconds between pulses and signal averaging 8-120 transients.

Gel Permeation Chromatography. Mw, Mn and Mw/Mn are determined by using a High Temperature Gel Permeation Chromatography (Polymer Laboratories), equipped with a differential refractive index detector (DRI). Three Polymer Laboratories PL gel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 g of butylated hydroxytoluene as an antioxidant in 4 L of Aldrich reagent grade 1,2,4-trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for 2 hours. All quantities are measured gravimetrically. The injection concentration is from 0.5 to 2.0 mg/mL, with lower concentrations being used for higher molecular weight samples. Prior to running each sample the DRI detector is purged. Flow rate in the apparatus is then increased to 1.0 mL/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation.

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $a_{PS}$=0.67 and $K_{PS}$=0.000175 while $a_x$ and $K_x$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the following equation:

$$c = K_{DRI}I_{DRI}/(dn/dc)$$

where KDRI is a constant determined by calibrating the DRI, and (dn/dc) is the refractive index increment for the system. Specifically, dn/dc=0.109 for both PE and PP. The mass recovery is calculated from the ratio of the integrated area of the concentration chromatography over elution volume and the injection mass which is equal to the predetermined concentration multiplied by injection loop volume. All molecular weights are reported in g/mol unless otherwise noted.

Crystallization Elution Fractionation (CEF). Crystallization Elution Fractionation (CEF) analysis is done on a Polymer Char CEF instrument according to the method described in the manual for the instrument. The instrument is equipped with an infrared detector (Polymer Char IR4) capable of generating an absorbance signal that is proportional to the concentration of polymer in solution. The detector is calibrated for the mass constant using a NIST polyethylene standard (NBS 1475) for polyethylene polymers and ExxonMobil Chemical Co. polypropylene grade (PP 3155) for polypropylene polymers and ethylene-propylene copolymers. Reagent grade ortho-dichlorobenzene is used as the solvent in all the steps described below.

The sample to be analyzed is dissolved in fresh solvent (150° C. for at least 1 h) at a concentration of 3 mg/mL. Then a small volume of this solution is filtered using an inline filter and 0.2 mL of this filtered volume is displaced into a column, containing an inert support, kept at 120° C.; next, the column is thermally stabilized at 120° C. for 5 min. The polymer in solution is then allowed to crystallize on the support by slowly reducing the temperature to 30° C. (−15° C. for sub-ambient-temperature analysis) at a cooling rate of 1° C./min in a flow of fresh solvent at 0.02 mL/min (0.01 mL/min for sub-ambient-temperature analysis). When the column reaches the low temperature, the flow is stopped and the column is held at the low temperature for 1 min. A CEF chromatogram curve is then generated by eluting fresh solvent (1 mL/min) and by adhering to a column-temperature profile as follows: initially, at the low temperature (30° C. or −15° C.) for 2 min to measure the IR absorbance of the uncrystallized polymer still in solution, and subsequently, by increasing the temperature (2° C./min) to 120° C. to measure the IR absorbance of the polymer dissolving from the column support.

Results of the polymerization are summarized in FIG. 1. The dashed line in that figure represents the peak melting point (Tm) as a function of the amount of comonomer in the polymer. Over the range shown in this graph, the experimental relationship is approximately linear. Starting from the y-intercept at ~132° C. (which represents HDPE), increasing the comonomer content leads to a decrease in melting point, assuming the comonomer is randomly distributed.

The observed positive deviations from this line for the polymers made using catalysts 1-9 is consistent with a non-random distribution of comonomer incorporation either along a single polymer chain, or in the bulk polymer sample.

Figure 2:
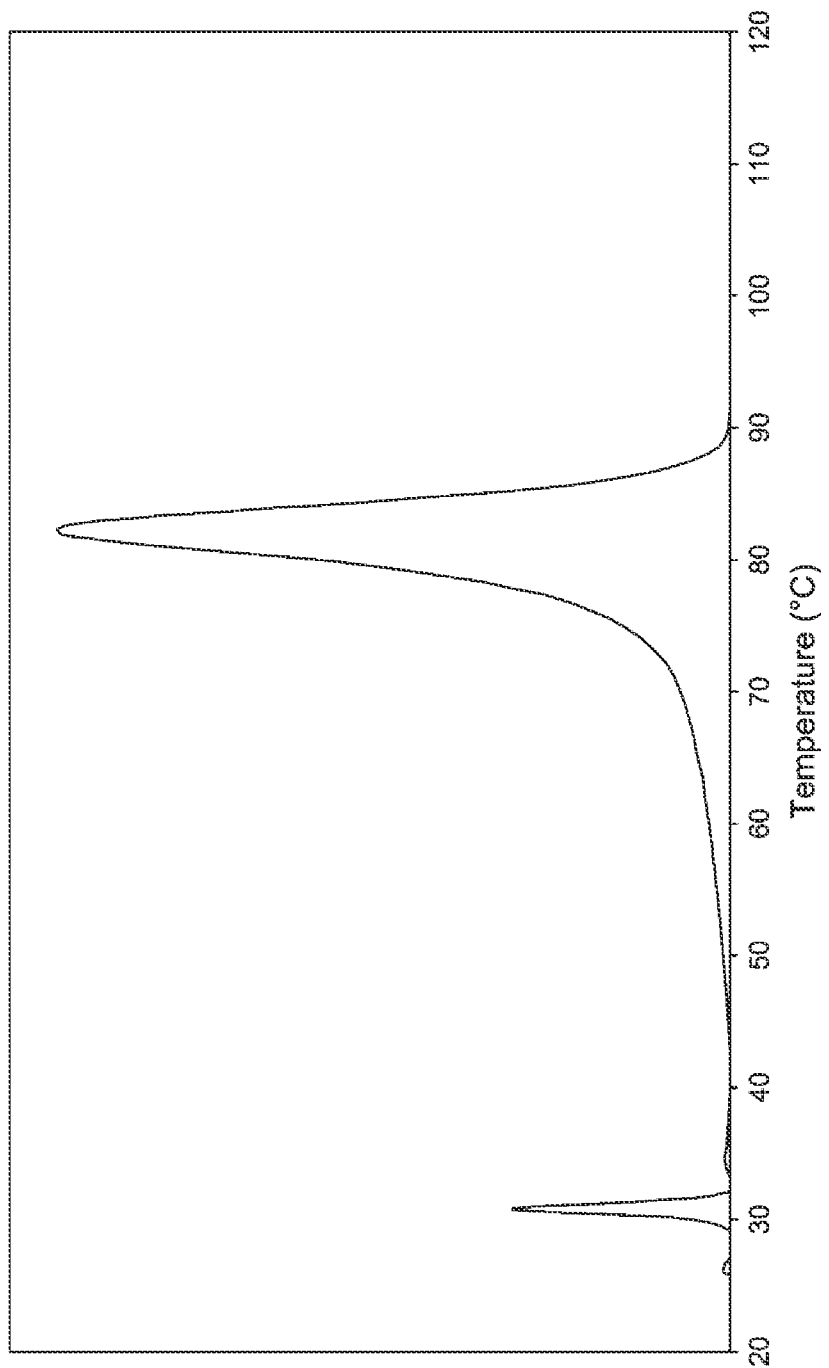
FIG. 2 is a CEF trace of "Entry 1" or the polymer made labeled as "Entry 1" in the data tables herein, wherein the y-axis corresponds to ΔW/ΔT.
Figure 3:
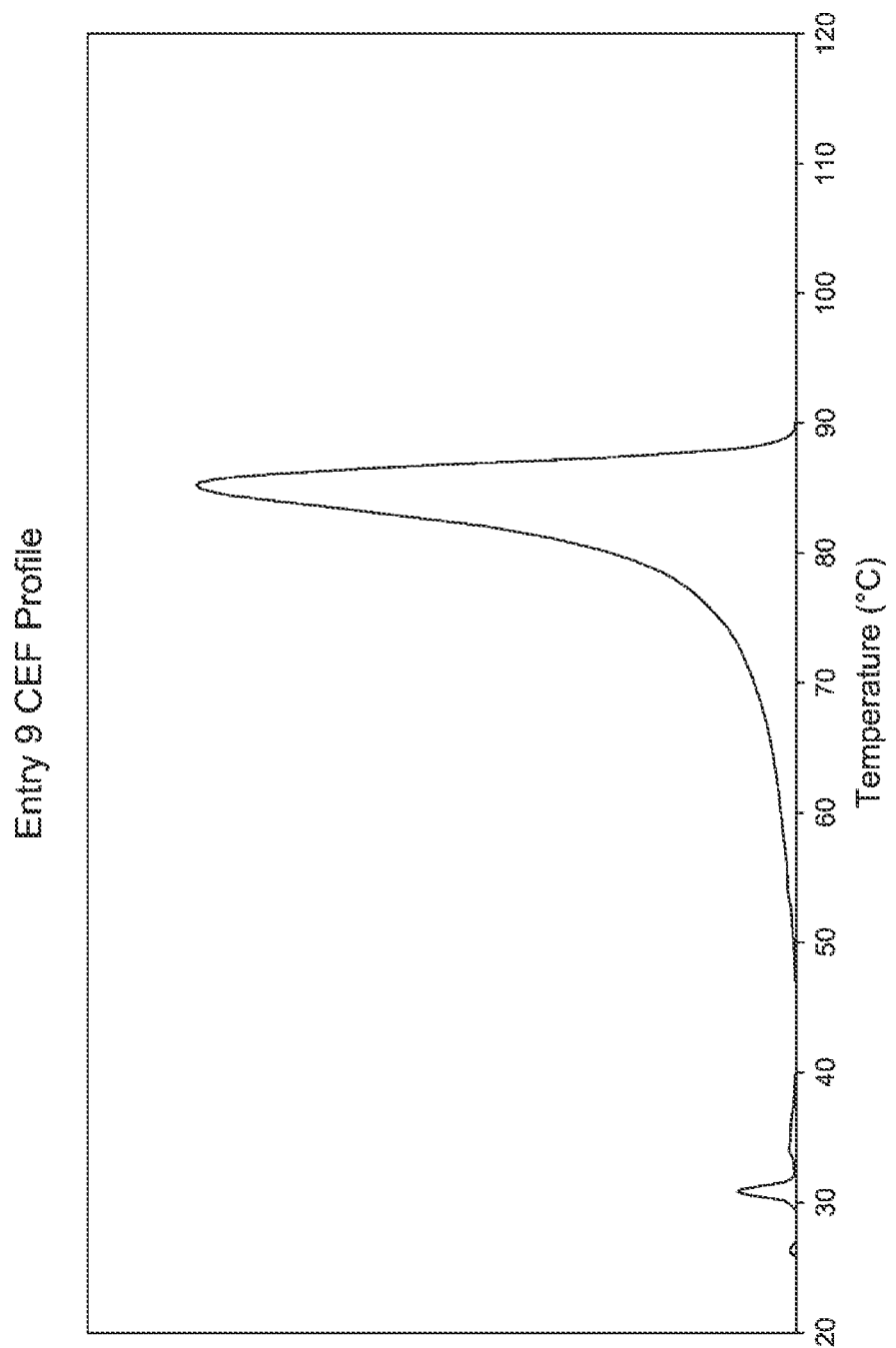
FIG. 3 is a CEF trace of "Entry 9" or the polymer made labeled as "Entry 9" in the data tables herein, wherein the y-axis corresponds to ΔW/ΔT.
Figure 4A:
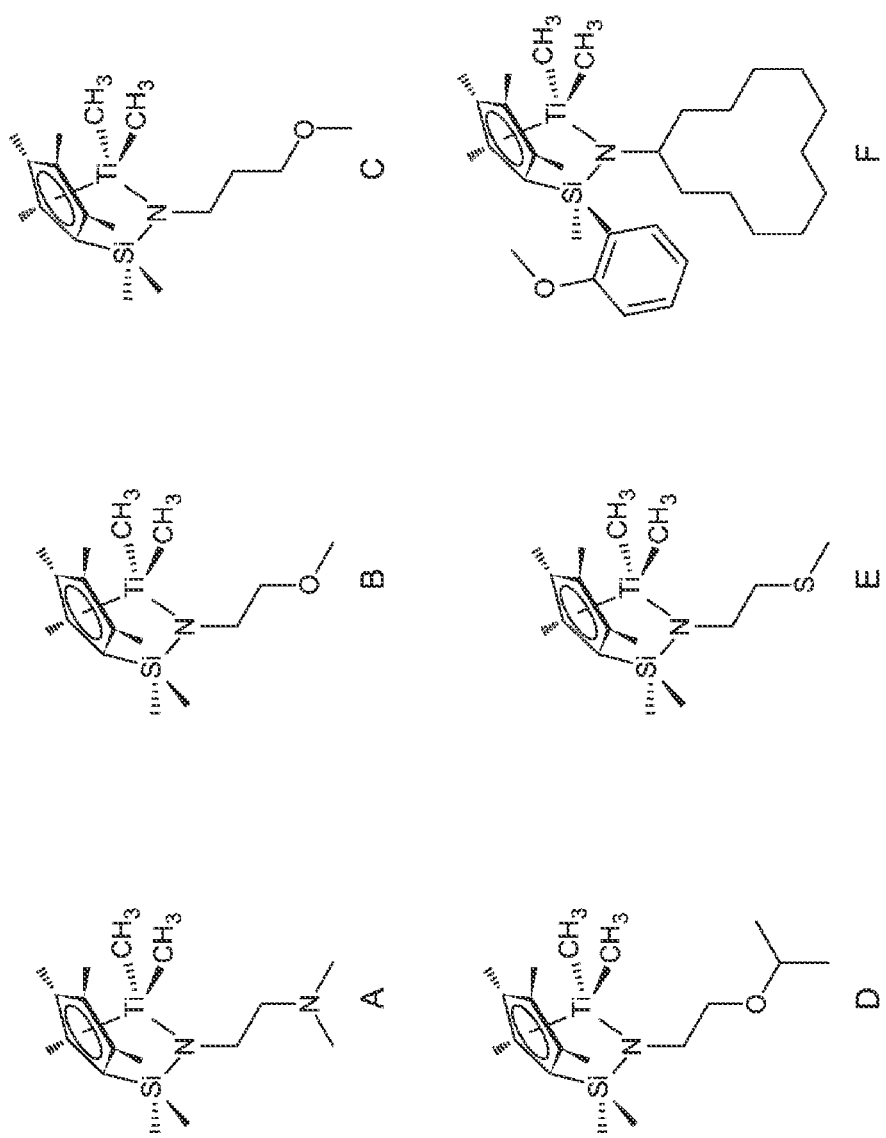
FIG. 4 depicts compounds A through L.
Figure 4B:
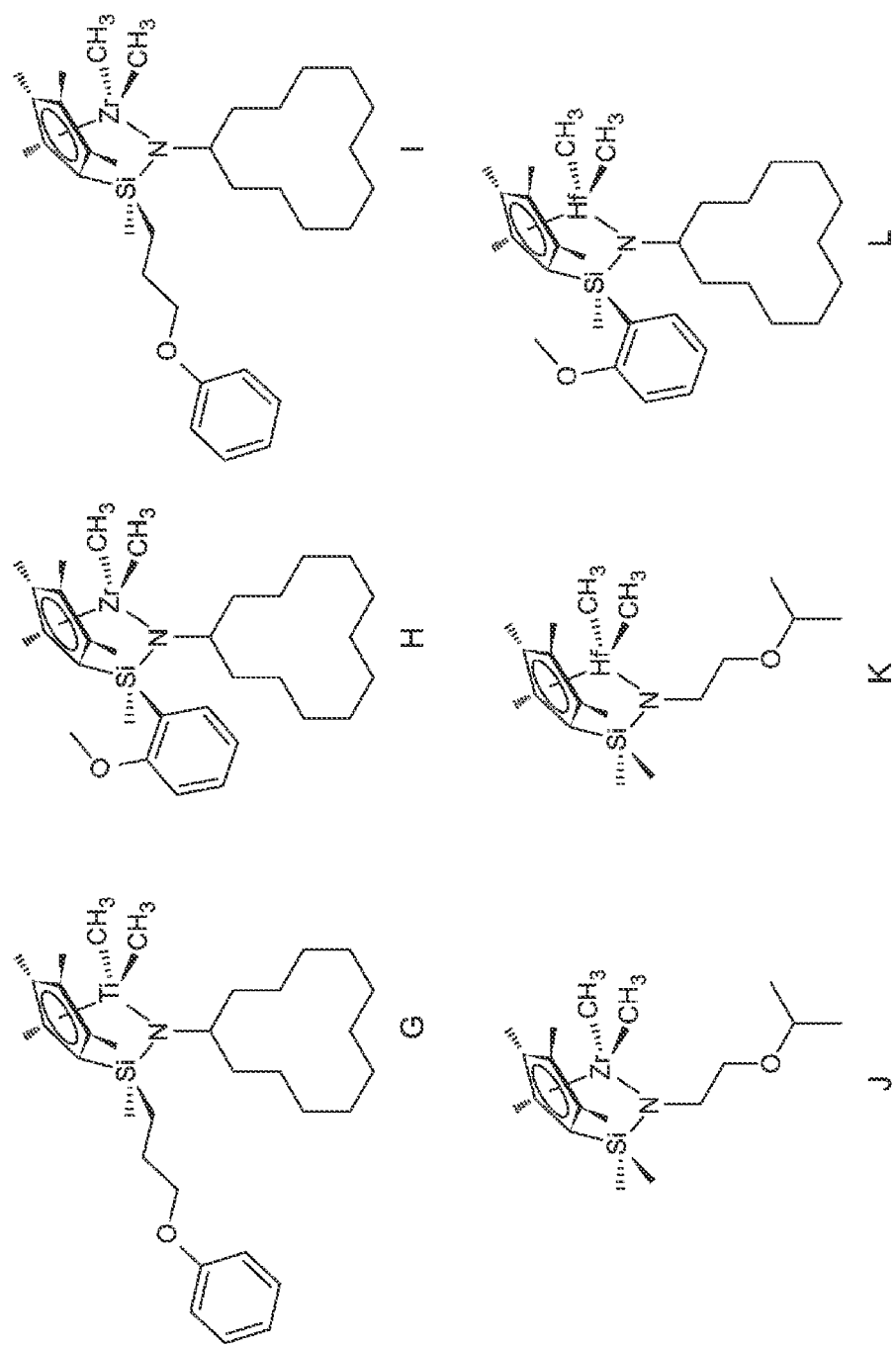
Figure 5:
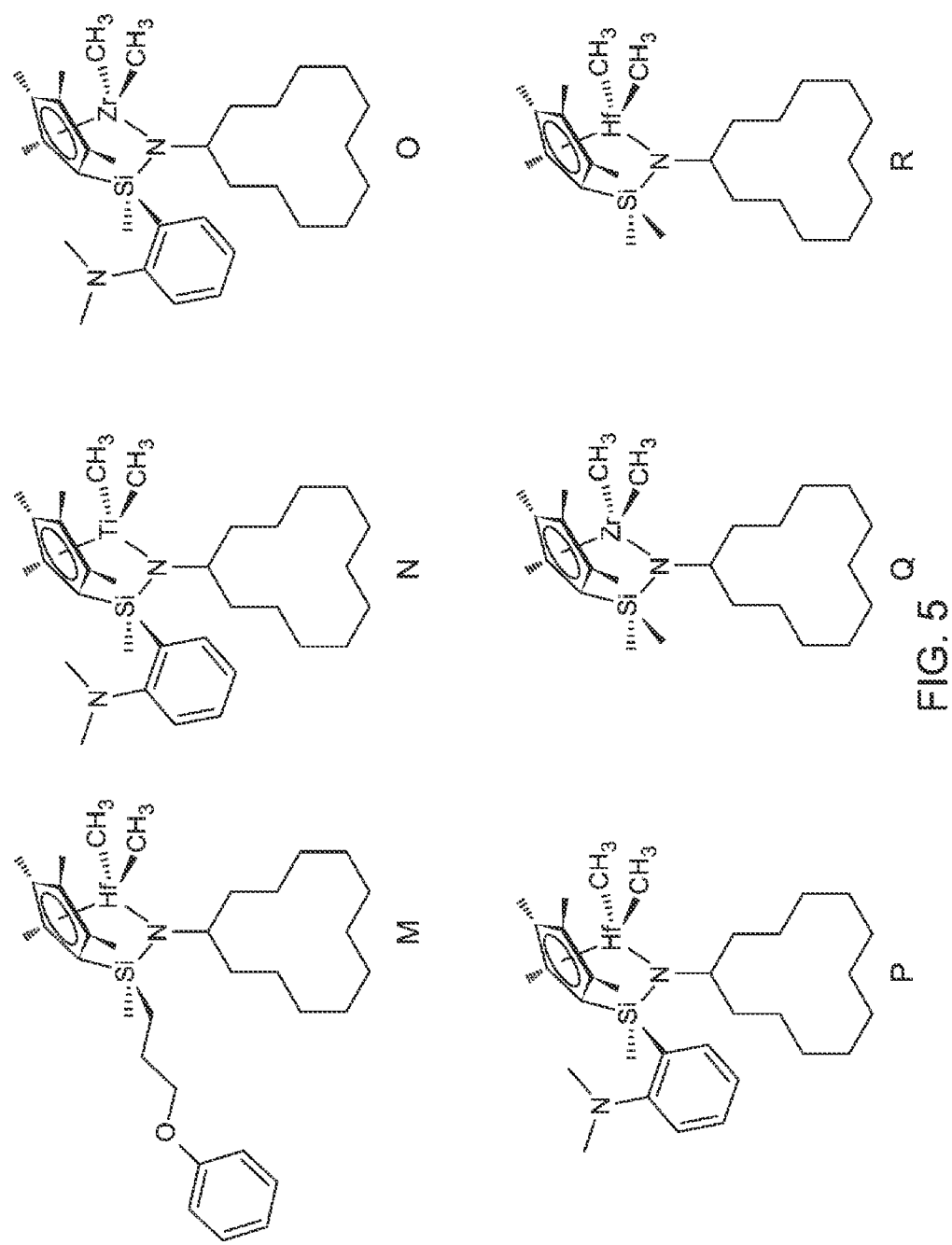
FIG. 5 depicts compounds M through R.

This plot, coupled with the CEF results, provide evidence that the inventive catalysts provide copolymers with non-random sequences of monomers. The CEF traces for polymers 1 and 9 ("entry 1", and "entry 9" in the data Tables 1A and 1B) are in FIGS. 2, and 3 respectively. A summary of the other CEF traces are in Table 2.

TABLE 1A

Reaction Conditions

| Entry | Catalyst | Catalyst (μmol) | Activator | Activator (μmol) | C6 (mL) | C2 (psi) | Run time (min) | Yield (g) | Activity (g polymer/ mmol cat h) |
|---|---|---|---|---|---|---|---|---|---|
| 1 | 1 | 2.0 | A | 2.0 | 30 | 130 | 1.77 | 41.18 | 6.98E+05 |
| 2 | 1 | 1.4 | A | 1.4 | 30 | 130 | 2.33 | 35.34 | 6.50E+05 |
| 3 | 1 | 1.4 | A | 1.4 | 30 | 175 | 1.73 | 49.29 | 1.22E+06 |
| 4 | 2 | 1.4 | A | 1.4 | 30 | 130 | 10.02 | 13.21 | 5.80E+04 |
| 5 | 2 | 1.4 | A | 1.4 | 30 | 175 | 3.85 | 14.45 | 1.65E+05 |
| 6 | 3 | 1.3 | A | 1.3 | 30 | 130 | 1.72 | 48.47 | 1.28E+06 |
| 7 | 3 | 1.3 | A | 1.3 | 30 | 175 | 1.73 | 51.52 | 1.35E+06 |
| 8 | 4 | 1.1 | A | 1.1 | 30 | 130 | 2.80 | 27.07 | 5.30E+05 |
| 9 | 4 | 1.1 | A | 1.1 | 30 | 175 | 1.72 | 41.75 | 1.33E+06 |
| 10 | 5 | 1.7 | A | 1.7 | 30 | 130 | 2.38 | 27.10 | 4.01E+05 |
| 11 | 6 | 1.7 | A | 1.7 | 30 | 130 | 15.02 | 0.22 | 5.27E+02 |
| 12 | 6 | 2.5 | A | 2.5 | 30 | 130 | 10.02 | 0.76 | 1.82E+03 |
| 13 | 6 | 1.5 | B | 1.5 | 30 | 130 | 12.00 | 2.98 | 9.94E+03 |
| 14 | 6 | 1.5 | B | 1.5 | 45 | 130 | 15.00 | 4.29 | 1.14E+04 |
| 15 | 6 | 1.5 | B | 1.5 | 45 | 130 | 15.00 | 4.78 | 1.27E+04 |
| 16 | 6 | 1.5 | A | 1.3 | 45 | 130 | 30.00 | 13.23 | 1.76E+04 |
| 17 | 6 | 1.5 | A | 1.3 | 30 | 130 | 10.00 | 1.03 | 4.12E+03 |
| 18 | 6 | 1.5 | A | 1.3 | 15 | 130 | 15.50 | 3.65 | 9.42E+03 |
| 19 | 7 | 1.6 | A | 1.6 | 30 | 130 | 10.02 | 7.01 | 2.58E+04 |
| 20 | 7 | 1.6 | A | 1.6 | 30 | 175 | 10.10 | 2.51 | 9.17E+03 |
| 21 | 9 | 1.4 | A | 1.4 | 30 | 130 | 5.45 | 20.85 | 1.61E+05 |
| 22 | 9 | 1.4 | A | 1.4 | 30 | 175 | 10.03 | 2.59 | 1.08E+04 |

TABLE 1B

Copolymer properties

| Entry | C6 (mol %) | Mw (DRI) | Mn (DRI) | Mw/Mn (DRI) | Tm Peak #1 (° C.) | Peak 1 Enthalpy (J/g) | Tm Peak #2 (° C.) | Peak 2 Enthalpy (J/g) |
|---|---|---|---|---|---|---|---|---|
| 1 | 3.8 | 8.09E+04 | 3.77E+04 | 2.14 | — | — | 107.6 | 112.2 |
| 2 | 3.3 | 7.98E+04 | 3.98E+04 | 2.01 | — | — | 111.5 | 114.0 |
| 3 | 3.5 | 6.99E+04 | 3.28E+04 | 2.13 | — | — | 112.7 | 116.0 |
| 4 | 2.2 | 1.00E+05 | 4.68E+04 | 2.14 | — | — | 115.6 | 119.3 |
| 5 | 1.5 | 8.61E+04 | 3.99E+04 | 2.16 | — | — | 120.2 | 145.5 |
| 6 | 6.6 | 8.97E+04 | 3.92E+04 | 2.29 | — | — | 99.2 | 80.9 |
| 7 | 4.6 | 7.36E+04 | 3.07E+04 | 2.40 | — | — | 108.8 | 104.3 |
| 8 | 3.5 | 7.13E+04 | 3.40E+04 | 2.09 | — | — | 110.7 | 114.8 |
| 9 | 3.0 | 6.25E+04 | 2.82E+04 | 2.22 | — | — | 112.1 | 130.4 |
| 10 | 8.7 | 2.67E+05 | 1.18E+05 | 2.27 | 68.0 | 49.6 | 107.9 | 0.2 |
| 11 | 2.4 | 3.84E+05 | 7.90E+04 | 4.86 | — | — | 115.8 | 115.1 |
| 12 | 2.7 | 4.23E+05 | 7.91E+04 | 5.35 | — | — | 118.4 | 80.5 |
| 13 | 10.7 | 2.80E+05 | 1.28E+05 | 2.19 | 55.5 | 29.8 | 112.8 | 2.3 |
| 14 | 13.8 | 2.42E+05 | 1.25E+05 | 1.94 | 37.4 | 8.8 | 110.7 | 19.0 |
| 15 | 14.1 | 2.26E+05 | 1.02E+05 | 2.22 | 33.8 | 10.6 | 108.5 | 0.7 |
| 16 | 13.5 | 2.24E+05 | 1.11E+05 | 2.02 | 37.1 | 14.8 | 112.1 | 0.5 |
| 17 | 11.4 | 3.11E+05 | 1.57E+05 | 1.99 | 56.2 | 37.7 | 102.3 | 0.7 |
| 18 | 6.3 | 2.97E+05 | 1.18E+05 | 2.53 | 75.6 | 47.2 | 108.3 | 3.9 |
| 19 | 8.9 | 3.22E+05 | 1.64E+05 | 1.97 | 63.9 | 40.0 | 106.8 | 1.6 |
| 20 | 7.4 | 2.15E+05 | 1.01E+05 | 2.13 | 72.9 | 11.2 | 118.3 | 44.9 |
| 21 | 7.5 | 6.54E+05 | 2.03E+05 | 3.22 | 70.1 | 43.9 | 102.7 | 0.9 |
| 22 | 5.2 | 4.10E+05 | 1.19E+05 | 3.44 | 85.1 | 42.9 | 117.5 | 9.1 |

TABLE 2

CEF data for polymers outlined in Table 1

| Entry | Peak Elution Temperature (° C.) | Description of trace |
|---|---|---|
| 1 | 81 | narrow |
| 2 | 82 | narrow |
| 3 | 87 | Broad, low temp tail |
| 4 | 88 | narrow |
| 5 | 91 | narrow |
| 6 | 60, 78 | Bimodal, even |
| 7 | 70, 85 | Bimodal, broad/narrow |
| 8 | 83 | Narrow with low temp tail |
| 9 | 83 | Narrow |
| 10 | 31 | Narrow |
| 11 | 31, 91 | Two, narrow peaks |
| 12 | 31, 92 | Narrow/very small, broad |

TABLE 2-continued

CEF data for polymers outlined in Table 1

| Entry | Peak Elution Temperature (° C.) | Description of trace |
|---|---|---|
| 13 | — | |
| 14 | — | |
| 15 | — | |
| 16 | — | |
| 17 | — | |
| 18 | — | |
| 19 | 31 | Narrow |
| 20 | 31 | Narrow |
| 21 | 31 | Narrow |
| 22 | 31, 67 | Narrow (small)/narrow (tall) |

1) "narrow" means 3-6° C. width at ½ height.
2) "broad, low temp tail" means width greater than 8° C., with an unsymmetrical peak having a low temperature elution associated with the highest peak.

Example 14

Methylsilyl(2-methoxyphenyl)(tetramethylcyclopentadienyl)(cyclododecylamido)titanium(IV)dimethyl (catalyst F)

Step 1. 2-(methyldichlorosilyl)anisole (S1). This compound was prepared as described in Example 1, Step 1.

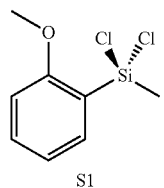

Step 2. Lithium methylsilyl(2-methoxyphenyl)(tetramethylcyclopentadienide)(cyclododecylamide) (S62). This compound was prepared following the procedure described by P. J. Shapiro, E. Bunel, W. P. Schaefer and J. E. Bercaw in 9, *Organometallics*, pp. 867-869 (1990) with the substitution of compound S1 for dimethyldichlorosilane, and Li(cyclododecyl-NH) for Li(Me₃CNH).

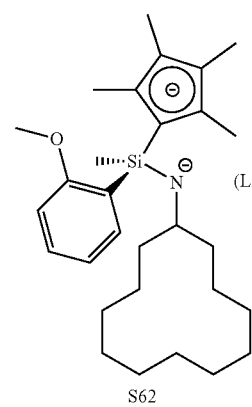

Step 3. Methylsilyl(2-methoxyphenyl)(tetramethylcyclopentadienyl)(cyclododecylamido)titanium(IV)dichloride (S63). In a nitrogen-filled glovebox, a 100-mL round-bottom flask was charged with TiCl₄(dme) (0.8140 g, 1.748 mmol), diethyl ether (40 mL), and a magnetic stirbar, then placed in the freezer (−32° C.) for 1 h. The mixture was removed from the freezer and compound S62 was added while stirring the reaction. The mixture was allowed to warm to room temperature and stirred overnight. The solvent was removed under the flow of nitrogen and 60 mL 1:1 toluene:pentane was added to the residue. The resulting slurry was filtered through Celite™ filter material and the solvent was removed from the filtrate. The crude product was recrystallized in 5 mL pentane at −32° C. overnight, which yielded a mustard-yellow powder identified as compound S63 (0.4898 g, 0.8585 mmol, 49%).

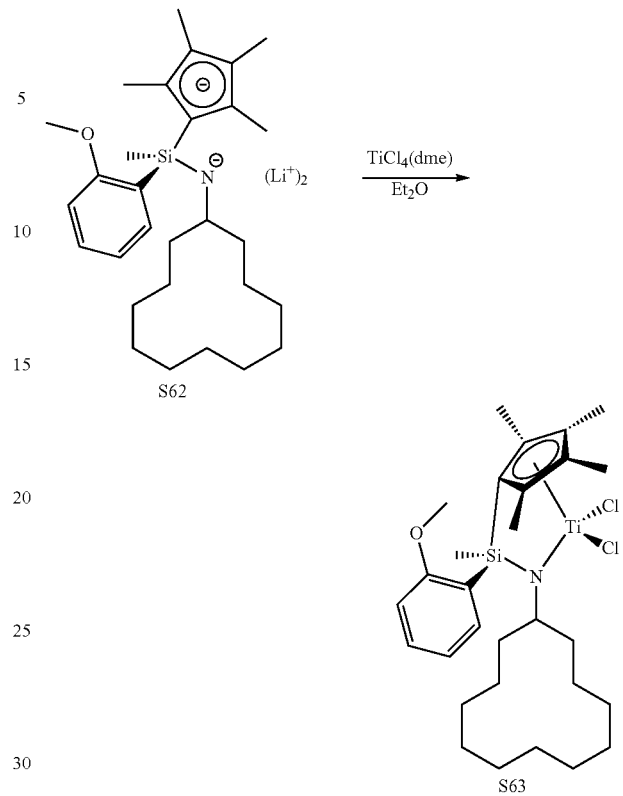

-continued

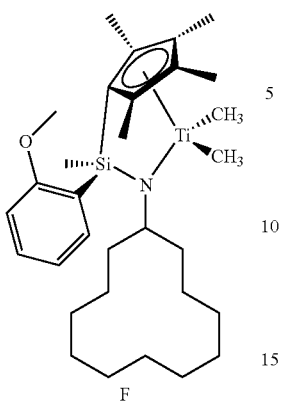

F

Step 4. Methylsilyl(2-methoxyphenyl)(tetramethylcyclopentadienyl)(cyclododecylamido)titanium(IV)dimethyl (catalyst F). In a nitrogen-filled glovebox, a 100-mL round-bottom flask was charged with compound S63 (0.2650 g, 0.4645 mmol), diethyl ether (50 mL), and a magnetic stirbar, then placed in the freezer (−32° C.) for 1 h. The mixture was removed from the freezer and MeMgCl (0.31 mL, 3.02M in THF, 0.94 mmol) was added dropwise while stirring the reaction. The mixture was allowed to warm to room temperature and stirred for four days. The solvent was removed under a flow of nitrogen and 50 mL pentane was added to the residue. The resulting slurry was filtered through Celite™ filter material and washed with 30 mL pentane. The solvent from the filtrate was removed under reduced pressure and the crude product was recrystallized in 1 mL pentane at −32° C. overnight, which yielded a yellow powder identified as catalyst F (0.1626 g, 0.3070 mmol, 66%). $^1$H NMR (400 MHz, Benzene-d$_6$) δ 7.83 (dd, J=7.1 Hz, 1.6 Hz, 1H), 7.21 (dt, J=8.2 Hz, 1.6 Hz, 1H), 6.99 (t, J=7.1 Hz 1H), 6.55 (d, J=8.2 Hz, 1H), 4.96 (m, 1H), 3.36 (s, 3H), 2.34 (m, 1H), 2.25 (m, 1H), 2.05 (s, 3H), 2.02 (s, 3H), 2.00 (m, 1H) 1.94 (s, 3H), 1.90-1.71 (overlapping signals, 4H), 1.60 (m, 1H), 1.58 (s, 3H), 1.55-1.25 (overlapping signals, 14H), 0.89 (s, 3H), 0.59 (s, 3H), 0.58 (s, 3H).

Example 15

Methylsilyl(3-phenoxypropyl)(tetramethylcyclopentadienyl)(cyclododecylamido)titanium(IV)dimethyl (catalyst G)

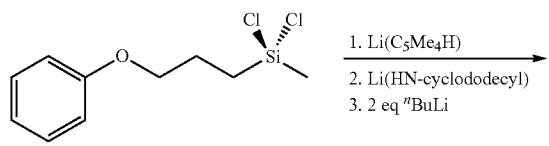

-continued

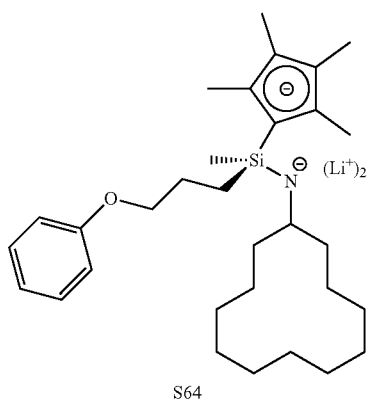

S64

Step 1. Lithium methylsilyl(3-phenoxylpropyl)(tetramethylcyclopentadienide)(cyclododecylamide) (S64). This compound was prepared following the procedure described by P. J. Shapiro, E. Bunel, W. P. Schaefer and J. E. Bercaw in 9, *Organometallics*, pp. 867-869 (1990) with the substitution of (3-phenoxypropyl)(methyl)dichlorosilane for dimethyldichlorosilane, and Li(cyclododecyl-NH) for Li(Me$_3$CNH).

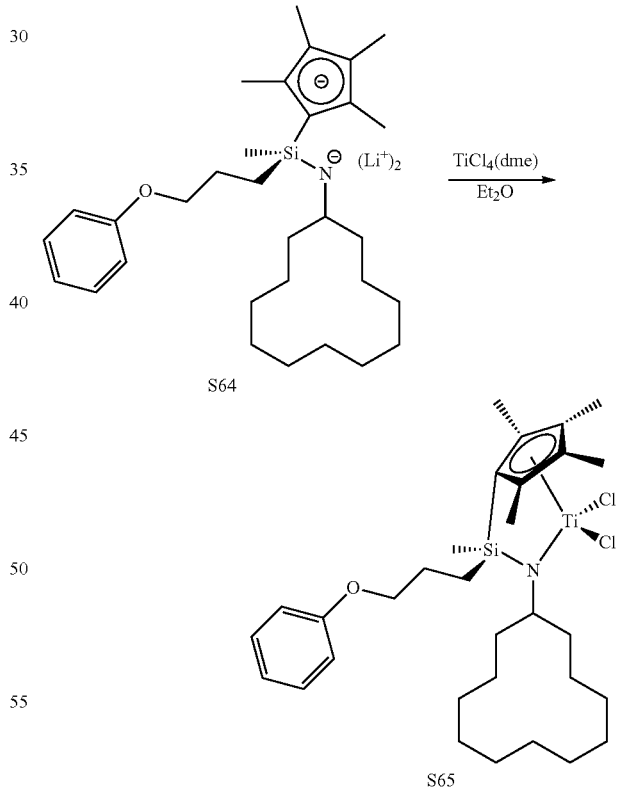

Step 2. Methylsilyl(3-phenoxypropyl)(tetramethylcyclopentadienyl)(cyclododecylamido)titanium(IV) chloride (S65). This compound was prepared following the procedure described in Example 14, Step 3 using compound S64 (0.8062 g, 1.633 mmol) and TiCl$_4$(dme) (0.4584 g, 1.638 mmol), which afforded a mustard-yellow powder identified as compound S65 (0.4276 g, 0.7143 mmol, 44%).

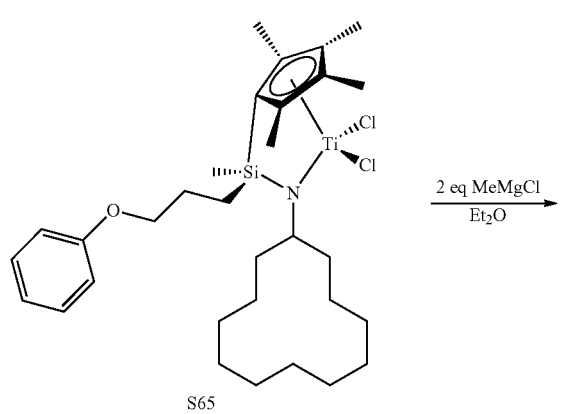

S65

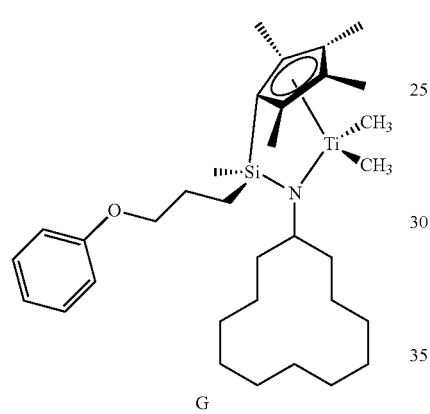

G

Step 3. Methylsilyl(3-phenoxypropyl)(tetramethylcyclopentadienyl)(cyclododecylamido)titanium(IV)dimethyl (catalyst G). In a nitrogen-filled glovebox, a 100-mL round-bottom flask was charged with compound S65 (0.1966 g, 0.3284 mmol), diethyl ether (50 mL), and a magnetic stirbar, then placed in the freezer (−32° C.) for 1 h. The mixture was removed from the freezer and MeMgCl (0.22 mL, 3.02M in THF, 0.66 mmol) was added dropwise while stirring the reaction. The mixture was allowed to warm to room temperature and stirred for four days. The solvent was removed under a flow of nitrogen and 50 mL pentane was added to the residue. The resulting slurry was filtered through Celite™ filter material and washed with 30 mL pentane. The solvent from the filtrate was removed under reduced pressure and the crude product was recrystallized in 1 mL pentane at −32° C. overnight, which yielded a yellow powder identified as catalyst G (0.1420 g, 0.2526 mmol, 78%). $^1$H NMR (400 MHz, Benzene-$d_6$) δ 7.19 (m, 2H), 6.92 (d, J=7.9 Hz, 2H), 6.87 (t, J=7.3 Hz, 1H), 5.35 (m, 1H), 3.76 (m, 2H), 2.05 (m, 1H), 2.01 (s, 3H), 2.00 (s, 3H), 1.91 (s, 3H), 1.90 (s, 3H), 1.87-1.21 (overlapping signals, 22H), 1.07 (td, J=13.9 Hz, 3.8 Hz, 1H), 0.87 (m, 2H), 0.52 (s, 3H), 0.51 (s, 3H), 0.46 (s, 3H).

Example 16

Methylsilyl(2-methoxyphenyl)(tetramethylcyclopentadienyl)(cyclododecylamido)zirconium(IV)dimethyl (catalyst H)

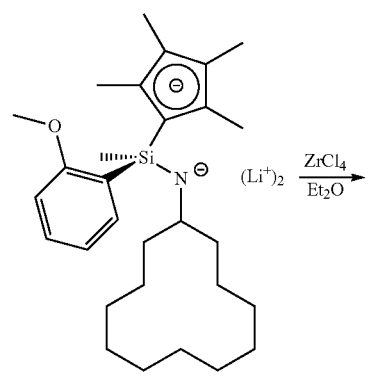

S62

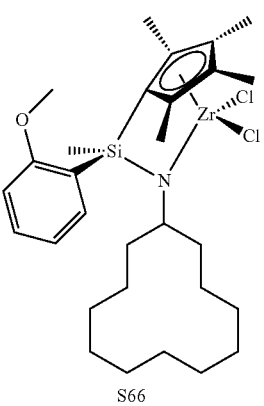

S66

Step 1. Methylsilyl(2-methoxyphenyl)(tetramethylcyclopentadienyl)(cyclododecylamido)zirconium(IV)dichloride (S66). This compound was prepared following the procedure described in Example 14, Step 3 using compound S62 (0.7004 g, 1.504 mmol) and ZrCl$_4$ (0.3852 g, 1.537 mmol), which afforded a white powder identified as compound S66 (0.3520 g, 0.5734 mmol, 38%).

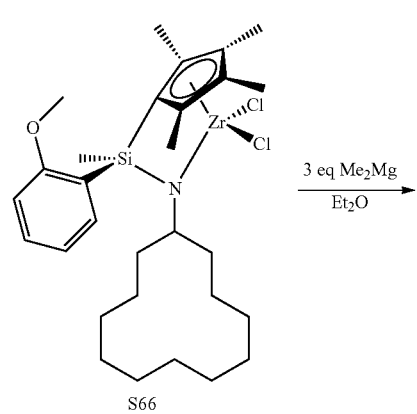

S66

-continued

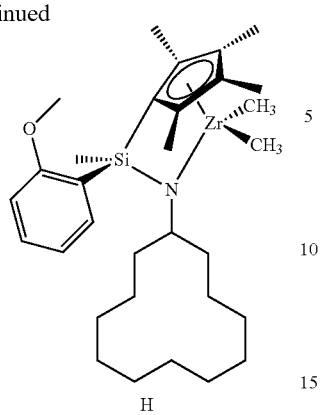

H

-continued

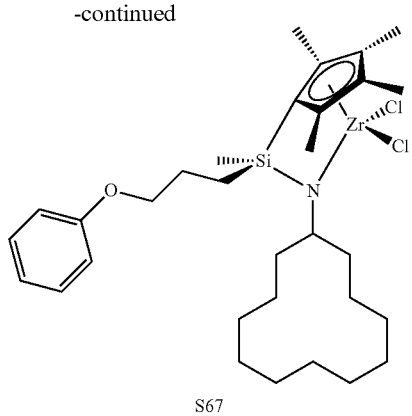

S67

Step 2. Methylsilyl(2-methoxyphenyl)(tetramethylcyclopentadienyl)(cyclododecylamido)zirconium(IV)dimethyl (catalyst H). In a nitrogen-filled glovebox, a 100-mL round-bottom flask was charged with S66 (0.1400 g, 0.2281 mmol), diethyl ether (50 mL), and a magnetic stirbar, then placed in the freezer (−32° C.) for 1 h. The mixture was removed from the freezer and Me$_2$Mg (0.0376 g, 0.691 mmol) was added while stirring the reaction. The mixture was allowed to warm to room temperature and stirred overnight. The solvent was removed under a flow of nitrogen and 75 mL pentane was added to the residue. The resulting slurry was filtered through Celite™ filter material and the solvent was removed from the filtrate. The crude product was recrystallized in 2 mL pentane at −32° C. overnight, which yielded cream-colored crystalline solids identified as catalyst H (0.0866 g, 0.151 mmol, 66%). $^1$H NMR (400 MHz, Benzene-d$_6$) δ 7.75 (dd, J=7.2, 1.6 Hz, 1H), 7.23 (td, J=8.2 Hz, 1.6 Hz, 1H), 7.01 (t, J=7.2 Hz, 1H), 6.57 (d, J=8.2 Hz, 1H), 4.04 (m, 1H), 3.37 (s, 3H), 2.49 (m, 1H), 2.35 (m, 1H), 2.18 (s, 3H), 1.95 (s, 3H), 1.85 (s, 3H), 1.77 (m, 1H), 1.69 (m, 1H), 1.66 (s, 3H), 1.64-1.24 (overlapping signals, 18H), 0.97 (s, 3H), 0.16 (s, 3H), 0.11 (s, 3H).

Step 1. Methylsilyl(3-phenoxypropyl)(tetramethylcyclopentadienyl)(cyclododecylamido)zirconium(IV)dichloride (S67). This compound was prepared following the procedure described in Example 14, Step 3 using compound S64 (0.6890 g, 1.396 mmol) and ZrCl$_4$ (0.3344 g, 1.435 mmol), which afforded a pale tan powder identified as compound S67 (0.4830 g, 0.7524 mmol, 54%).

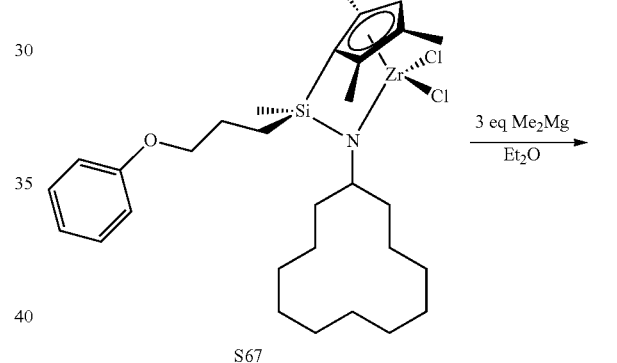

S67

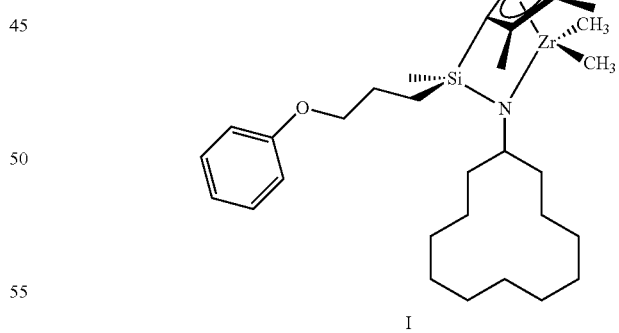

I

Example 17

Methylsilyl(3-phenoxypropyl)(tetramethylcyclopentadienyl)(cyclododecylamido)zirconium(IV)dimethyl (catalyst I)

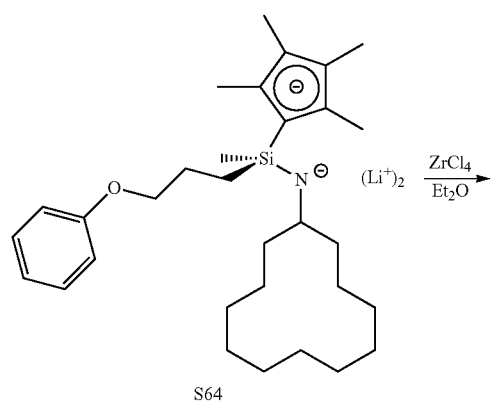

S64

Step 2. Methylsilyl(3-phenoxypropyl)(tetramethylcyclopentadienyl)(cyclododecylamido)zirconium(IV)dimethyl (catalyst I). In a nitrogen-filled glovebox, a 100-mL round-bottom flask was charged with compound S67 (0.2060 g, 0.3209 mmol), diethyl ether (50 mL), and a magnetic stirbar, then placed in the freezer (−32° C.) for 1 h. The mixture was removed from the freezer and Me$_2$Mg (0.0528 g, 0.971 mmol) was added while stirring the reaction. The mixture was allowed to warm to room temperature and stirred overnight. The solvent was removed under a flow of nitrogen and 75 mL pentane was added to the residue. The resulting slurry was filtered through Celite™ filter material and the solvent was removed from the filtrate. The crude product was recrystallized in 2 mL pentane at −32° C. overnight, which yielded a pale tan powder identified as catalyst I (0.0638 g, 0.106 mmol, 33%). $^1$H NMR (400 MHz, Benzene-$d_6$) δ 7.16 (m, 2H), 6.92 (d, J=8.1 Hz, 2H), 6.86 (t, J=7.3 Hz, 1H), 3.89 (m, 1H), 3.77 (m, 2H), 2.07 (m, 1H), 2.05 (s, 3H), 2.03 (s, 3H), 1.94 (s, 3H), 1.93 (s, 3H), 1.92-1.80 (overlapping signals, 4H), 1.61-1.24 (overlapping signals, 19H), 1.11 (m, 1H), 0.96 (m, 1H), 0.50 (s, 3H), 0.08 (s, 3H), 0.07 (s, 3H).

Example 18

Methylsilyl(2-methoxyphenyl)(tetramethylcyclopentadienyl)(cyclododecylamide)hafnium(IV)dimethyl (catalyst L)

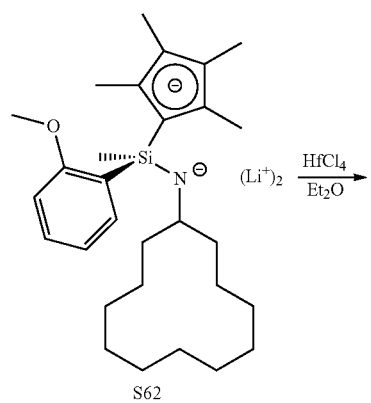

S62

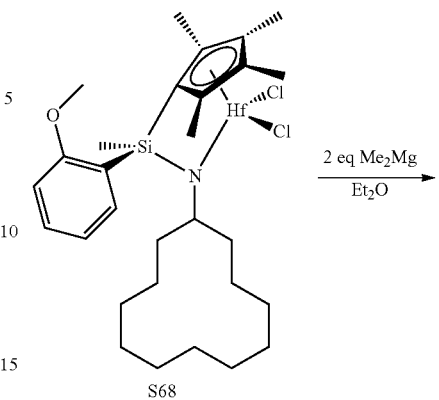

S68

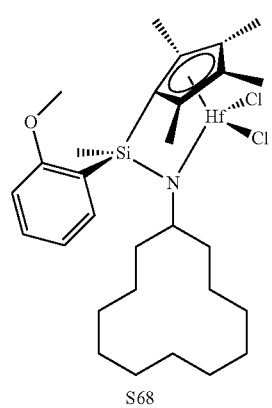

S68

Step 1. Methylsilyl(2-methoxyphenyl)(tetramethylcyclopentadienyl)(cyclododecylamido)hafnium(IV)dichloride (S68). This compound was prepared following the procedure described in Example 14, Step 3 using compound S62 (0.9628 g, 2.068 mmol) and HfCl$_4$ (0.6660 g, 2.079 mmol), which afforded a white powder identified as compound S68 (0.7634 g, 1.088 mmol, 53%).

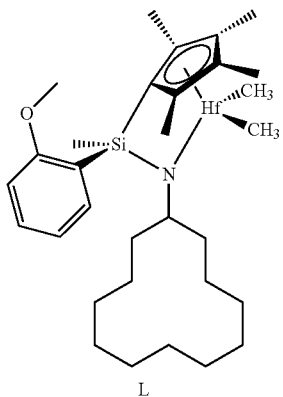

L

Step 2. Methylsilyl(2-methoxyphenyl)(tetramethylcyclopentadienyl)(cyclododecylamido)hafnium(IV)dimethyl (catalyst L). In a nitrogen-filled glovebox, a 100-mL round-bottom flask was charged with compound S68 (0.2018 g, 0.2876 mmol), diethyl ether (50 mL), and a magnetic stirbar, then placed in the freezer (−32° C.) for 1 h. The mixture was removed from the freezer and Me$_2$Mg (0.0330 g, 0.607 mmol) was added while stirring the reaction. The mixture was allowed to warm to room temperature and stirred overnight. The solvent was removed under a flow of nitrogen and 70 mL pentane was added to the residue. The resulting slurry was filtered through Celite™ filter material and the solvent was removed from the filtrate. The crude product was recrystallized in 1 mL pentane at −32° C. overnight, which yielded white solids identified as catalyst L (0.1396 g, 0.2114 mmol, 73%). $^1$H NMR (400 MHz, Benzene-$d_6$) δ 7.79 (dd, J=7.1, 1.6 Hz, 1H), 7.23 (td, J=8.2 Hz, 1.6 Hz, 1H), 7.02 (t, J=7.1 Hz, 1H), 6.57 (d, J=8.2 Hz, 1H), 4.22 (m, 1H), 3.37 (s, 3H), 2.40 (m, 1H), 2.28 (m, 1H), 2.23 (s, 3H), 1.97 (s, 3H), 1.88 (s, 3H), 1.77 (m, 1H), 1.69 (s, 3H), 1.66-1.19 (overlapping signals, 19H), 0.99 (s, 3H), 0.04 (s, 3H), 0.00 (s, 3H).

Example 19

Methylsilyl(3-phenoxypropyl)(tetramethylcyclopentadienyl)(cyclododecylamido)hafnium(IV)dimethyl (catalyst M)

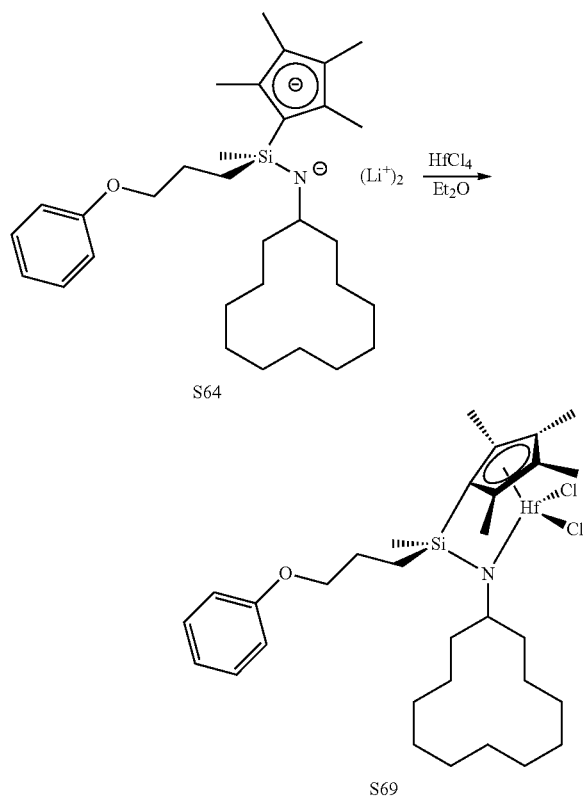

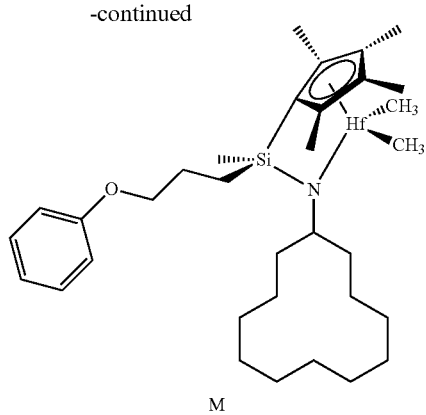

Step 1. Methylsilyl(3-phenoxypropyl)(tetramethylcyclopentadienyl)(cyclododecylamido)hafnium(IV)dichloride (S69). This compound was prepared following the procedure described in Example 14, Step 3 using compound S64 (0.8330 g, 1.687 mmol) and HfCl$_4$ (0.5454 g, 1.703 mmol), which afforded a white powder identified as compound S69 (0.6142 g, 0.8423 mmol, 50%).

Step 2. Methylsilyl(3-phenoxypropyl)(tetramethylcyclopentadienyl)(cyclododecylamido)hafnium(IV)dimethyl (catalyst M). In a nitrogen-filled glovebox, a 100-mL round-bottom flask was charged with compound S69 (0.2024 g, 0.2776 mmol), diethyl ether (50 mL), and a magnetic stirbar, then placed in the freezer (−32° C.) for 1 h. The mixture was removed from the freezer and Me$_2$Mg (0.0352 g, 0.647 mmol) was added while stirring the reaction. The mixture was allowed to warm to room temperature and stirred overnight. The solvent was removed under a flow of nitrogen and 70 mL pentane was added to the residue. The resulting slurry was filtered through Celite™ filter material and the solvent was removed from the filtrate. The crude product was recrystallized in 1 mL pentane at −32° C. overnight, which yielded a cream-colored powder identified as catalyst M (0.1218 g, 0.1770 mmol, 63%). $^1$H NMR (400 MHz, Benzene-d$_6$) δ 7.16 (m, 2H), 6.91 (d, J=8.6 Hz, 2H), 6.86 (t, J=7.3 Hz, 1H), 3.87 (m, 1H), 3.77 (m, 2H), 2.09 (s, 3H), 2.07 (s, 3H), 2.04 (m, 1H), 1.96 (s, 3H), 1.95 (s, 3H), 1.93-1.80 (overlapping signals, 4H), 1.63-1.23 (overlapping signals, 19H), 1.11 (m, 1H), 0.98 (m, 1H), 0.51 (s, 3H), −0.04 (s, 3H), −0.08 (s, 3H).

Example 20

Methylsilyl(2-dimethylaminophenyl)(tetramethylcyclopentadienyl)(cyclododecylamido)titanium(IV)dimethyl (catalyst N)

Step 1. 2-(methyldichlorosilyl)-dimethylaniline (S7). This compound was prepared as described in Example 2, Step 1.

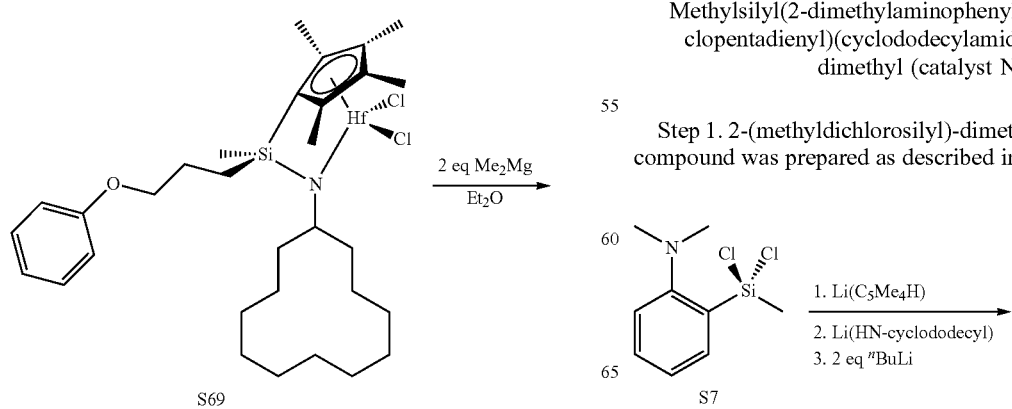

-continued

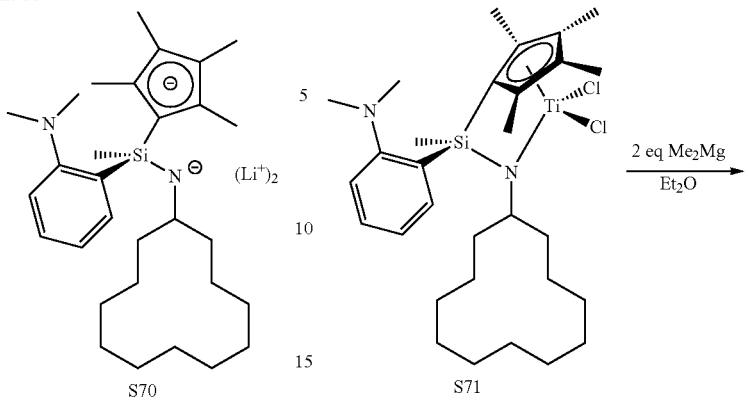

S70

Step 2. Lithium methylsilyl(2-dimethylaminophenyl)(tetramethylcyclopentadienide)(cyclododecylamide) (S70). This compound was prepared following the procedure described by P. J. Shapiro, E. Bunel, W. P. Schaefer and J. E. Bercaw in 9, *Organometallics*, pp. 867-869 (1990) with the substitution of compound S7 for dimethyldichlorosilane, and Li(cyclododecyl-NH) for Li(Me₃CNH).

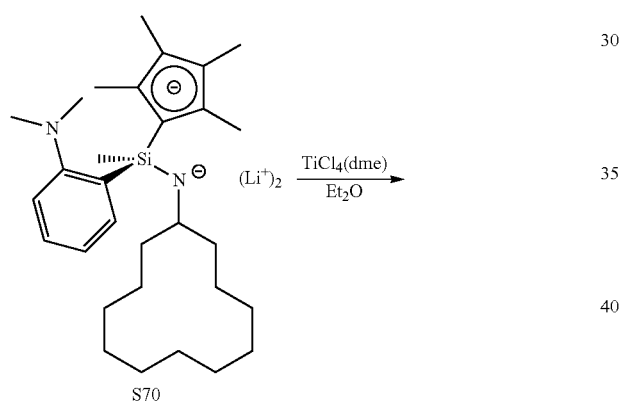

S70

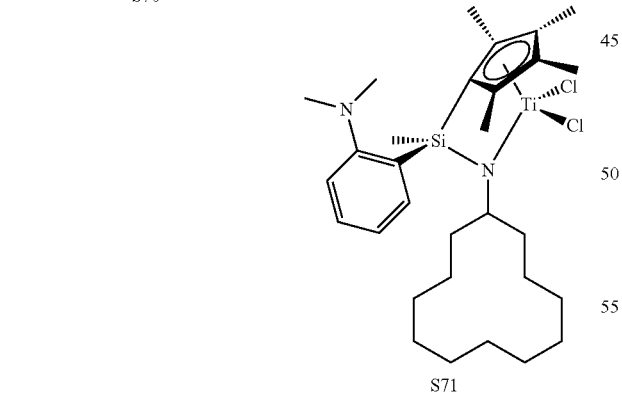

S71

Step 3. Methylsilyl(2-dimethylaminophenyl)(tetramethylcyclopentadienyl)(cyclododecylamido)titanium(IV)dichloride (S71). This compound was prepared following the procedure described in Example 14, Step 3 using compound S70 (0.9080 g, 1.897 mmol) and TiCl₄(dme) (0.5416 g, 1.936 mmol), which afforded a mustard-yellow powder identified as compound S71 (0.4930 g, 0.8448 mmol, 45%).

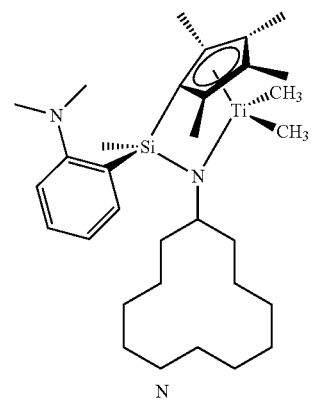

N

Step 4. Methylsilyl(2-dimethylaminophenyl)(tetramethylcyclopentadienyl)(cyclododecylamido)titanium(IV)dimethyl (catalyst N). In a nitrogen-filled glovebox, a 100-mL round-bottom flask was charged with compound S71 (0.2084 g, 0.3571 mmol), diethyl ether (50 mL), and a magnetic stirbar, then placed in the freezer (−32° C.) for 1 h. The mixture was removed from the freezer and Me₂Mg (0.0406 g, 0.747 mmol) was added while stirring the reaction. The mixture was allowed to warm to room temperature and stirred overnight. The solvent was removed under a flow of nitrogen and 70 mL pentane was added to the residue. The resulting slurry was filtered through Celite™ filter material and the solvent was removed from the filtrate. The crude product was recrystallized in 1 mL pentane at −32° C. overnight, which yielded a pale yellow powder identified as catalyst N (0.1502 g, 0.2767 mmol, 77%). ¹H NMR (400 MHz, Benzene-d₆) δ 7.81 (dd, J=7.3, 1.5 Hz, 1H), 7.23 (td, J=7.9, 1.5 Hz, 1H), 7.09 (t, J=7.3 Hz, 1H), 7.01 (d, J=7.9 Hz, 1H), 4.70 (m, 1H), 2.64 (s, 6H), 2.39 (m, 2H), 2.06 (s, 3H), 2.01 (s, 3H), 1.93 (s, 3H), 1.86-1.74 (overlapping signals, 3H), 1.68-1.60 (overlapping signals, 4H), 1.58 (s, 3H), 1.55-1.21 (overlapping signals, 13H), 0.99 (s, 3H), 0.65 (s, 3H), 0.60 (s, 3H).

Example 21

Methylsilyl(2-dimethylaminophenyl)(tetramethylcyclopentadienyl)(cyclododecylamido)zirconium(IV) dimethyl (catalyst O)

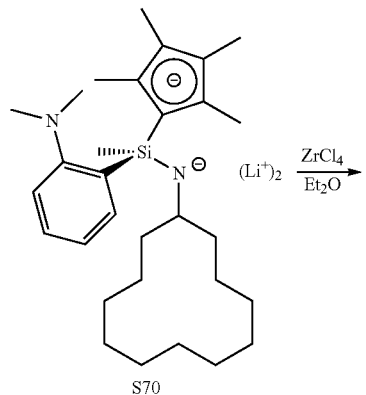

S70

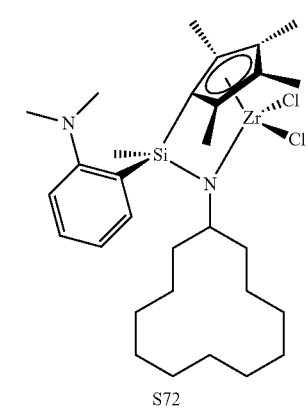

S72

Step 1. Methylsilyl(2-dimethylaminophenyl)(tetramethylcyclopentadienyl)(cyclododecylamido)zirconium(IV)dichloride (S72). This compound was prepared following the procedure described in Example 14, Step 3 using compound S70 (0.9080 g, 1.897 mmol) and ZrCl$_4$ (0.4486 g, 1.925 mmol), which afforded a cream-colored powder identified as compound S72 (0.7754 g, 1.237 mmol, 65%).

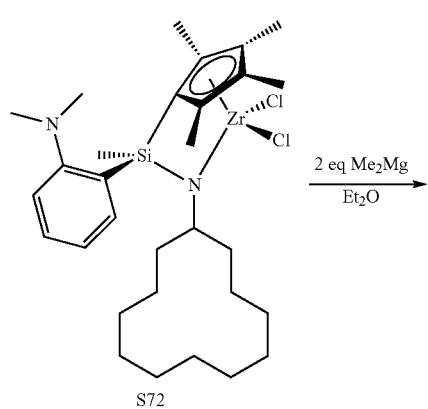

S72

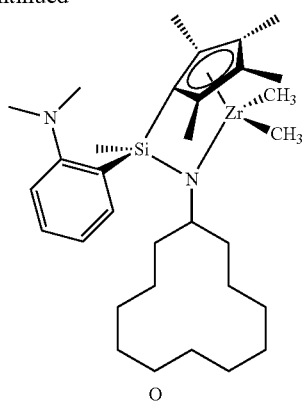

O

Step 2. Methylsilyl(2-dimethylaminophenyl)(tetramethylcyclopentadienyl)(cyclododecylamido)zirconium(IV)dimethyl (catalyst O). In a nitrogen-filled glovebox, a 100-mL round-bottom flask was charged with compound S72 (0.2130 g, 0.3398 mmol), diethyl ether (50 mL), and a magnetic stirbar, then placed in the freezer (−32° C.) for 1 h. The mixture was removed from the freezer and Me$_2$Mg (0.0370 g, 0.680 mmol) was added while stirring the reaction. The mixture was allowed to warm to room temperature and stirred overnight. The solvent was removed under a flow of nitrogen and 70 mL pentane was added to the residue. The resulting slurry was filtered through Celite™ filter material and the solvent was removed from the filtrate. Recrystallization of the crude product in 1 mL 2:1 Et$_2$O:pentane at −32° C. overnight yielded white crystalline solids identified as catalyst O (0.1246 g, 0.2126 mmol, 63%). $^1$H NMR (400 MHz, Benzene-d$_6$) δ 7.79 (dd, J=7.1, 1.7 Hz, 1H), 7.25 (td, J=7.9 Hz, 1.7 Hz, 1H), 7.11 (t, J=7.1 Hz, 1H), 7.01 (d, J=7.9 Hz, 1H), 3.93 (m, 1H), 2.65 (s, 6H), 2.54 (m, 1H), 2.41 (m, 1H), 2.20 (s, 3H), 1.96 (s, 3H), 1.88 (m, 1H), 1.86 (s, 3H), 1.72 (s, 3H), 1.70-1.26 (overlapping signals, 19H), 1.03 (s, 3H), 0.18 (s, 3H), 0.16 (s, 3H).

Example 21

Methylsilyl(2-dimethylaminophenyl)(tetramethylcyclopentadienyl)(cyclododecylamido)hafnium(IV) dimethyl (catalyst P)

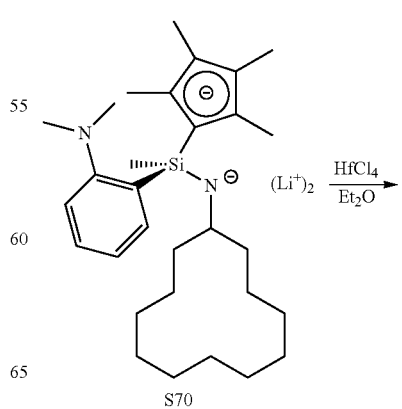

S70

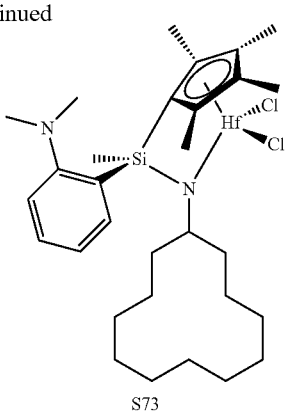

S73

Step 1. Methylsilyl(2-dimethylaminophenyl)(tetramethylcyclopentadienyl)(cyclododecylamido)hafnium(IV)dichloride (S73). This compound was prepared following the procedure described in Example 14, Step 3 using compound S70 (0.8806 g, 1.840 mmol) and HfCl$_4$ (0.5952 g, 1.858 mmol), which afforded a white powder identified as compound S73 (0.9332 g, 1.307 mmol, 71%).

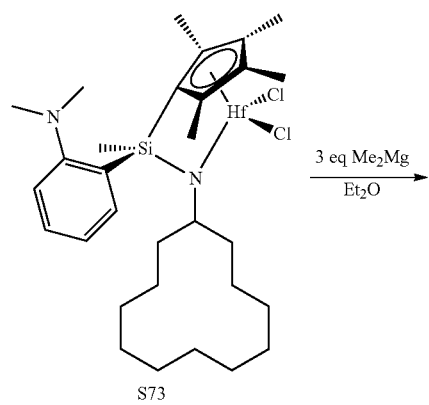

Step 2. Methylsilyl(2-dimethylaminophenyl)(tetramethylcyclopentadienyl)(cyclododecylamido)hafnium(IV)dimethyl (catalyst P). In a nitrogen-filled glovebox, a 100-mL round-bottom flask was charged with compound S73 (0.2158 g, 0.3022 mmol), diethyl ether (50 mL), and a magnetic stirbar, then placed in the freezer (−32° C.) for 1 h. The mixture was removed from the freezer and Me$_2$Mg (0.0436 g, 0.802 mmol) was added while stirring the reaction. The mixture was allowed to warm to room temperature and stirred overnight. The solvent was removed under a flow of nitrogen and 70 mL pentane was added to the residue. The resulting slurry was filtered through Celite™ filter material and the solvent was removed from the filtrate. The crude product was recrystallized in 1 mL 1:1 Et$_2$O:pentane at −32° C. overnight, which yielded a white powder identified as catalyst P (0.0782 g, 0.116 mmol, 38%). $^1$H NMR (400 MHz, Benzene-d$_6$) δ 7.84 (dd, J=7.3, 1.5 Hz, 1H), 7.25 (td, J=7.7 Hz, 1.7 Hz, 1H), 7.12 (t, J=7.3 Hz, 1H), 7.01 (d, J=7.7 Hz, 1H), 4.09 (m, 1H), 2.65 (s, 6H), 2.45 (m, 1H), 2.34 (m, 1H), 2.25 (s, 3H), 1.97 (s, 3H), 1.92 (m, 1H), 1.88 (s, 3H), 1.75 (s, 3H), 1.73-1.21 (overlapping signals, 19H), 1.05 (s, 3H), 0.07 (s, 3H), 0.05 (s, 3H).

Example 22

Catalysts A-E, J and K

Catalysts A and B were prepared as described by Karen E. du Plooy, Ulrich Moll, Sigrid Wocadlo, Wener Massa, and Jun Okuda in 14, Organometallics, pp. 3129-3131 (1995).

Catalyst C was prepared as described by Karen E. du Plooy, Ulrich Moll, Sigrid Wocadlo, Wener Massa, and Jun Okuda in 14, Organometallics, pp. 3129-3131 (1995) with the substitution of lithium 3-methoxypropylamide for lithium 2-methoxyethylamide.

Catalyst D was prepared as described by Karen E. du Plooy, Ulrich Moll, Sigrid Wocadlo, Wener Massa, and Jun Okuda in 14, Organometallics, pp. 3129-3131 (1995) with the substitution of lithium 2-isopropoxyethylamide for lithium 2-methoxyethylamide.

Catalyst E was prepared as described by Jun Okuda, Thomas Eberle, Thomas P. Spaniol, and Valerie Piquet-Faure in 591, J. Organomet. Chem., pp. 127-137 (1999) with the substitution of methyl lithium for Mg(CH$_2$Ph)$_2$(THF)$_2$.

Catalyst J was prepared as described by Karen E. du Plooy, Ulrich Moll, Sigrid Wocadlo, Wener Massa, and Jun Okuda in 14, Organometallics, pp. 3129-3131 (1995) with the substitution of lithium 2-isopropoxyethylamide for lithium 2-methoxyethylamide.

Catalyst K was prepared as described by Karen E. du Plooy, Ulrich Moll, Sigrid Wocadlo, Wener Massa, and Jun Okuda in 14, Organometallics, pp. 3129-3131 (1995) with the substitution of lithium 2-isopropoxyethylamide for lithium 2-methoxyethylamide, and HfCl$_4$ for ZrCl$_4$(THF)$_2$.

Example 23

Catalysts Q, R, and S

Lithium dimethylsilyl(tetramethylcyclopentadienide)(cyclododecylamide) was prepared following the procedure described by P. J. Shapiro, E. Bunel, W. P. Schaefer and J. E. Bercaw in 9, Organometallics, pp. 867-869 (1990) with the substitution of Li(cyclododecyl-NH) for Li(Me$_3$CNH).

Catalyst Q was prepared as described in Example 16 with the substitution of lithium dimethylsilyl(tetramethylcyclopentadienide)(cyclododecylamide) for compound S62.

Catalyst R was prepared as described in Example 18 with the substitution of lithium dimethylsilyl(tetramethylcyclopentadienide)(cyclododecylamide) for compound S62.

Dimethylsilyl(tetramethylcyclopentadienyl)(cyclododecylamide)titanium(IV)dimethyl (Catalyst S) was prepared as described in Example 14 with the substitution of lithium dimethylsilyl(tetramethylcyclopentadienide)(cyclododecylamide) for compound S62.

Polymerization Examples

Ethylene/1-octene copolymerizations were carried out in a parallel, pressure reactor, as generally described in U.S.

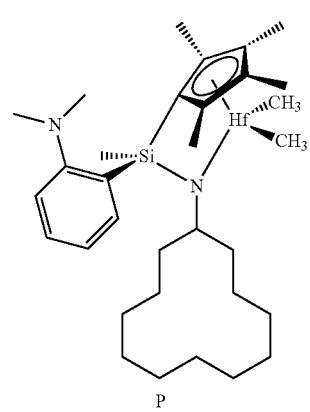

P

Pat. No. 6,306,658; U.S. Pat. No. 6,455,316; U.S. Pat. No. 6,489,168; WO 00/09255; and Murphy et al., *J. Am. Chem. Soc.*, 2003, 125, pages 4306-4317, each of which is fully incorporated herein by reference for US purposes. Although the specific quantities, temperatures, solvents, reactants, reactant ratios, pressures, and other variables are frequently changed from one polymerization run to the next, the following describes a typical polymerization performed in a parallel, pressure reactor.

A pre-weighed glass vial insert and disposable stirring paddle were fitted to each reaction vessel of the reactor, which contains 48 individual reaction vessels. The reactor was then closed and each vessel was individually heated to a set temperature (usually between 50 and 110° C.) and pressurized to a predetermined pressure of 1.38 MPa (usually between 75 and 400 psi) ethylene. 1-octene (100 microliters, 637 micromol) was injected into each reaction vessel through a valve, followed by enough solvent (typically toluene or isohexane) to bring the total reaction volume, including the subsequent additions, to 5 mL. Tri-n-octylaluminum or triisobutylaluminum in toluene (60 microliters, 5 mM in toluene, 0.3 micromol) was then added to act as a co-catalyst/scavenger.

The contents of the vessel were then stirred at 800 rpm. An activator solution (1.0 molar equivalents of triphenylcarbenium tetrakis(pentafluorophenyl)borate (activator A) or dimethylanilinium tetrakis(pentafluorophenyl)borate (activator B) dissolved in toluene) was then injected into the reaction vessel along with 500 microliters of isohexane, followed by a toluene solution of catalyst (typically 0.40 mM in toluene, usually 20-40 nanomols of catalyst) and another aliquot of isohexane (500 microliters). Equivalence is determined based on the mol equivalents relative to the moles of the transition metal in the catalyst complex.

The reaction was then allowed to proceed until a predetermined amount of ethylene (10-20 psi) had been taken up by the reaction (ethylene pressure was maintained in each reaction vessel at the pre-set level by computer control). At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight, by FT-IR (see below) to determine comonomer incorporation, and by DSC (see below) to determine melting point.

To determine various molecular weight related values by GPC, high temperature size exclusion chromatography was performed using an automated "Rapid GPC" system as generally described in U.S. Pat. No. 6,491,816; U.S. Pat. No. 6,491,823; U.S. Pat. No. 6,475,391; U.S. Pat. No. 6,461,515; U.S. Pat. No. 6,436,292; U.S. Pat. No. 6,406,632; U.S. Pat. No. 6,175,409; U.S. Pat. No. 6,454,947; U.S. Pat. No. 6,260,407; and U.S. Pat. No. 6,294,388; each of which is fully incorporated herein by reference for US purposes. This apparatus has a series of three 30 cm×7.5 mm linear columns, each containing PL gel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector. The molecular weights presented are relative to linear polystyrene standards and are uncorrected.

Rapid Differential Scanning Calorimetry (Rapid-DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period. The ratio of 1-octene to ethylene incorporated in the polymers (weight %) was determined by rapid FT-IR spectroscopy on a Bruker Equinox 55+ IR in reflection mode. Samples were prepared in a thin film format by evaporative deposition techniques. Weight percent 1-octene was obtained from the ratio of peak heights at 1378 and 4322 cm$^{-1}$. This method was calibrated using a set of ethylene/1-octene copolymers with a range of known wt % 1-octene content.

The conditions and results of the polymerization are summarized in Table 3 and Table 4, respectively.

TABLE 3

Reaction Conditions

| Entry | Catalyst | Catalyst (μmol) | Activator | C2 (psi) | Temp (° C.) | Run Time (s) | Yield (g) | Activity (g polymer/mmol cat h) |
|---|---|---|---|---|---|---|---|---|
| 1 | A | 0.15 | A | 75 | 80 | 603.1 | 0.003 | 119 |
| 2 | A | 0.15 | A | 75 | 80 | 600.3 | 0.001 | 40 |
| 3 | A | 0.15 | A | 110 | 105 | 600.2 | 0.003 | 120 |
| 4 | A | 0.15 | A | 110 | 105 | 600.9 | 0.003 | 120 |
| 5 | A | 0.15 | B | 75 | 80 | 601.4 | 0.003 | 120 |
| 6 | A | 0.15 | B | 75 | 80 | 602.7 | 0.002 | 80 |
| 7 | A | 0.15 | B | 110 | 105 | 601.5 | 0.007 | 279 |
| 8 | A | 0.15 | B | 110 | 105 | 600.6 | 0.007 | 280 |
| 9 | B | 0.15 | A | 75 | 80 | 264.9 | 0.035 | 3171 |
| 10 | B | 0.15 | A | 75 | 80 | 303.7 | 0.031 | 2450 |
| 11 | B | 0.15 | A | 110 | 105 | 388.6 | 0.038 | 2347 |
| 12 | B | 0.15 | A | 110 | 105 | 193.3 | 0.036 | 4470 |
| 13 | B | 0.15 | B | 75 | 80 | 570.6 | 0.032 | 1346 |
| 14 | B | 0.15 | B | 75 | 80 | 601.8 | 0.015 | 598 |
| 15 | B | 0.15 | B | 110 | 105 | 260.8 | 0.038 | 3497 |
| 16 | B | 0.15 | B | 110 | 105 | 296.0 | 0.038 | 3081 |
| 17 | C | 0.15 | A | 75 | 80 | 601.2 | 0 | 0 |
| 18 | C | 0.15 | A | 75 | 80 | 600.5 | 0 | 0 |
| 19 | C | 0.15 | A | 110 | 105 | 601.0 | 0 | 0 |
| 20 | C | 0.15 | A | 110 | 105 | 600.5 | 0 | 0 |
| 21 | C | 0.15 | B | 75 | 80 | 602.2 | 0 | 0 |
| 22 | C | 0.15 | B | 75 | 80 | 602.0 | 0 | 0 |
| 23 | C | 0.15 | B | 110 | 105 | 603.0 | 0.003 | 119 |
| 24 | C | 0.15 | B | 110 | 105 | 602.4 | 0.002 | 80 |
| 25 | D | 0.15 | A | 75 | 80 | 495.4 | 0.039 | 1889 |
| 26 | D | 0.15 | A | 75 | 80 | 601.9 | 0.018 | 718 |
| 27 | D | 0.15 | A | 110 | 105 | 201.1 | 0.039 | 4654 |
| 28 | D | 0.15 | A | 110 | 105 | 184.5 | 0.036 | 4683 |
| 29 | D | 0.15 | B | 75 | 80 | 603.1 | 0.023 | 915 |
| 30 | D | 0.15 | B | 75 | 80 | 601.6 | 0.008 | 319 |
| 31 | D | 0.15 | B | 110 | 105 | 209.8 | 0.045 | 5148 |
| 32 | D | 0.15 | B | 110 | 105 | 199.8 | 0.044 | 5285 |
| 33 | E | 0.15 | A | 75 | 80 | 600.6 | 0.032 | 1279 |
| 34 | E | 0.15 | A | 75 | 80 | 559.0 | 0.036 | 1546 |
| 35 | E | 0.15 | A | 110 | 105 | 265.7 | 0.042 | 3794 |
| 36 | E | 0.15 | A | 110 | 105 | 241.8 | 0.033 | 3275 |
| 37 | E | 0.15 | B | 75 | 80 | 601.0 | 0.028 | 1118 |
| 38 | E | 0.15 | B | 75 | 80 | 600.5 | 0.012 | 480 |
| 39 | E | 0.15 | B | 110 | 105 | 165.4 | 0.055 | 7981 |
| 40 | E | 0.15 | B | 110 | 105 | 148.9 | 0.054 | 8704 |
| 41 | F | 0.05 | A | 75 | 80 | 174.6 | 0.052 | 21443 |
| 42 | F | 0.05 | A | 75 | 80 | 119.4 | 0.051 | 30754 |
| 43 | F | 0.05 | B | 75 | 80 | 85.8 | 0.076 | 63776 |

TABLE 3-continued

Reaction Conditions

| Entry | Catalyst | Catalyst (μmol) | Activator | C2 (psi) | Temp (°C.) | Run Time (s) | Yield (g) | Activity (g polymer/ mmol cat h) |
|---|---|---|---|---|---|---|---|---|
| 44 | F | 0.05 | B | 75 | 80 | 87.2 | 0.068 | 56147 |
| 45 | F | 0.05 | B | 110 | 105 | 47.2 | 0.079 | 120508 |
| 46 | F | 0.05 | B | 110 | 105 | 54.8 | 0.071 | 93285 |
| 47 | G | 0.05 | A | 75 | 80 | 66.0 | 0.106 | 115636 |
| 48 | G | 0.05 | A | 75 | 80 | 48.6 | 0.102 | 151111 |
| 49 | G | 0.05 | B | 75 | 80 | 43.9 | 0.123 | 201731 |
| 50 | G | 0.05 | B | 75 | 80 | 32.5 | 0.117 | 259200 |
| 51 | G | 0.05 | B | 110 | 105 | 25.1 | 0.100 | 286853 |
| 52 | G | 0.05 | B | 110 | 105 | 26.0 | 0.089 | 246462 |
| 53 | H | 0.05 | A | 75 | 80 | 603.1 | 0.014 | 1671 |
| 54 | H | 0.05 | A | 75 | 80 | 601.3 | 0.006 | 718 |
| 55 | H | 0.05 | B | 75 | 80 | 85.8 | 0.044 | 36923 |
| 56 | H | 0.05 | B | 75 | 80 | 116.2 | 0.043 | 26644 |
| 57 | H | 0.05 | B | 110 | 105 | 47.5 | 0.052 | 78821 |
| 58 | H | 0.05 | B | 110 | 105 | 90.7 | 0.044 | 34928 |
| 59 | I | 0.05 | A | 75 | 80 | 602.5 | 0.004 | 478 |
| 60 | I | 0.05 | A | 75 | 80 | 603.1 | 0.001 | 119 |
| 61 | I | 0.05 | B | 75 | 80 | 208.2 | 0.032 | 11066 |
| 62 | I | 0.05 | B | 75 | 80 | 287.9 | 0.029 | 7253 |
| 63 | I | 0.05 | B | 110 | 105 | 85.5 | 0.041 | 34526 |
| 64 | I | 0.05 | B | 110 | 105 | 155.6 | 0.037 | 17121 |
| 65 | J | 0.05 | A | 75 | 80 | 603.3 | 0 | 0 |
| 66 | J | 0.05 | A | 75 | 80 | 602.6 | 0 | 0 |
| 67 | J | 0.05 | B | 75 | 80 | 600.5 | 0.017 | 2038 |
| 68 | J | 0.05 | B | 75 | 80 | 602.6 | 0.006 | 717 |
| 69 | J | 0.05 | B | 110 | 105 | 290.4 | 0.032 | 7934 |
| 70 | J | 0.05 | B | 110 | 105 | 348.7 | 0.029 | 5988 |
| 71 | K | 0.05 | A | 75 | 80 | 602.7 | 0 | 0 |
| 72 | K | 0.05 | A | 75 | 80 | 602.3 | 0 | 0 |
| 73 | K | 0.05 | B | 75 | 80 | 602.4 | 0 | 0 |
| 74 | K | 0.05 | B | 75 | 80 | 602.1 | 0 | 0 |
| 75 | K | 0.05 | B | 110 | 105 | 600.3 | 0.007 | 840 |
| 76 | K | 0.05 | B | 110 | 105 | 601.9 | 0.005 | 598 |
| 77 | L | 0.05 | A | 75 | 80 | 602.1 | 0.001 | 120 |
| 78 | L | 0.05 | A | 75 | 80 | 601.8 | 0.001 | 120 |
| 79 | L | 0.05 | B | 75 | 80 | 103.4 | 0.041 | 28549 |
| 80 | L | 0.05 | B | 75 | 80 | 124.3 | 0.038 | 22011 |
| 81 | L | 0.05 | B | 110 | 105 | 83.5 | 0.043 | 37078 |
| 82 | L | 0.05 | B | 110 | 105 | 80.4 | 0.041 | 36716 |
| 83 | M | 0.05 | A | 75 | 80 | 601.3 | 0 | 0 |
| 84 | M | 0.05 | A | 75 | 80 | 600.3 | 0 | 0 |
| 85 | M | 0.05 | B | 75 | 80 | 602.9 | 0.003 | 358 |
| 86 | M | 0.05 | B | 75 | 80 | 600.7 | 0.002 | 240 |
| 87 | M | 0.05 | B | 110 | 105 | 601.9 | 0.004 | 478 |
| 88 | M | 0.05 | B | 110 | 105 | 600.9 | 0.002 | 240 |
| 89 | N | 0.05 | A | 75 | 80 | 247.6 | 0.057 | 16575 |
| 90 | N | 0.05 | A | 75 | 80 | 195.5 | 0.044 | 16205 |
| 91 | N | 0.05 | B | 75 | 80 | 156.9 | 0.048 | 22027 |
| 92 | N | 0.05 | B | 75 | 80 | 143.3 | 0.043 | 21605 |
| 93 | N | 0.05 | B | 110 | 105 | 78.0 | 0.061 | 56308 |
| 94 | N | 0.05 | B | 110 | 105 | 84.8 | 0.053 | 45000 |
| 95 | O | 0.05 | A | 75 | 80 | 600.3 | 0.003 | 360 |
| 96 | O | 0.05 | A | 75 | 80 | 601.8 | 0.001 | 120 |
| 97 | O | 0.05 | B | 75 | 80 | 602.9 | 0.012 | 1433 |
| 98 | O | 0.05 | B | 75 | 80 | 603.2 | 0.009 | 1074 |
| 99 | O | 0.05 | B | 110 | 105 | 600.2 | 0.011 | 1320 |
| 100 | O | 0.05 | B | 110 | 105 | 601.7 | 0.007 | 838 |
| 101 | P | 0.05 | A | 75 | 80 | 601.2 | 0.002 | 240 |
| 102 | P | 0.05 | A | 75 | 80 | 601.5 | 0 | 0 |
| 103 | P | 0.05 | B | 75 | 80 | 600.4 | 0.003 | 360 |
| 104 | P | 0.05 | B | 75 | 80 | 601.8 | 0.002 | 239 |
| 105 | P | 0.05 | B | 110 | 105 | 412.0 | 0.03 | 5243 |
| 106 | P | 0.05 | B | 110 | 105 | 417.9 | 0.029 | 4996 |
| 107 | Q | 0.05 | A | 75 | 80 | 530.5 | 0.024 | 3257 |
| 108 | Q | 0.05 | A | 75 | 80 | 601.6 | 0.015 | 1795 |
| 109 | Q | 0.05 | B | 75 | 80 | 131.6 | 0.037 | 20243 |
| 110 | Q | 0.05 | B | 75 | 80 | 143.1 | 0.029 | 14591 |
| 111 | Q | 0.05 | B | 110 | 105 | 46.8 | 0.053 | 81538 |
| 112 | Q | 0.05 | B | 110 | 105 | 60.9 | 0.051 | 60296 |
| 113 | R | 0.05 | A | 75 | 80 | 603.1 | 0.018 | 2149 |
| 114 | R | 0.05 | A | 75 | 80 | 601.5 | 0.009 | 1077 |
| 115 | R | 0.05 | B | 75 | 80 | 232.0 | 0.032 | 9931 |
| 116 | R | 0.05 | B | 75 | 80 | 229.4 | 0.028 | 8788 |
| 117 | R | 0.05 | B | 110 | 105 | 99.1 | 0.046 | 33421 |
| 118 | R | 0.05 | B | 110 | 105 | 101.4 | 0.043 | 30533 |
| 119 | S | 0.05 | A | 75 | 80 | 67.3 | 0.122 | 130520 |
| 120 | S | 0.05 | A | 75 | 80 | 44.5 | 0.107 | 173124 |
| 121 | S | 0.05 | B | 75 | 80 | 43.6 | 0.140 | 231193 |
| 122 | S | 0.05 | B | 75 | 80 | 28.7 | 0.127 | 318606 |
| 123 | S | 0.05 | B | 110 | 105 | 22.0 | 0.127 | 415636 |
| 124 | S | 0.05 | B | 110 | 105 | 22.5 | 0.112 | 358400 |

TABLE 4

Copolymer properties

| Entry | 1-Octene (mol %) | Mw (g/mol) | Mn (g/mol) | Mw/Mn | Tm Peak* #1 (°C.) | Tm Peak* #2 (°C.) |
|---|---|---|---|---|---|---|
| 1 | — | — | — | — | — | — |
| 2 | — | — | — | — | — | — |
| 3 | — | — | — | — | — | — |
| 4 | — | — | — | — | — | — |
| 5 | — | — | — | — | — | — |
| 6 | — | — | — | — | — | — |
| 7 | — | — | — | — | — | — |
| 8 | — | — | — | — | — | — |
| 9 | 6.2 | 1.28E+06 | 6.08E+05 | 2.10 | — | 92.7 |
| 10 | 6.2 | 1.39E+06 | 7.46E+05 | 1.86 | — | 94.2 |
| 11 | 7.6 | 1.10E+06 | 5.33E+05 | 2.07 | — | 90.2 |
| 12 | 6.1 | 1.24E+06 | 6.53E+05 | 1.90 | — | 93.8 |
| 13 | 6.0 | 7.41E+05 | 3.54E+05 | 2.09 | — | 102.4 |
| 14 | 3.2 | 1.15E+06 | 5.67E+05 | 2.02 | — | 110.8 |
| 15 | 5.4 | 8.89E+05 | 4.75E+05 | 1.87 | — | 105.0 |
| 16 | 3.7 | 1.04E+06 | 5.36E+05 | 1.94 | — | 109.2 |
| 17 | — | — | — | — | — | — |
| 18 | — | — | — | — | — | — |
| 19 | — | — | — | — | — | — |
| 20 | — | — | — | — | — | — |
| 21 | — | — | — | — | — | — |
| 22 | — | — | — | — | — | — |
| 23 | — | — | — | — | — | — |
| 24 | — | — | — | — | — | — |
| 25 | 7.2 | 1.30E+06 | 6.46E+05 | 2.02 | — | 91.3 |
| 26 | — | — | — | — | — | — |
| 27 | 7.8 | 1.16E+06 | 5.64E+05 | 2.06 | — | 89.5 |
| 28 | 5.1 | 1.56E+06 | 7.16E+05 | 2.17 | — | 100.7 |
| 29 | 7.0 | 8.95E+05 | 4.35E+05 | 2.06 | — | 102.9 |
| 30 | 3.6 | 1.32E+06 | 6.41E+05 | 2.06 | — | 110.2 |
| 31 | 5.3 | 1.02E+06 | 5.54E+05 | 1.85 | 82.9 | 106.0 |
| 32 | 1.8 | 1.90E+06 | 9.32E+05 | 2.03 | — | 117.1 |
| 33 | 7.3 | 1.41E+06 | 6.74E+05 | 2.09 | — | 94.7 |
| 34 | 6.3 | 1.26E+06 | 6.90E+05 | 1.82 | — | 99.6 |
| 35 | 6.8 | 1.27E+06 | 6.57E+05 | 1.93 | — | 91.4 |
| 36 | 8.2 | 1.12E+06 | 5.34E+05 | 2.10 | — | 88.2 |
| 37 | 7.0 | 8.27E+05 | 4.36E+05 | 1.90 | 64.4 | 103.7 |
| 38 | 3.5 | 1.27E+06 | 6.50E+05 | 1.95 | — | 112.1 |
| 39 | 4.8 | 1.09E+06 | 5.51E+05 | 1.97 | 89.9 | 108.0 |
| 40 | 0.7 | 2.07E+06 | 1.05E+06 | 1.97 | — | 124.1 |
| 41 | 13.3 | 6.58E+05 | 2.30E+05 | 2.86 | — | 36.9 |
| 42 | 13.5 | 6.66E+05 | 2.41E+05 | 2.76 | — | 38.8 |
| 43 | 13.0 | 5.52E+05 | 1.34E+05 | 4.11 | — | 38.7 |
| 44 | 13.2 | 5.04E+05 | 1.26E+05 | 4.00 | — | 39.7 |
| 45 | 11.4 | 3.20E+05 | 9.09E+04 | 3.52 | — | 52.1 |
| 46 | 11.5 | 3.46E+05 | 1.05E+05 | 3.28 | — | 38.6 |
| 47 | 9.5 | 1.14E+06 | 5.51E+05 | 2.07 | — | 64.9 |
| 48 | 9.0 | 1.08E+06 | 6.31E+05 | 1.71 | — | 67.4 |
| 49 | 5.0 | 7.73E+05 | 4.20E+05 | 1.84 | — | 112.7 |
| 50 | 4.1 | 9.22E+05 | 5.18E+05 | 1.78 | — | 115.0 |
| 51 | 4.6 | 5.03E+05 | 2.17E+05 | 2.31 | 81.478 | 116.5 |
| 52 | 3.2 | 6.79E+05 | 3.30E+05 | 2.06 | 95.022 | 116.5 |
| 53 | 9.9 | 8.43E+05 | 4.54E+05 | 1.86 | — | 61.8 |
| 54 | 10.9 | 7.11E+05 | 4.12E+05 | 1.73 | — | 56.3 |
| 55 | 9.4 | 8.23E+05 | 4.41E+05 | 1.87 | — | 65.7 |

TABLE 4-continued

Copolymer properties

| Entry | 1-Octene (mol %) | Mw (g/mol) | Mn (g/mol) | Mw/Mn | Tm Peak* #1 (° C.) | Tm Peak* #2 (° C.) |
|---|---|---|---|---|---|---|
| 56 | 10.6 | 7.32E+05 | 4.20E+05 | 1.74 | — | 58.2 |
| 57 | 7.7 | 4.16E+05 | 2.12E+05 | 1.97 | — | 77.5 |
| 58 | 7.1 | 4.82E+05 | 2.37E+05 | 2.04 | — | 80.6 |
| 59 | 12.5 | 7.12E+05 | 2.84E+05 | 2.50 | — | 37.8 |
| 60 | 13.2 | 7.18E+05 | 2.98E+05 | 2.41 | — | 38.3 |
| 61 | 13.0 | 5.78E+05 | 1.58E+05 | 3.65 | — | 38.9 |
| 62 | 13.4 | 5.38E+05 | 1.40E+05 | 3.85 | — | 39.8 |
| 63 | 11.5 | 3.60E+05 | 1.27E+05 | 2.83 | — | 52.4 |
| 64 | 9.8 | 4.77E+05 | 1.61E+05 | 2.97 | — | 56.4 |
| 65 | 9.6 | 5.11E+03 | 3.00E+03 | 1.70 | 100.942 | 117.1 |
| 66 | 6.6 | 4.67E+03 | 2.75E+03 | 1.70 | 101.419 | 117.3 |
| 67 | 11.4 | 5.00E+03 | 2.87E+03 | 1.75 | 100.263 | 116.8 |
| 68 | 4.2 | 4.90E+03 | 2.81E+03 | 1.74 | 100.864 | 116.7 |
| 69 | 9.2 | 5.02E+03 | 2.91E+03 | 1.72 | 100.293 | 116.2 |
| 70 | 6.8 | 5.13E+03 | 2.87E+03 | 1.79 | 101.435 | 117.3 |
| 71 | 0.0 | — | — | — | — | — |
| 72 | 0.0 | — | — | — | — | — |
| 73 | 0.7 | 6.45E+05 | 8.16E+03 | 79.07 | 116.758 | 126.7 |
| 74 | 0.0 | — | — | — | — | — |
| 75 | 0.5 | 2.79E+05 | 1.24E+04 | 22.45 | — | 129.3 |
| 76 | 0.0 | — | — | — | — | — |
| 77 | 1.0 | 2.78E+06 | 8.94E+03 | 310.88 | — | 126.6 |
| 78 | 0.0 | — | — | — | — | — |
| 79 | 3.6 | 6.46E+03 | 3.59E+03 | 1.80 | 105.229 | 119.4 |
| 80 | 2.3 | 6.50E+03 | 3.79E+03 | 1.72 | 124.979 | 118.4 |
| 81 | 6.8 | 6.50E+03 | 3.72E+03 | 1.75 | 103.746 | 119.3 |
| 82 | 3.3 | 6.66E+03 | 3.71E+03 | 1.80 | 106.381 | 120.6 |
| 83 | 0.0 | — | — | — | — | — |
| 84 | 0.0 | — | — | — | — | — |
| 85 | 8.2 | 5.00E+03 | 2.84E+03 | 1.76 | 100.441 | 116.6 |
| 86 | 11.4 | 5.25E+03 | 2.94E+03 | 1.79 | 104.105 | 119.0 |
| 87 | 10.4 | 5.39E+03 | 3.27E+03 | 1.65 | 101.592 | 117.1 |
| 88 | 8.4 | 5.47E+03 | 3.21E+03 | 1.71 | 103.551 | 118.7 |
| 89 | — | — | — | — | — | — |
| 90 | — | 5.86E+03 | 2.96E+03 | 1.98 | — | — |
| 91 | — | 6.80E+03 | 3.17E+03 | 2.14 | — | — |
| 92 | — | — | — | — | — | — |
| 93 | — | — | — | — | — | — |
| 94 | — | 5.95E+03 | 2.83E+03 | 2.10 | — | — |
| 95 | — | — | — | — | — | — |
| 96 | — | — | — | — | — | — |
| 97 | — | — | — | — | — | — |
| 98 | — | — | — | — | — | — |
| 99 | — | — | — | — | — | — |
| 100 | — | — | — | — | — | — |
| 101 | — | — | — | — | — | — |
| 102 | — | 1.38E+04 | 7.60E+03 | 1.82 | — | — |
| 103 | — | 1.38E+04 | 6.16E+03 | 2.23 | — | — |
| 104 | — | — | — | — | — | — |
| 105 | — | 1.41E+04 | 7.37E+03 | 1.92 | — | — |
| 106 | — | 1.40E+04 | 7.43E+03 | 1.88 | — | — |
| 107 | — | — | — | — | — | — |
| 108 | — | — | — | — | — | — |
| 109 | — | — | — | — | — | — |
| 110 | — | — | — | — | — | — |
| 111 | — | — | — | — | — | — |
| 112 | — | — | — | — | — | — |
| 113 | — | — | — | — | — | — |
| 114 | — | — | — | — | — | — |
| 115 | — | 2.78E+05 | 1.46E+05 | 1.90 | — | — |
| 116 | — | — | — | — | — | — |
| 117 | — | — | — | — | — | — |
| 118 | — | 3.45E+05 | 1.95E+05 | 1.77 | — | — |
| 119 | — | 1.12E+04 | 6.15E+03 | 1.83 | — | — |
| 120 | — | 1.11E+04 | 5.66E+03 | 1.96 | — | — |
| 121 | — | 1.16E+04 | 6.38E+03 | 1.82 | — | — |
| 122 | — | — | — | — | — | — |
| 123 | — | 1.15E+04 | 6.36E+03 | 1.80 | — | — |
| 124 | — | 1.20E+04 | 6.37E+03 | 1.88 | — | — |

*Rapid-DSC

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

The invention claimed is:

1. A process for producing a polyolefin comprising contacting one or more olefin monomers with a catalyst system comprising:
   1) an activator; and
   2) a catalyst compound represented by the formula:
      $(L)_p(R')_zT(Cp)(A)MX_2$,
   wherein:
   Cp is a cyclopentadienyl ring substituted with 0, 1, 2, 3, or 4 substituent groups $R^1$, $R^2$, $R^3$, and/or $R^4$, each substituent group $R^1$, $R^2$, $R^3$, and/or $R^4$ being, independently, hydrogen, a hydrocarbyl group, a substituted hydrocarbyl group, an aryl group, or a substituted aryl group, provided that any of adjacent $R^1$, $R^2$, $R^3$, and $R^4$ groups optionally form a fused ring or multicenter fused ring system where the rings are aromatic, partially saturated or saturated, where A is bound to M and T, Cp is bound to M and T, and L and R' are bound to T;
   M is a Group 4 transition metal;
   z is 0, 1, 2, 3, 4, 5, 6, 7, or 8 indicating the number of R' groups bound to the bridging group T;
   p is 1, indicating the number of L groups bound to the bridging group T;
   each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's optionally form a part of a fused ring or a ring system;
   T is a bridging group;
   each R' is, independently, hydrogen, a $C_1$ to $C_{10}$ alkyl group, a $C_6$ to $C_{24}$ aryl group, or a $C_7$ to $C_{40}$ alkylaryl group;
   A is Cp or $(JS'_{z*-1-y})$, where $JS'_{z*-1-y}$ is a heteroatom ligand in which J is an element from Group 15 with a coordination number of 3 or an element from Group 16 with a coordination number of 2; S' is a radical group which is a hydrocarbyl, substituted hydrocarbyl, or heteroatom; and z* is the coordination number of the element J, and y is 0 or 1; and
   L is a heteroatom or heteroatom-containing group bound to T comprising perfluoroethyl, pentafluorophenyl, 2-fluorophenyl, 2,6-difluorophenyl, 2,4,6-trifluorophenyl, 2-dimethylaminophenyl, 2,3-bis(dimethylamino)phenyl, 2,4-bis(dimethylamino)phenyl, 2,5-bis(dimethylamino)phenyl, 2,6-bis(dimethylamino)phenyl, 2,4,6-tris(dimethylamino)phenyl, 2-diethylaminophenyl, 2,3-bis(diethylamino)phenyl, 2,4-bis(diethylamino)phenyl, 2,5-bis(diethylamino)phenyl, 2,6-bis (diethylamino)phenyl, 2,4,6-tris(diethylamino)phenyl, 2-diisopropylaminophenyl, 2,3-bis(diisopropylamino) phenyl, 2,4-bis(diisopropylamino)phenyl, 2,5-bis(diisopropylamino)phenyl, 2,6-bis(diisopropylamino) phenyl, 2,4,6-tris(diisopropylamino)phenyl, 2-dimethylphosphinophenyl, 2,3-bis(dimethylphosphino)phenyl, 2,4-bis(dimethylphosphino)phenyl, 2,5-bis(dimethylphosphino)phenyl, 2,6-bis(dimethylphosphino)phenyl, 2,4,6-tris(dimethylphosphino)phenyl, 2-diethylphosphinophenyl, 2,3-bis(diethylphosphino) phenyl, 2,4-bis(diethylphosphino)phenyl, 2,5-bis(diethylphosphino)phenyl, 2,6-bis(diethylphosphino)phenyl, 2,4,6-tris(diethylphosphino)phenyl, 2-diisopropylphosphinophenyl, 2,3-bis(diisopropylphosphino)phenyl, 2,4-bis(diisopropylphosphino)phenyl, 2,5-bis(diisopropylphosphino)phenyl, 2,6-bis(diisopropylphosphino)phenyl, 2,4,6-tris (diisopropylphosphino)phenyl, 2-hydroxyphenyl, 2,3-dihydroxyphenyl, 2,4-dihydroxyphenyl, 2,5-dihydroxyphenyl, 2,6-dihydroxyphenyl, 2,4,6-trihydroxylphenyl, 2,3,5,6-tetrahydroxyphenyl, 2,3,4,5,6-pentahydroxyphenyl, 2-methoxyphenyl, 2-methoxy-5-fluorophenyl, 2,3-dimethoxyphenyl, 2,4-dimethoxyphenyl, 2,5-dimethoxyphenyl, 2,6-dimethoxyphenyl, 2,4,6-trimethoxylphenyl, 2,3,5,6-tetramethoxyphenyl, 2,3,4,5,6-pentamethoxyphenyl, 2-ethoxyphenyl, 2-ethoxy-5-fluorophenyl, 2,3-diethoxyphenyl, 2,4-diethoxyphenyl, 2,5-diethoxyphenyl, 2,6-diethoxyphenyl, 2,4,6-triethoxyphenyl, 2,3,5,6-tetrathoxyphenyl, 2,3,4,5,6-pentaethoxyphenyl, 2-isopropoxyphenyl, 2-isopropoxy-5-fluorophenyl, 2,3-diisopropoxyphenyl, 2,4-diisopropoxyphenyl, 2,5-diisopropoxyphenyl, 2,6-diisopropoxyphenyl, 2,4,6-triisopropoxylphenyl, 2,3,5,6-tetraisoproxyphenyl, 2,3,4,5,6-pentaisopropoxyphenyl, 2-methylthiophenyl, 2-methylthio-5-fluorophenyl, 2,3-dimethylthiophenyl, 2,4-dimethylthiophenyl, 2,5-dimethylthiophenyl, 2,6-dimethylthiophenyl, 2,4,6-trimethylthiolphenyl, 2,3,5,6-tetramethylthiophenyl, 2,3,4,5,6-pentamethylthiophenyl, 2-ethylthiophenyl, 2-ethylthio-5-fluorophenyl, 2,3-diethylthiophenyl 2,4-diethylthiophenyl, 2,5-diethylthiophenyl, 2,6-diethylthiophenyl, 2,4,6-triethylthiolphenyl, 2,3,5,6-tetraethylthiophenyl, 2,3,4,5,6-pentaethylthiophenyl, 2-isopropylthiophenyl, 2-isopropylthio-5-fluorophenyl, 2,3-dimthylthiophenyl, 2,4-diisopropylthiophenyl, 2,5-diisopropylthiophenyl, 2,6-diisopropylthiophenyl, 2,4,6-triisopropylthiolphenyl, 2,3,5,6-tetraisopropylthiophenyl, 2,3,4,5,6-pentaisopropylthiophenyl, 2-tert-butylthiophenyl, 2-tert-butylthio-5-fluorophenyl, 2,3-dimthylthiophenyl, 2,4-ditert-butylthiophenyl, 2,5-ditert-butylthiophenyl, 2,6-ditert-butylthiophenyl, 2,4,6-tritert-butylthiolphenyl, 2,3,5,6-tetratert-butylthiophenyl, 2,3,4,5,6-pentatert-butylthiophenyl, dimethylaminomethyl, diethylaminomethyl, di-n-propylaminomethyl, di-isopropylaminomethyl, diphenylaminomethyl, 2-dimethylaminoethyl, 2-diethylaminoethyl, 2-di-n-propylaminoethyl, 2-di-iso-propyl amino ethyl, 2-diphenyl amino ethyl, 3-dimethylaminopropyl, 3-diethylaminopropyl, 3-di-n-propylaminopropyl, 3-di-isopropylaminopropyl, 3-diphenylaminopropyl, dimethylphosphinomethyl, diethylphosphinomethyl, di-n-propylphosphinomethyl, di-isopropylphosphinomethyl, diphenylphosphinomethyl, 2-dimethylphosphinoethyl, 2-diethylphosphinoethyl, 2-di-n-propylphosphinoethyl, 2-di-iso-propyl phosphinoethyl, 2-diphenylphosphinoethyl, 3-dimethylphosphinopropyl, 3-diethylphosphinopropyl, 3-di-n-propylphosphinopropyl, 3-di-isopropylphosphinopropyl, 3-diphenylphosphinopropyl, methoxymethyl, ethyoxymethyl, propoxymethyl, isopropoxymethyl, tert-butoxymethyl, phenoxymethyl 2-methoxyethyl, 2-ethoxyethyl, 2-propoxyethyl, 2-isopropoxyethyl, 2-tert-butoxyethyl, 2-phenoxyethyl, 3-methoxypropyl, 3-ethoxypropyl, 3-n-propoxypropyl, 3-isopropoxypropyl, 3-diphenoxypropyl, methylthiomethyl, ethylthiomethyl, propylthiomethyl, isopropylthiomethyl, tert-butylthiomethyl, phenylthiomethyl, 2-methylthioethyl, 2-propylthioethyl, 2-isopropylthioethyl, 2-tert-butylthioethyl, 2-phenylthioethyl, 3-methylthiopropyl, 3-ethylthiopropyl, 3-n-propylthiopropyl, 3-isoprylthiopropyl, 3-diphenylthiopropyl, 2-dimethylphosphinophenyl, 2-diphenylphosphinophenyl, 2-dicyclohexylphosphinophenyl, 2-pyridyl, 3-pyridyl, 4-pyridyl, 2-(4-dimethylaminopyridyl), 3-(4-dimethylaminopyridyl), 4-(4-dimethylaminopyridyl), 2-pyrimidyl, 4-pyrimidyl, 5-pyrimidyl, 6-pyrimidyl, 2-quinolyl, 2-isoquinolyl, 2-tetrahydroisoquinolyl, 4-acridinyl, or 4-(5-methylacridinyl)).

2. The process of claim 1 wherein the catalyst compound is represented by the formula:

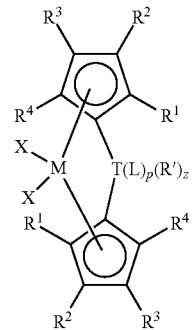

where M is a Group 4 transition metal; z is 0, 1, 2, 3, 4, 5, 6, 7, or 8 indicating the number of R' groups bound to the bridging group T;

p is 1, indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's optionally form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, an aryl group, or a substituted aryl group, provided that any of adjacent $R^1$, $R^2$, $R^3$, and $R^4$ groups optionally form a fused ring or multicenter fused ring system where the rings are aromatic, partially saturated, or saturated; and each R' is, independently, hydrogen, a $C_1$ to $C_{10}$ alkyl group, a $C_6$ to $C_{24}$ aryl group, or a $C_7$ to $C_{40}$ alkylaryl group; and each L is as defined in claim 1.

3. The process of claim 2, wherein the catalyst compound is represented by the formula:

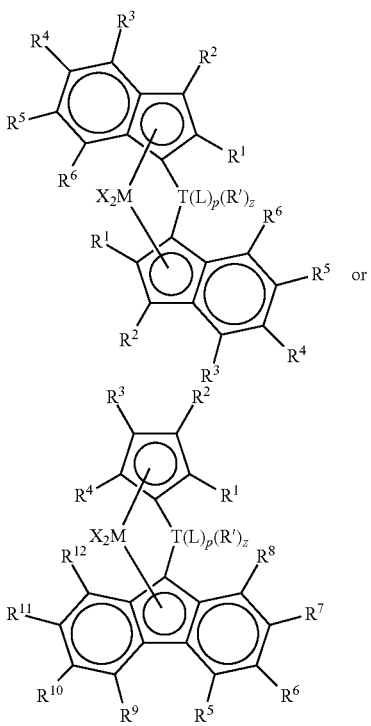

where each $R^1$ to $R^{12}$ is, independently hydrogen, a hydrocarbyl group, substituted hydrocarbyl group, aryl group, or substituted aryl group, and X, M, T, L, R', p, and z are as defined in claim 1.

4. The process of claim 1 wherein the catalyst compound is represented by the formula:

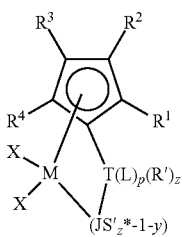

where M is a Group 4 transition metal;

z is 0, 1, 2, 3, 4, 5, 6, 7, or 8 indicating the number of R' groups bound to the bridging group T;

p is 1, indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's optionally form a part of a fused ring or a ring system;

T is a bridging group bound to J and the cyclopentadienyl group;

each $R^1$, $R^2$, $R^3$, and $R^4$ is, independently, hydrogen, a hydrocarbyl group, a substituted hydrocarbyl group, aryl group, or substituted aryl group, provided that any of adjacent $R^1$, $R^2$, $R^3$, and $R^4$ groups optionally form a fused ring or multicenter fused ring system where the rings are aromatic, partially saturated or saturated;

each R' is, independently, hydrogen, a $C_1$ to $C_{10}$ alkyl group, a $C_6$ to $C_{24}$ aryl group, or a $C_7$ to $C_{40}$ alkylaryl group;

each L is as defined in claim 1; and $JS'_{z^*-1-y}$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, or heteroatom; and $z^*$ is the coordination number of the element J, and y is 0 or 1.

5. The process of claim 1, wherein the olefin monomers are ethylene and one or more $C_3$ to $C_{20}$ comonomers.

6. The process of claim 1, wherein the olefin monomers are ethylene and one or more $C_3$ to $C_{20}$ comonomers, said process further comprising obtaining copolymer having a DSC peak melting temperature, $T_m$, greater than the line represented by $T_m = 132 - (6.25 \cdot M\%)$, where M % is the mol % comonomer.

7. The process of claim 6, wherein one, two, or three CEF elution peaks are exhibited below 110° C., and no CEF elution is exhibited above 110° C.

8. The process of claim 6, wherein a single CEF elution peaks occurs within a range of from 60° C. to 110° C.

9. The process of claim 1, wherein no more than one catalyst compound is present in the catalyst system.

10. The process of claim 5, wherein the comonomer is propylene, 1-butene, 1-hexene, or 1-octene.

11. The process of claim 1, wherein the process comprises producing an ethylene copolymer having from 0.2 mol % to 20 mol % comonomer and a DSC peak $T_m$ of 100° C. to 130° C.

12. The process of claim 1, wherein each X is, independently, selected from the group consisting of hydrocarbyl radicals having from 1 to 20 carbon atoms and halides.

13. The process of claim 3, wherein all $R^1$ to $R^{12}$ groups are hydrogen.

14. The process of claim 3, wherein groups $R^1$, $R^2$, $R^3$, $R^4$, $R^5$, $R^6$, $R^7$, $R^8$, $R^9$, $R^{10}$, $R^{11}$, and $R^{12}$ are, independently, hydrogen, methyl, ethyl, propyl, butyl, isobutyl, tert-butyl, or phenyl.

15. The process of claim 1, wherein $T(L)_p(R')_z$ is represented by one of the groups: $R'_2C$, $R'_2Si$, $R'_2Ge$, $R'_2C=CR'_2CR'_2$, $R'_2C=CR'_2CR'_2CR'_2$, $R'C=CR'$, $R'C=CR'CR'_2$, $R'_2C=CR'=CR'CR'_2$, $R'C=CR'CR'=CR'$, $R'C=CR'CR'_2CR'_2$, $R'_2SiSiR'_2$, $R_2C=SiR'_2CR'_2$, $R'_2Si=CR'_2SiR'_2$, $R'C=CR'SiR'_2$, $R'_2C=GeR'_2CR'_2$, $R'_2Ge=CR'_2GeR'_2$, $R'_2Si=GeR'_2$, $R'C=CR'GeR'_2$, $R'B$, $R'_2C$—$BR'$, $R'_2C$—$BR'$—$CR'_2$, $R'_2C$—$O$—$CR'_2$, $R'_2CR'_2C$—$O$—$CR'_2CR'_2$, $R'_2C$—$O$—$CR'_2CR'_2$, $R'_2C$—$O$—$CR'=CR'$, $R'_2C$—$S$—$CR'_2$, $CR'_2CR'_2$—$S$—$CR'_2CR'_2$, $R'_2C$—$S$—$CR'_2CR'_2$, $R'_2C$—$S$—$CR'=CR'$, $R'_2C$—$Se$—$CR'_2$, $R'_2CR'_2C$—$Se$—$CR'_2CR'_2$, $R'_2C$—$Se$—$CR_2CR'_2$, $R'_2C$—$Se$—$CR'=CR'$, $R'_2C$—$N=CR'$, $R'_2C$—$NR'$—$CR'_2$, $R'_2C$—$NR'$—$CR'_2CR'_2$, $R'_2C$—$NR'$—$CR'=CR'$, $R'_2CR'_2C$—$NR'$—$CR'_2CR'_2$, $R'_2C$—$P=CR'$, and $R'_2C$—$PR'$—$CR'_2$ where R' is hydrogen or a $C_1$ to $C_{20}$ hydrocarbyl, substituted hydrocarbyl, halocarbyl, substituted halocarbyl, aryl, substituted aryl, silylcarbyl or germylcarbyl substituent and optionally two or more adjacent R' join to form a substituted or unsubstituted, saturated, partially unsaturated or aromatic, cyclic or polycyclic substituent; and provided that at least one of the R' groups is substituted by an L, where L is as defined in claim 1.

16. The process of claim 1, wherein $T(L)_p(R')_z$ is selected from C(L)H, C(L)HCH$_2$, C(L)CH$_3$, Si(L)CH$_3$, Si(L)Ph, Si(L)CH$_3$, C(L)Ph, C(CR$_2$)$_n$(L), C(CR$_2$)$_n$(CRL), Si(CR$_2$)$_n$ (L), and Si(CR)$_n$(CRL), where R is hydrogen or a C$_1$ to C$_{20}$ containing hydrocarbyl or substituted hydrocarbyl, L is as defined in claim 1 and n is 1, 2, 3, or 4.

17. The process of claim 1, wherein the activator comprises alumoxane.

18. The process of claim 1, wherein the activator comprises a non-coordinating anion activator.

19. The process of claim 1, wherein the activator is represented by the formula:

$$(Z)_d{}^+(Ar^{d-})$$

wherein Z is (Lb-H) or a reducible Lewis Acid, Lb is a neutral Lewis base; H is hydrogen; (Lb-H)$^+$ is a Bronsted acid; Ar$^{d-}$ non-coordinating anion having the charge d– and having the charge d–; and d is an integer from 1 to 3.

20. The process of claim 1, wherein the activator is represented by the formula:

$$(Z)_d{}^+(Ar)_{d-}$$

wherein Ar$^{d-}$ is a non-coordinating anion having the charge d–; d is an integer from 1 to 3, and Z is a reducible Lewis acid represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl.

21. A catalyst compound represented by the formula:

$$(L)_p(R')_zT(Cp)(A)MX_2$$

wherein:
Cp is a cyclopentadienyl ring substituted with 0, 1, 2, 3, or 4 substituent groups R$^1$, R$^2$, R$^3$, and R$^4$, each substituent group R$^1$, R$^2$, R$^3$, and R$^4$ being, independently, hydrogen, a hydrocarbyl group, a substituted hydrocarbyl group, an aryl group, or a substituted aryl group, provided that any of adjacent R$^1$, R$^2$, R$^3$, and R$^4$ groups optionally form a fused ring or multicenter fused ring system where the rings are aromatic, partially saturated or saturated, where A is bound to M and T, Cp is bound to M and T and L and R' are bound to T;
M is a Group 4 transition metal;
z is 0, 1, 2, 3, 4, 5, 6, 7, or 8 indicating the number of R' groups bound to the bridging group T;
p is 1, indicating the number of L groups bound to the bridging group T;
each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's optionally form a part of a fused ring or a ring system;
T is a bridging group;
each R' is, independently, hydrogen, a C$_1$ to C$_{10}$ alkyl group, a C$_6$ to C$_{24}$ aryl group, or a C$_7$ to C$_{40}$ alkylaryl group;
A is Cp or (JS'$_{z*-1-y}$), where JS'$_{z*-1-y}$ is a heteroatom ligand in which J is an element from Group 15 with a coordination number of 3 or an element from Group 16 with a coordination number of 2; S' is a radical group which is a hydrocarbyl, substituted hydrocarbyl, or heteroatom; and z* is the coordination number of the element J, and y is 0 or 1; and
L is a heteroatom or heteroatom-containing group bound to T comprising perfluoroethyl, pentafluorophenyl, 2-fluorophenyl, 2,6-difluorophenyl, 2,4,6-trifluorophenyl, 2-dimethylaminophenyl, 2,3-bis(dimethylamino) phenyl, 2,4-bis(dimethylamino)phenyl, 2,5-bis(dimethylamino)phenyl, 2,6-bis(dimethylamino)phenyl, 2,4,6-tris(dimethylamino)phenyl, 2-diethylaminophenyl, 2,3-bis(diethylamino)phenyl, 2,4-bis(diethylamino)phenyl, 2,5-bis(diethylamino)phenyl, 2,6-bis (diethylamino)phenyl, 2,4,6-tris(diethylamino)phenyl, 2-diisopropylaminophenyl, 2,3-bis(diisopropylamino) phenyl, 2,4-bis(diisopropylamino)phenyl, 2,5-bis(diisopropylamino)phenyl, 2,6-bis(diisopropylamino) phenyl, 2,4,6-tris(diisopropylamino)phenyl, 2-dimethylphosphinophenyl, 2,3-bis(dimethylphosphino)phenyl, 2,4-bis(dimethylphosphino)phenyl, 2,5-bis(dimethylphosphino)phenyl, 2,6-bis(dimethylphosphino)phenyl, 2,4,6-tris(dimethylphosphino)phenyl, 2-diethylphosphinophenyl, 2,3-bis(diethylphosphino) phenyl, 2,4-bis(diethylphosphino)phenyl, 2,5-bis(diethylphosphino)phenyl, 2,6-bis(diethylphosphino)phenyl, 2,4,6-tris(diethylphosphino)phenyl, 2-diisopropylphosphinophenyl, 2,3-bis(diisopropylphosphino)phenyl, 2,4-bis(diisopropylphosphino)phenyl, 2,5-bis(diisopropylphosphino)phenyl, 2,6-bis(diisopropylphosphino)phenyl, 2,4,6-tris (diisopropylphosphino)phenyl, 2-hydroxyphenyl, 2,3-dihydroxyphenyl, 2,4-dihydroxyphenyl, 2,5-dihydroxyphenyl, 2,6-dihydroxyphenyl, 2,4,6-trihydroxylphenyl, 2,3,5,6-tetrahydroxyphenyl, 2,3,4,5,6-pentahydroxyphenyl, 2-methoxyphenyl, 2-methoxy-5-fluorophenyl, 2,3-dimethoxyphenyl, 2,4-dimethoxyphenyl, 2,5-dimethoxyphenyl, 2,6-dimethoxyphenyl, 2,4,6-trimethoxylphenyl, 2,3,5,6-tetramethoxyphenyl, 2,3,4,5,6-pentamethoxyphenyl, 2-ethoxyphenyl, 2-ethoxy-5-fluorophenyl, 2,3-diethoxyphenyl, 2,4-diethoxyphenyl, 2,5-diethoxyphenyl, 2,6-diethoxyphenyl, 2,4,6-triethoxylphenyl, 2,3,5, 6-tetrathoxyphenyl, 2,3,4,5,6-pentaethoxyphenyl, 2-isopropoxyphenyl, 2-isopropoxy-5-fluorophenyl, 2,3-diisopropoxyphenyl, 2,4-diisopropoxyphenyl, 2,5-diisopropoxyphenyl, 2,6-diisopropoxyphenyl, 2,4,6-triisopropoxylphenyl, 2,3,5,6-tetraisoproxyphenyl, 2,3, 4,5,6-pentaisopropoxyphenyl, 2-methylthiophenyl, 2-methylthio-5-fluorophenyl, 2,3-dimethylthiophenyl, 2,4-dimethylthiophenyl, 2,5-dimethylthiophenyl, 2,6-dimethylthiophenyl, 2,4,6-trimethylthiolphenyl, 2,3,5, 6-tetramethylthiophenyl, 2,3,4,5,6-pentamethylthiophenyl, 2-ethylthiophenyl, 2-ethylthio-5-fluorophenyl, 2,3-diethylthiophenyl 2,4-diethylthiophenyl, 2,5-diethylthiophenyl, 2,6-diethylthiophenyl, 2,4,6-triethylthiolphenyl, 2,3,5,6-tetraethylthiophenyl, 2,3,4,5,6-pentaethylthiophenyl, 2-isopropylthiophenyl, 2-isopropylthio-5-fluorophenyl, 2,3-dimthylthiophenyl, 2,4-diisopropylthiophenyl, 2,5-diisopropylthiophenyl, 2,6-diisopropylthiophenyl, 2,4,6-triisopropylthiolphenyl, 2,3,5,6-tetraisopropylthiophenyl, 2,3,4,5, 6-pentaisopropylthiophenyl, 2-tert-butylthiophenyl, 2-tert-butylthio-5-fluorophenyl, 2,3-dimthylthiophenyl, 2,4-ditert-butylthiophenyl, 2,5-ditert-butylthiophenyl, 2,6-ditert-butylthiophenyl, 2,4,6-tritert-butylthiolphenyl, 2,3,5,6-tetratert-butylthiophenyl, 2,3,4,5,6-pentatert-butylthiophenyl, dimethylaminomethyl diethylaminomethyl, di-n-propylaminomethyl, di-isopropylaminomethyl, diphenylaminomethyl, 2-dimethylaminoethyl, 2-diethylaminoethyl, 2-di-n-propylaminoethyl, 2-di-iso-propyl amino ethyl, 2-diphenyl amino ethyl, 3-dimethylaminopropyl, 3-diethylaminopropyl, 3-di-n-propylaminopropyl, 3-di-isopropylaminopropyl, 3-diphenylaminopropyl, dimethylphosphinomethyl, diethylphosphinomethyl, di-n- propylphosphinomethyl, di-isopropylphosphinomethyl, diphenylphosphinomethyl, 2-dimethylphosphinoethyl, 2-diethylphosphinoethyl, 2-di-n-propylphosphinoethyl, 2-di-iso-propylphosphinoethyl, 2-diphenylphosphinoethyl, 3-dimethylphosphinopropyl, 3-diethylphosphinopropyl, 3-di-n-propylphosphinopropyl, 3-di-isopropylphosphinopropyl, 3-diphenylphosphinopropyl, methoxymethyl, ethyoxymethyl, propoxymethyl, isopropoxymethyl, tert-butoxymethyl, phenoxymethyl 2-methoxyethyl, 2-ethoxyethyl, 2-propoxyethyl, 2-isopropoxyethyl, 2-tert-butoxyethyl, 2-phenoxyethyl, 3-methoxypropyl, 3-ethoxypropyl, 3-n-propoxypropyl, 3-isopropoxypropyl, 3-diphenoxypropyl, methylthiomethyl, ethylthiomethyl, propylthiomethyl, isopropylthiomethyl, tert-butylthiomethyl, phenylthiomethyl, 2-methylthioethyl, 2-propylthioethyl, 2-isopropylthioethyl, 2-tert-butylthioethyl, 2-phenylthioethyl, 3-methylthiopropyl, 3-ethylthiopropyl, 3-n-propylthiopropyl, 3-isoprylthiopropyl, 3-diphenylthiopropyl, 2-dimethylphosphinophenyl, 2-diphenylphosphinophenyl, 2-dicyclohexylphosphinophenyl, 2-pyridyl, 3-pyridyl, 4-pyridyl, 2-(4-dimethylaminopyridyl), 3-(4-dimethylaminopyridyl), 4-(4-dimethylaminopyridyl), 2-pyrimidyl, 4-pyrimidyl, 5-pyrimidyl, 6-pyrimidyl, 2-quinolyl, 2-isoquinolyl, 2-tetrahydroisoquinolyl, 4-acridinyl, or 4-(5-methylacridinyl).

22. The catalyst compound of claim 21 wherein the compound is represented by the formula:

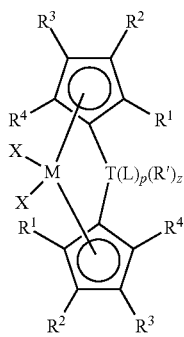

where M is a Group 4 transition metal; z is 0, 1, 2, 3, 4, 5, 6, 7 or 8 indicating the number of R' groups bound to the bridging group T, and p is 1, 2 or 3 indicating the number of L groups bound to the bridging group T;

each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;

T is a bridging group bound to each of the cyclopentadienyl groups;

each $R^1$, $R^2$, $R^3$, and $R^4$ is, independently, hydrogen, a hydrocarbyl group, a substituted hydrocarbyl group, aryl group, or substituted aryl group, provided that any of adjacent $R^1$, $R^2$, $R^3$, and $R^4$ groups optionally form a fused ring or multicenter fused ring system where the rings are aromatic, partially saturated or saturated; and each R' is, independently, hydrogen, a $C_1$ to $C_{10}$ alkyl group, a $C_6$ to $C_{24}$ aryl group, or a $C_7$ to $C_{40}$ alkylaryl group; and each L is as defined in claim 21.

23. The catalyst compound of claim 22, wherein the catalyst compound is represented by the formula:

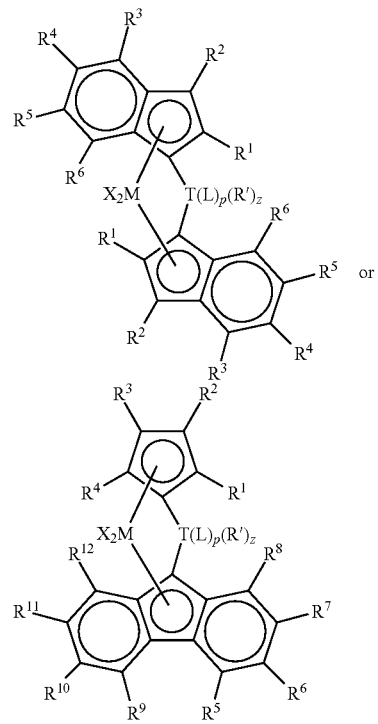

where each $R^1$, $R^2$, $R^3$, $R^4$, $R^5$, $R^6$, $R^7$, $R^8$, $R^9$, $R^{10}$, $R^{11}$, and $R^{12}$ is, independently, hydrogen, a hydrocarbyl group, substituted hydrocarbyl group, aryl group, or substituted aryl group, and X, M, T, L, R', p and z are as defined in claim 21.

24. The catalyst compound of claim 21, wherein the catalyst compound is represented by the formula:

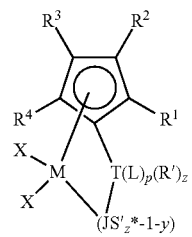

where M is a Group 4 transition metal;
z is 0, 1, 2, 3, 4, 5, 6, 7, or 8 indicating the number of R' groups bound to the bridging group T;
p is 1, indicating the number of L groups bound to the bridging group T;
each X is, independently, selected from the group consisting of hydrocarbyl radicals having from 1 to 20 carbon atoms, hydrides, amides, alkoxides, sulfides, phosphides, halides, dienes, amines, phosphines, ethers, and combinations thereof, provided that two X's may form a part of a fused ring or a ring system;
T is a bridging group bound to J and the cyclopentadienyl group;
each $R^1$, $R^2$, $R^3$, and $R^4$ is, independently, hydrogen, a hydrocarbyl group, a substituted hydrocarbyl group, aryl group, or substituted aryl group, provided that any of adjacent $R^1$, $R^2$, $R^3$, and $R^4$ groups optionally form a fused ring or multicenter fused ring system where the rings are aromatic, partially saturated, or saturated;

each R' is, independently, hydrogen, a $C_1$ to $C_{10}$ alkyl group, a $C_6$ to $C_{24}$ aryl group, or a $C_7$ to $C_{40}$ alkylaryl group;

each L is as defined in claim 21; and $JS'_{z*-1-y}$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, or heteroatom; and z* is the coordination number of the element J, and y is 0 or 1.

25. The catalyst compound of claim 21, wherein the catalyst compound is part of an olefin polymerization catalyst system further comprising an activator.

26. The catalyst compound of claim 25, wherein no more than one catalyst compound is present in the catalyst system.

27. The catalyst compound of claim 21, wherein each X is, independently, selected from the group consisting of hydrocarbyl radicals having from 1 to 20 carbon atoms and halides.

28. The catalyst compound of claim 23, wherein all $R^1$ to $R^{12}$ groups are hydrogen.

29. The catalyst compound of claim 23, wherein groups $R^1$, $R^2$, $R^3$, $R^4$, $R^5$, $R^6$, $R^7$, $R^8$, $R^9$, $R^{10}$, $R^{11}$, and $R^{12}$ are, independently, hydrogen, methyl, ethyl, propyl, butyl, isobutyl, tert-butyl, or phenyl.

30. The catalyst compound of claim 21, wherein $T(L)p(R')z$ is represented by one of the groups: $R'_2C$, $R'_2Si$, $R'_2Ge$, $R'_2C=CR'_2CR'_2$, $R'_2C=CR'_2CR'_2CR'_2$, $R'C=CR'$, $R'C=CR'CR'_2$, $R'_2C=CR'=CR'CR'_2$, $R'C=CR'CR'=CR'$, $R'C=CR'CR'_2CR'_2$, $R'_2SiSiR'_2$, $R_2C=SiR'_2CR'_2$, $R'_2Si=CR'_2SiR'_2$, $R'C=CR'SiR'_2$, $R'_2C=GeR'_2CR'_2$, $R'_2Ge=CR'_2GeR'_2$, $R'_2Si=GeR'_2$, $R'C=CR'GeR'_2$, $R'B$, $R'_2C—BR'$, $R'_2C—BR'—CR'_2$, $R'_2C—O—CR'_2$, $R'_2CR'_2C—O—CR'_2CR'_2$, $R'_2C—O—CR'_2CR'_2$, $R'_2C—O—CR'=CR'$, $R'_2C—S—CR'_2$, $CR'_2CR'_2—S—CR'_2CR'_2$, $R'_2C—S—CR'_2CR'_2$, $R'_2C—S—CR'=CR'$, $R'_2C—Se—CR'_2$, $R'_2CR'_2C—Se—CR'_2CR'_2$, $R'_2C—Se—CR_2CR'_2$, $R'_2C—Se—CR'=CR'$, $R'_2C—N=CR'$, $R'_2C—NR'—CR'_2$, $R'_2C—NR'—CR'_2CR'_2$, $R'_2C—NR'—CR'=CR'$, $R'_2CR'_2C—NR'—CR'_2CR'_2$, $R'_2C—P=CR'$, and $R'_2C—PR'—CR'_2$ where R' is hydrogen or a $C_1$ to $C_{20}$ hydrocarbyl, substituted hydrocarbyl, halocarbyl, substituted halocarbyl, aryl, substituted aryl, silylcarbyl or germylcarbyl substituent and optionally two or more adjacent R' join to form a substituted or unsubstituted, saturated, partially unsaturated or aromatic, cyclic or polycyclic substituent; provided that at least one of the R' groups is substituted by an L, where each L is as defined in claim 21.

31. The catalyst compound of claim 21, wherein $T(L)_p(R')_z$ is selected from C(L)H, $C(L)HCH_2$, $C(L)CH_3$, $Si(L)CH_3$, Si(L)Ph, $Si(L)CH_3$, C(L)Ph, $C(CR_2)_n(L)$, $C(CR_2)_n(CRL)$, $Si(CR_2)_n(L)$, $Si(CR)_n(CRL)$, where R is hydrogen or a $C_1$ to $C_{20}$ containing hydrocarbyl or substituted hydrocarbyl, and n is 1, 2, 3, or 4, and each L is as defined in claim 21.

* * * * *